United States Patent
Darras et al.

(10) Patent No.: US 10,523,095 B2
(45) Date of Patent: Dec. 31, 2019

(54) METHOD FOR PRODUCTION OF ELECTRICAL MACHINE STATOR COMPRISING PREFORMING STEP, AND CORRESPONDING WOUND STATOR

(71) Applicant: VALEO EQUIPEMENTS ELECTRIQUES MOTEUR, Creteil (FR)

(72) Inventors: Ludovic Darras, Montreuil sur Mer (FR); Vincent Ramet, Etaples (FR); Jean Duquesne, Stella-Plage (FR); Denis Even, Paris (FR); Larry Sapotille, Limeil Brevannes (FR)

(73) Assignee: Valeo Equipments Electriques Moteur, Creteil (FR)

(*) Notice: Subject to any disclaimer, the term of this patent is extended or adjusted under 35 U.S.C. 154(b) by 459 days.

(21) Appl. No.: 15/304,769

(22) PCT Filed: Apr. 9, 2015

(86) PCT No.: PCT/FR2015/050945
§ 371 (c)(1),
(2) Date: Oct. 17, 2016

(87) PCT Pub. No.: WO2015/158995
PCT Pub. Date: Oct. 22, 2015

(65) Prior Publication Data
US 2017/0047830 A1    Feb. 16, 2017

(30) Foreign Application Priority Data
Apr. 17, 2014   (FR) .................................... 14 53446

(51) Int. Cl.
*H02K 1/00*   (2006.01)
*H02K 15/02*  (2006.01)
(Continued)

(52) U.S. Cl.
CPC ............. *H02K 15/026* (2013.01); *H02K 1/16* (2013.01); *H02K 3/12* (2013.01); *H02K 15/0478* (2013.01)

(58) Field of Classification Search
CPC ....................................................... H02K 3/12
(Continued)

(56) References Cited

U.S. PATENT DOCUMENTS 4,449,288 A      5/1984  Disclaire et al.
6,201,332 B1 *   3/2001  Umeda ................... H02K 3/12
                                                          310/179

(Continued)

FOREIGN PATENT DOCUMENTS

CN        101283498 A    10/2008
EP         0803962 A1    10/1997
(Continued)

*Primary Examiner* — Alexander Talpalatski
(74) *Attorney, Agent, or Firm* — Berenato & White, LLC

(57) ABSTRACT

The invention essentially relates to a method for the production of a winding of a stator (15) comprising a body equipped with slots (28), comprising: a supply step consisting in supplying a winding unit with a bundle of conductors (37); and a pre-forming step consisting in moving the winding unit in relation to the bundle of conductors (37), such as to obtain a bundle of conductors (37) having, for each phase winding (E1-E6), at least two loop structures (39) and at least three segment structures (38), two of the segment structures (38) being positioned such that they can be disposed in the same slot (28) of the stator (15) and the two loop structures (39) connecting said two segment structures (38) stacked on the third segment structure (38).

18 Claims, 40 Drawing Sheets

(51) Int. Cl.
*H02K 15/04* (2006.01)
*H02K 1/16* (2006.01)
*H02K 3/12* (2006.01)

(58) Field of Classification Search
USPC ........................................................ 310/180
See application file for complete search history.

(56) References Cited

U.S. PATENT DOCUMENTS

| | | | |
|---|---|---|---|
| 6,459,187 | B1 | 10/2002 | Oohashi et al. |
| 6,649,844 | B2 | 11/2003 | Kusumoto et al. |
| 7,365,467 | B2* | 4/2008 | Bramson .................. H02K 3/12 |
| | | | 310/180 |
| 7,788,791 | B2* | 9/2010 | Hara .................. H02K 15/0081 |
| | | | 219/125.11 |
| 8,456,052 | B2 | 6/2013 | Wolf |
| 9,071,115 | B2 | 6/2015 | Bodin et al. |
| 2001/0019234 | A1* | 9/2001 | Murakami ............... H02K 3/14 |
| | | | 310/180 |
| 2003/0015932 | A1* | 1/2003 | Oohashi .................. H02K 3/12 |
| | | | 310/201 |
| 2003/0164656 | A1* | 9/2003 | Sakurai .................... H02K 3/12 |
| | | | 310/201 |
| 2004/0021388 | A1* | 2/2004 | Wada ....................... H02K 1/16 |
| | | | 310/180 |
| 2004/0239202 | A1* | 12/2004 | Dooley ................ H02K 1/2786 |
| | | | 310/184 |
| 2005/0046297 | A1* | 3/2005 | Chen ....................... H02K 3/12 |
| | | | 310/180 |
| 2005/0110357 | A1* | 5/2005 | Fukasaku ................. H02K 3/12 |
| | | | 310/179 |
| 2006/0145558 | A1* | 7/2006 | Kashihara ................ H02K 3/12 |
| | | | 310/180 |
| 2009/0320275 | A1 | 12/2009 | Dobashi et al. |
| 2010/0139082 | A1 | 6/2010 | Shives et al. |
| 2013/0127289 | A1* | 5/2013 | Koga ....................... H02K 3/12 |
| | | | 310/208 |

FOREIGN PATENT DOCUMENTS

| | | |
|---|---|---|
| EP | 0831580 A2 | 3/1998 |
| FR | 2483702 A1 | 12/1981 |
| FR | 2811487 A1 | 1/2002 |
| FR | 2896350 A1 | 7/2007 |

* cited by examiner

METHOD FOR PRODUCTION OF ELECTRICAL MACHINE STATOR COMPRISING PREFORMING STEP, AND CORRESPONDING WOUND STATOR

CROSS-REFERENCE TO RELATED APPLICATIONS AND CLAIM TO PRIORITY

This application is a national stage application of International Application No. PCT/FR2015/050945 filed Apr. 9, 2015, which claims priority to French Patent Application No. 1453446 filed Apr. 17, 2014, the disclosures of which are incorporated herein by reference and to which priority is claimed.

FIELD OF THE INVENTION

The present invention relates to a method for production of an electrical machine stator comprising a preforming step, as well as to the corresponding wound stator.

The invention has a particularly advantageous application for a stator of a rotary electrical machine, such as, for example, an alternator, an alternator-starter or an electric motor.

BACKGROUND OF THE INVENTION

In a known manner, rotary electrical machines comprise a stator and a rotor integral with a shaft. The rotor can be integral with a driving and/or a driven shaft, and can belong to a rotary electrical machine in the form of an alternator, as described in document EP0803962, or of an electric motor as described in document EP0831580. The electrical machine comprises a housing which supports the stator. This housing is configured to rotate the shaft of the rotor, for example by means of bearings.

The rotor comprises a body formed by a stack of metal sheets which are maintained in the form of a set by means of an appropriate securing system, such as rivets which pass through the rotor axially from one side to the other. The rotor comprises poles which are formed for example by permanent magnets accommodated in cavities provided in the magnetic mass of the rotor, as described for example in document EP0803962. Alternatively, in a so-called "projecting" poles architecture, the poles are formed by coils wound around arms of the rotor.

The stator comprises a body constituted by a stack of thin plates, as well as a phase winding received in notches in the stator which are open towards the interior. There are generally three or six phases. In the stators of alternators of this type, the types of windings which are most commonly used are firstly the so-called "concentric" windings constituted by coils closed on themselves, which are wound around teeth of the stator, and secondly windings of the so-called "undulating" type, which are described for example in document FR2483702.

The undulating winding comprises a plurality of phase windings, of the type wherein each winding comprises at least one spiral conductor, each spiral of which forms undulations which pass through the notches in the body. These conductors have loop structures which are situated alternately on both sides of the rotor or the stator, connecting to one another segment structures which are situated in the interior of the notches in the stator. A set of loop structures which extends from a side of the stator constitutes a chignon of the winding.

In order to improve the performance of the electrical machine, it is preferable to fill the notches in the stator to the maximum, whilst facilitating the formation of the winding chignons. For this purpose, for stators constituting alternators which are designed in particular for motor vehicle applications, it has been proposed in document U.S. Pat. No. 6,459,187 to produce windings of the so-called "front-rear" type, comprising phase windings formed by conductors with segment structures which are positioned alternately in an inner radial layer and an outer radial layer of the conductor.

However, taking into account the large number of wires used (two wires per phase, i.e. 12 wires altogether for a hexaphase stator), a configuration of this type makes the coupling of the different phases to one another difficult.

SUMMARY OF THE INVENTION

The objective of the invention is to eliminate this disadvantage efficiently by proposing a method for production of a stator comprising a body provided with notches, characterised in that it comprises:

a supply step consisting of supplying a winding unit with a bundle of conductors; and a preforming step consisting of displacing the winding unit relative to the bundle of conductors, such as to obtain a bundle of conductors with at least two loop structures for each phase winding, and at least three segment structures, two of the said segment structures being positioned such as to be able to be arranged in the same notch in the stator, and the two loop structures connecting respectively the said two segment structures superimposed on the third segment structure, such that the direction of running of the stator notches by each phase winding is inverted at a notch known as the inversion notch, in which the said segment structure is accommodated, connected via two loop structures to two superimposed segment structures.

The segment structures are designed to be received in the notches in the stator, and the loop structures connect the segment structures.

According to one embodiment, the said two segment structures are positioned facing one another on both sides of the winding unit.

According to one embodiment, the said method additionally comprises:

a forming step, consisting of displacing the winding unit relative to the bundle of conductors, such as to form a portion of each of the phase windings each comprising at least one loop structure and at least two segment structures, the said loop structure connecting the two segment structures;

repeating the supply and forming step, such as to obtain a winding layer comprising a plurality of phase windings, in each of which the successive segment structures of a single conductor are positioned alternately in an inner layer and an outer layer.

According to one embodiment, the forming step comprises a winding step consisting of turning the winding unit relative to the bundle of conductors.

According to one embodiment, the said method comprises the step of turning the winding unit by 180°.

According to one embodiment, the forming step comprises a step of translation of the bundle of conductors relative to the winding unit.

According to one embodiment, the said method comprises the step of displacing the bundle of conductors by one step corresponding to the number of phases.

According to one embodiment, each translation step is followed by a winding step.

According to one embodiment, the step of forming the phase windings is carried out such that segment structures of two conductors constituting a single phase winding are positioned alternately in a lower layer and an upper layer according to a length of the layer.

According to one embodiment, each phase winding is obtained from a single wire.

According to one embodiment, the said method comprises a compensation step consisting of compensating for a change of level of the said winding layer when a winding of the said layer covers a circumference of the stator.

According to one embodiment, the said method comprises a step of putting into place storage devices which are designed to receive the portions of the phase windings.

According to one embodiment, for two adjacent notches of a series of notches of a comb associated with a phase winding, the winding has two loop structures situated on both sides of the stator, connecting segment structures of one of the said notches adjacent to those of the other.

According to one embodiment, the said two loop structures connect respectively a segment structure belonging to a lower layer to a segment structure belonging to an upper layer, and a segment structure belonging to an upper layer to a segment structure belonging to a lower layer.

According to one embodiment the supply and forming steps are repeated such as to obtain a winding layer, the length of which is equal to N/2 times the circumference of the stator, N being the number of layers of conductors required in the wound stator, N being equal to two or more.

According to one embodiment, the number N of layers of conductors is equal to four, six, or eight.

According to one embodiment, the number N of layers of conductors is equal to eight.

According to one embodiment, the said method additionally comprises a step of installation of the winding layer in a spindle for formation of the winding, and a step of transfer of the spindle winding to the said stator.

According to one embodiment, the said method comprises a step of putting a continuous notch insulator into place in notches in the said stator, before carrying out the step of transfer of the winding to the said stator.

According to one embodiment, the said method comprises a step of stamping of the segment structures which are designed to be inserted in notches in the stator.

According to one embodiment, each conductor has a square or rectangular cross-section.

The invention also relates to a wound stator comprising a body provided with notches, and a winding formed from a layer comprising a plurality of phase windings, characterised in that the said winding comprises a regular part in which, for each phase winding, segment structures are each connected, via two loop structures, to two adjacent segment structures situated in two different notches, and an irregular winding part in which, for each phase winding, at least one segment structure is connected via two loop structures to two segment structures which are superimposed radially relative to one another in a single notch, such that the direction of running in the notches in the stator by each phase winding is inverted at a notch known as the inversion notch, in which there is accommodated the said segment structure connected via two loop structures to two superimposed segment structures.

According to one embodiment, for at least one phase winding of the irregular winding part, at least one of the loop structures has radial adjustments, such that the said at least one loop structure of the phase windings does not/do not overlap.

According to one embodiment, segment structures of two conductors which constitute a single phase winding are positioned alternately in an inner layer and an outer layer according to a circumference of the stator.

According to one embodiment, each phase winding is constituted by a single wire.

According to one embodiment, for two adjacent notches of a series of notches associated with a phase winding, the winding has two loop structures situated on both sides of the stator connecting segment structures of one of the said notches adjacent to those of the other.

According to one embodiment, the said two loop structures connect respectively a segment structure belonging to an inner layer to a segment structure belonging to an outer layer, and a segment structure belonging to an outer layer to a segment structure belonging to an inner layer.

According to one embodiment, the segment structures have a square or rectangular cross-section, and the loop structures have a round cross-section.

According to one embodiment, the teeth which delimit the notches are without tooth roots.

According to one embodiment, the winding is obtained by winding a winding layer around N/2 stator turns, N being the number of layers of conductors required in the wound stator, N being equal to two or more.

According to one embodiment, the number N of layers of conductors is equal to four, six, or eight.

According to one embodiment, the number N of layers of conductors is equal to eight.

The invention also relates to an electrical machine comprising a stator as previously described.

BRIEF DESCRIPTION OF THE DRAWINGS

The invention will be better understood by reading the following description and examining the figures which accompany it. These figures are provided purely by way of illustration of the invention which is in no way limiting.

Elements which are identical, similar or analogous retain the same reference from one figure to another.

DETAILED DESCRIPTION OF THE PREFERRED EMBODIMENT(S)

Figure 1:
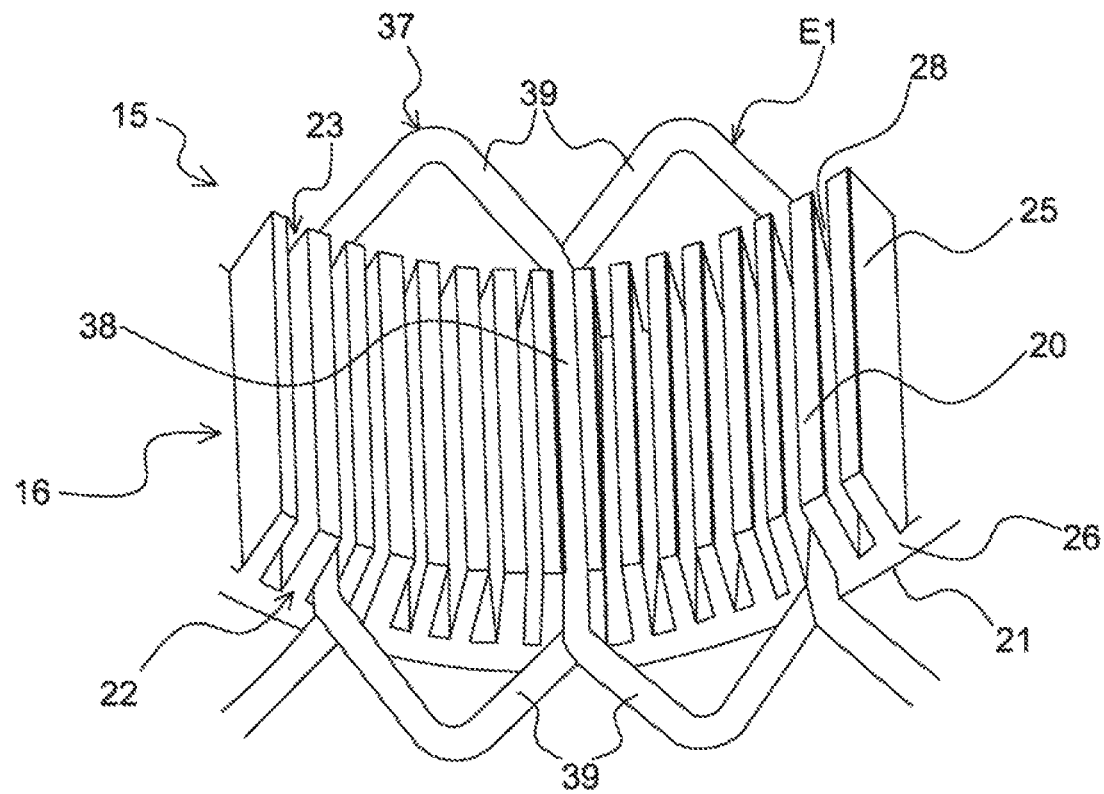
FIG. 1 is a partial view in perspective of the interior of a stator in which the conductors of a phase winding are arranged according to the invention.
Figure 6:
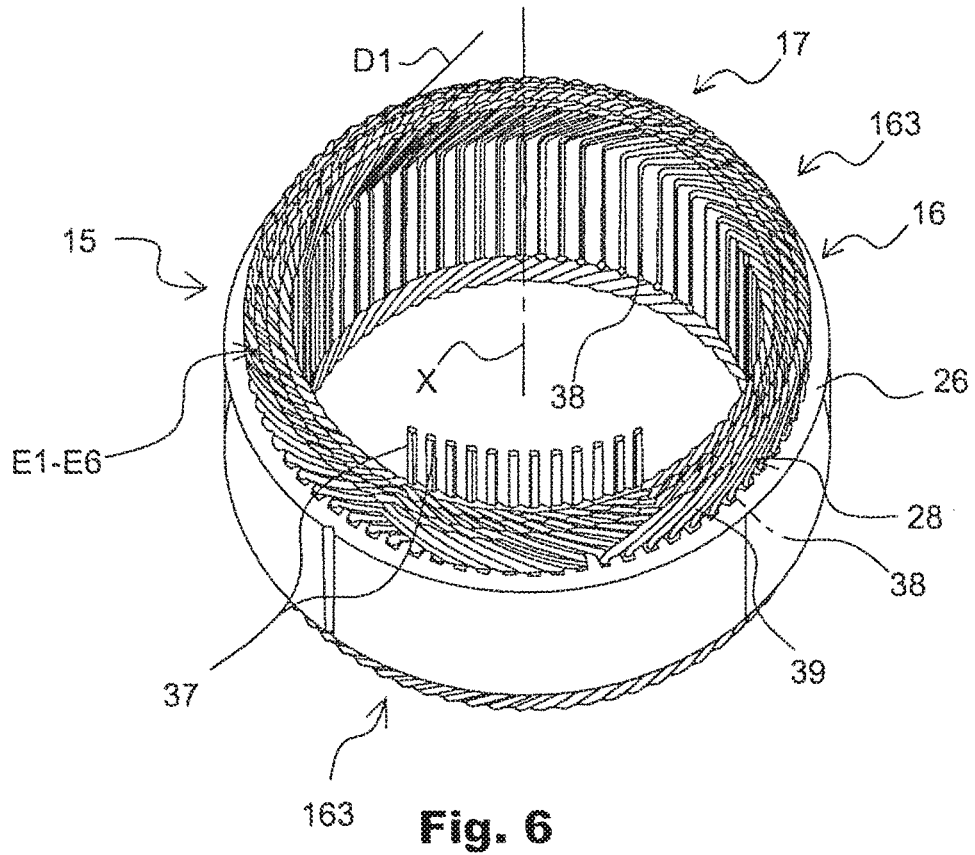
FIG. 6 is a view in perspective of the stator according to the present invention provided with its winding.

FIG. 1 shows a partial view of a stator 15 of a rotary electrical machine which mainly comprises a body 16 in which a plurality of phase windings E1-E6 are fitted, forming a winding 17 which can be seen clearly in FIG. 6. A single winding E1 is represented in FIG. 1 in order to facilitate understanding.

The rotary machine is for example an alternator or an alternator-starter. This machine is preferably designed to be implemented in a motor vehicle. It will be remembered that an alternator-starter is a rotary electrical machine which can work reversibly, firstly as an electric generator in alternator function, and secondly as an electric motor, in particular in order to start the thermal engine of the motor vehicle.

Figure 2:
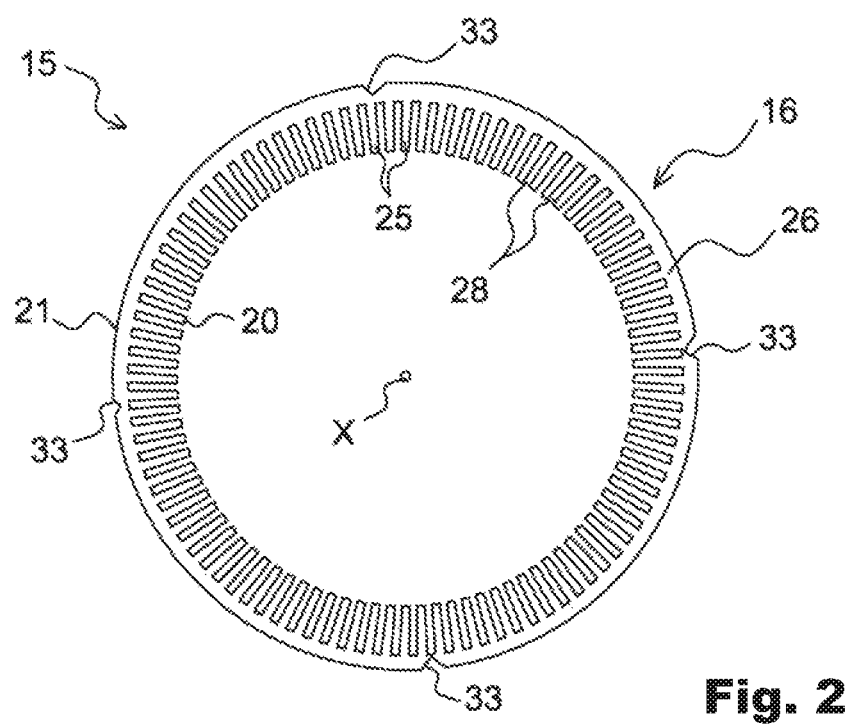
FIG. 2 represents a view from above of the stator body in FIG. 1.

As shown in FIG. 2, the stator 15 body 16 has an annular cylindrical form with an axis X, and consists of an axial stack of flat plates. The stator 15 body 16 is delimited radially by an inner cylindrical face 20 and by an outer cylindrical face 21. The body 16 is also delimited axially by a radial face with a lower axial end 22 and by a radial face with an upper axial end 23.

The body 16 comprises teeth 25 which are distributed angularly regularly around an inner circumference of a yoke 26. These teeth 25 delimit notches 28 in pairs. The yoke 26 corresponds to the solid outer annular portion of the body 16 which extends between the base of the notches 28 and the outer periphery of the stator 15.

The notches 28 open axially into the lower 22 and upper 23 axial radial end faces of the body 16. The notches 28 are open radially in the inner cylindrical face of the body 16. As a variant, the notches 28 are open in the outer cylindrical face of the body 16. The notches 28 in the stator 15 preferably have parallel edges, i.e. the inner faces opposite one another of the notches 28 are parallel to one another. There are for example 36, 48, 60, 72, 84 or 96 notches 28. In the example in the embodiment, the stator 15 comprises 96 notches. They are distributed angularly regularly around the axis X of the body 16.

In order to form the stator 15 winding 17, a plurality of phase windings E1-E6 are fitted in the body 16. In this case the hexaphase stator 15 comprises six phase windings E1-E6. The invention can however be applied to stators 15 comprising a different number of phase windings, and in particular to three-phase stators 15 comprising three phase windings E1-E3, or pentaphase stators comprising five phase windings E1-E5, or heptaphase comprising seven phase windings E1-E7. The stator 15 body 16 then comprises for example 36 or 48 notches 28.

Figure 3:
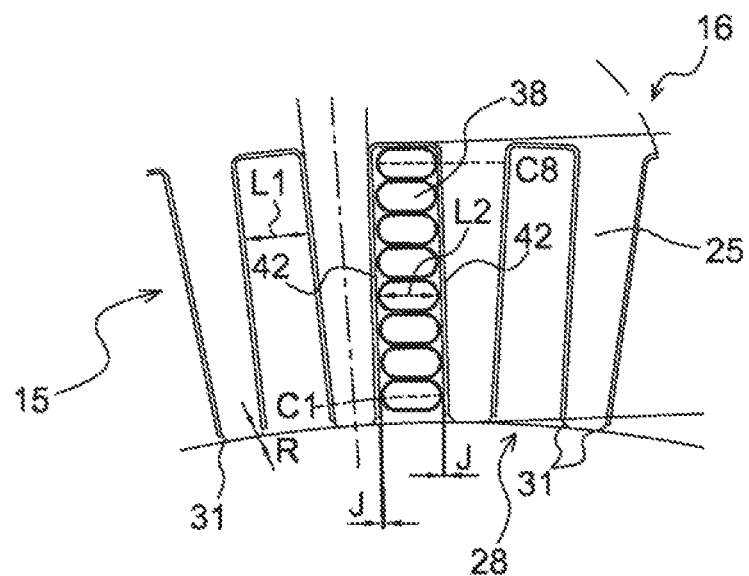
FIG. 3 is a detailed view from above of the form of the teeth of the stator in FIG. 1.

Preferably, as can be seen clearly in FIG. 3, the stator 15 is without tooth roots on the free end side of the teeth 25. In addition, corners 31 which are situated at the free ends of the teeth 25 preferably have a form which is rounded according to a radius R, known as the input radius. This input radius R is between 0.15 mm and half a width of a tooth 25. The production of this radius makes it possible to facilitate the insertion of the different layers of conductors 37 in the interior of the notches 28 via the end of the notches 28 open on the inner side of the stator 15. In order to obtain the rounded form in the corners 31, a step is carried out of cutting the plates of the body 16 according to the radius R, and a step of compacting the stator body 16.

Figure 4:
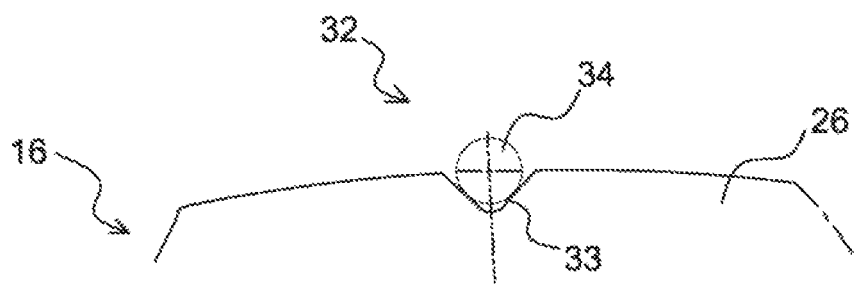
FIG. 4 shows a detailed view from above of the outer indexing means of the stator in FIG. 1.

In addition, as can be seen in FIG. 4, outer indexing means 32 provided on an outer periphery of the yoke 26 permit controlled angular positioning during the different steps of production of the wound stator 15 described in detail hereinafter. These indexing means 32 are used in particular at the moment when the stator 15 is put into place around the annular spindle 105, before the transfer of the winding 17 to the notches 28 in the stator 15. These indexing means 32 are also used during putting into place of a notch insulator.

These outer indexing means 32 are in the form of recesses 33 which are designed to cooperate with gauges 34 of an outer tool. In this case, the recesses 33 have a cross-section in the form of a "V", whereas the gauges 34 have a round cross-section. As a variant, the outer indexing means 32 are in the form of pins which extend projecting on the outer periphery of the yoke 26, and are designed to cooperate with recesses provided in the outer tool.

Each conductor 37 belonging to a phase winding E1-E6 comprises a series of segment structures 38 which are received in an associated series of notches 28. Each conductor 37 also comprises loop structures 39 which connect to one another the consecutive segment structures 38 of a given winding E1-E6, and extend alternately projecting relative to the upper axial end face 23, and projecting relative to the lower axial end face 22. A set of loop structures 39 provided at an axial end of the stator 15 body 16 constitutes a winding chignon 163.

In order to optimise the filling of notches 28, each conductor 37 can have a rectangular or square transverse cross-section, the width of which is substantially equal to the width of a notch 28. According to one embodiment, the conductors 37 have a rectangular or square cross-section along their entire length. Alternatively, the segment structures 38 have a square or rectangular cross-section, whereas loop structures 39 connecting two adjacent segment structures 38 have a round cross-section. In order to obtain a configuration of this type, the conductors 37 can be subjected to a stamping step described hereinafter with reference to FIGS. 32 to 34. The conductors 37 are preferably made of copper covered with enamel. As a variant, the conductors 37 can be made of aluminium.

As shown in FIG. 3, a ratio is defined between a width of a notch L1 covered with notch insulator 145, and a width L2 of a segment structure 38 covered with enamel, measured in a direction perpendicular to the inner faces of the notch 28, i.e. in an orthoradial direction (ratio L1/L2). This ratio is between 0.9 and 2, in order to maximise the filling of the notches 28 by the conductors 37, by optimising the size of the conductor 37 which can be inserted in the notch, relative to the width of the notch 28.

With each notch being covered with an insulator, and each covered notch edge of the insulator preferably having a gap J with an end opposite a section of a given segment structure 38, the notch width L1 is equal to the sum of the width of the segment structure 38 and twice the gap J, the said twice the gap J being larger than a negative gap of −0.2 mm, and smaller than a positive gap of +0.3 mm.

The notches 28 of a series of notches receive the segment structures 38 of the conductors 37 which constitute a phase winding E1-E6. Each series of notches 28 is associated with one of the six phase windings. Two consecutive notches 28 of a series of notches are separated by adjacent notches 28, each corresponding to another series of notches 28 associated with one of the five other phase windings. Thus, for a hexaphase stator 15, as in the case in FIG. 1, five adjacent notches 28 are left free between two notches 28 of each series. In other words, the conductors 37 of a winding are inserted in one notch out of six adjacent notches 28. Thus, for a stator 15 comprising K phase windings, the segment structures 38 are received in one notch out of K adjacent notches 28.

Figure 41A:
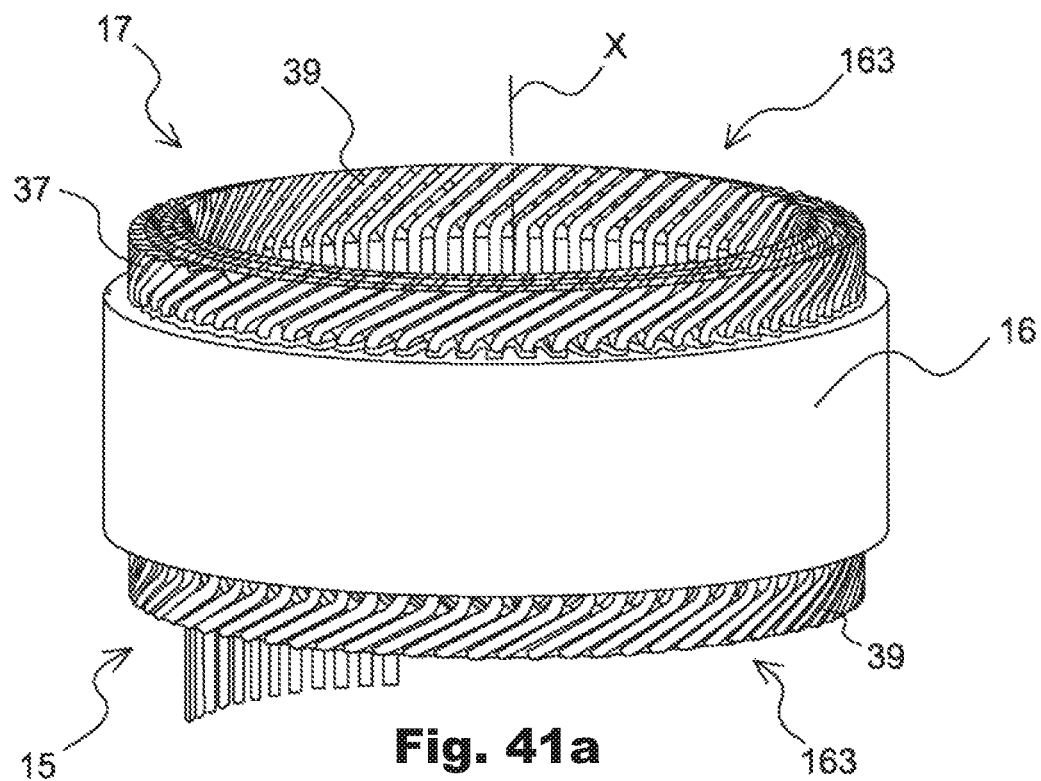
FIGS. 41a-41b, 42a-42b and 43a-43b are views in perspective and from the side of a wound stator according to the present invention with different configurations of winding chignons.
Figure 41B:
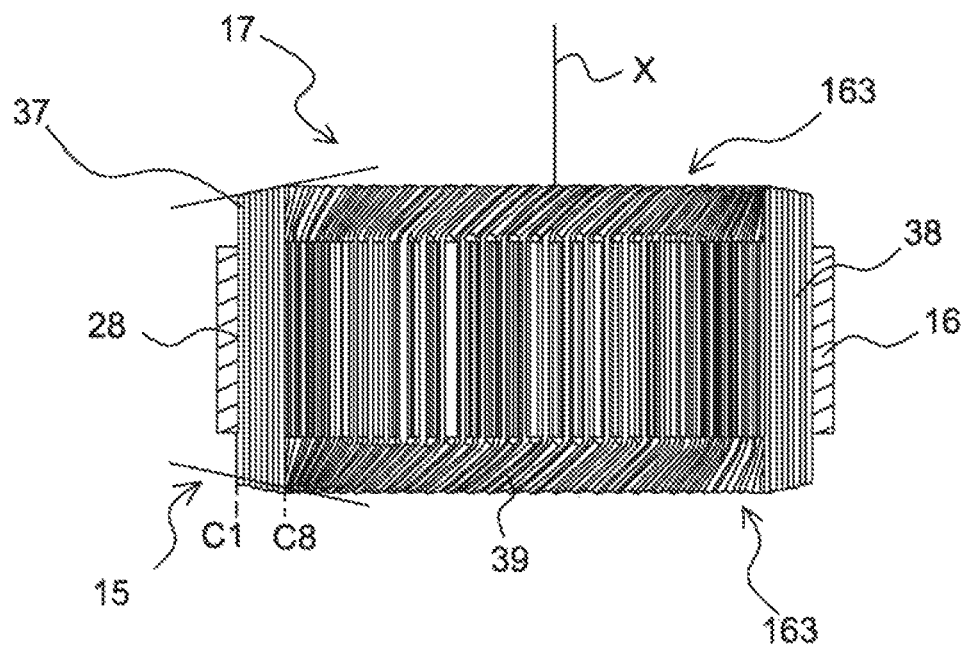
Figure 42A:
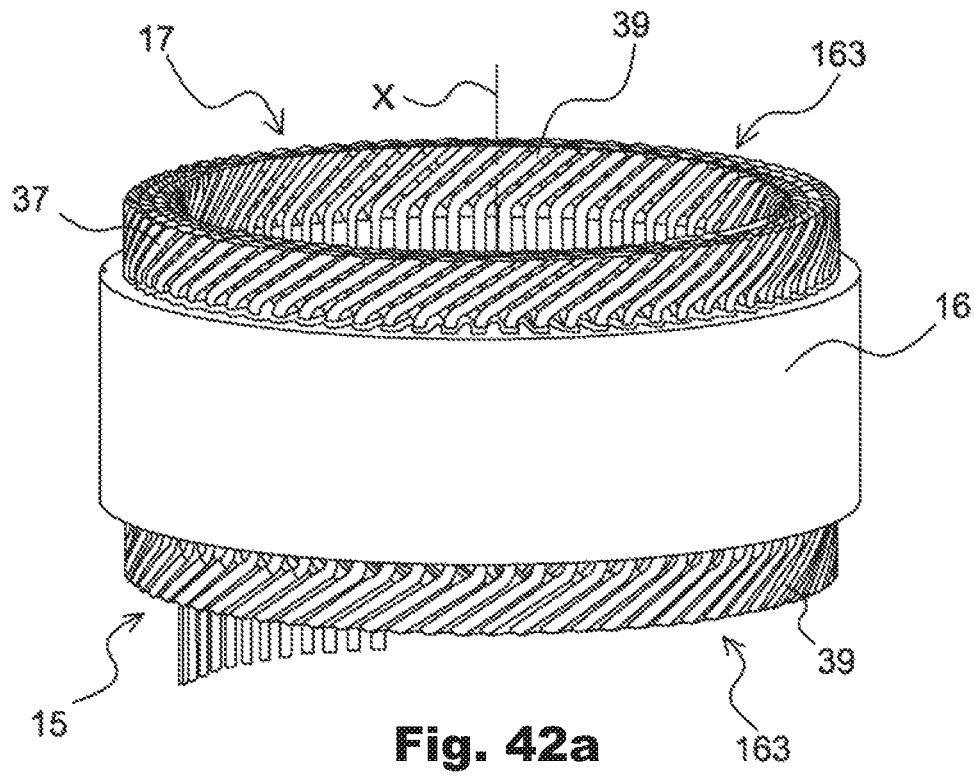
Figure 42B:
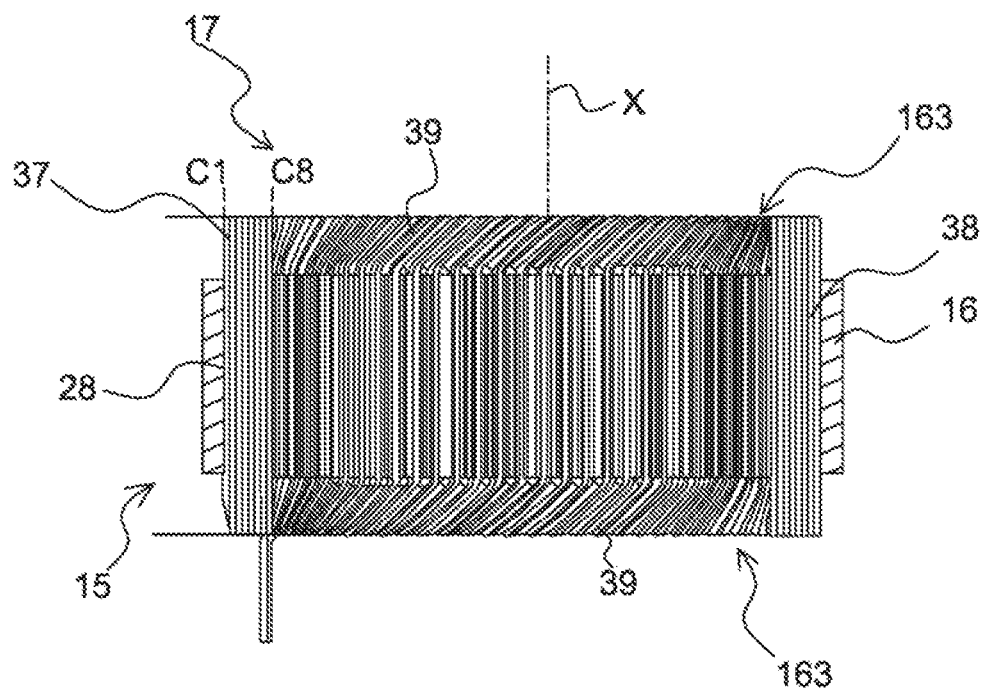
Figure 43A:
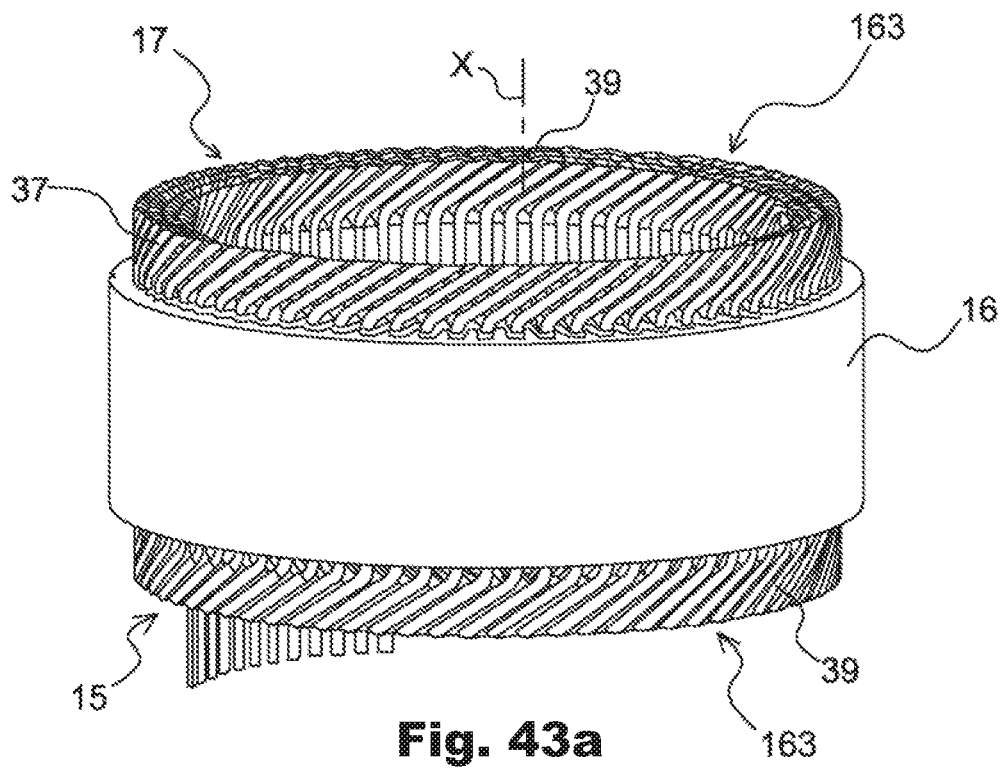
Figure 43B:
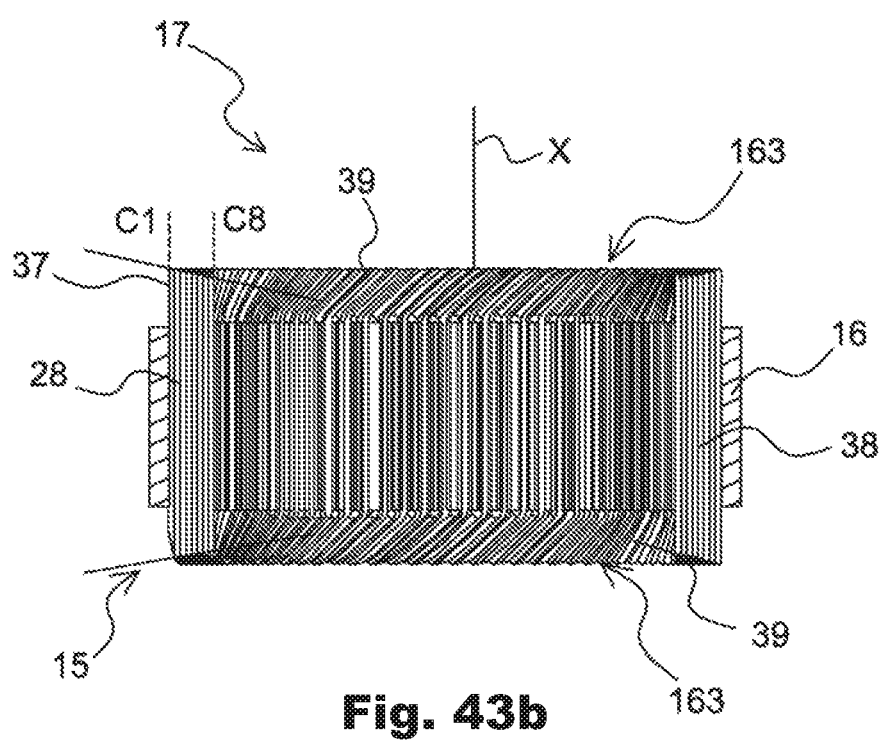
Figure 44A:
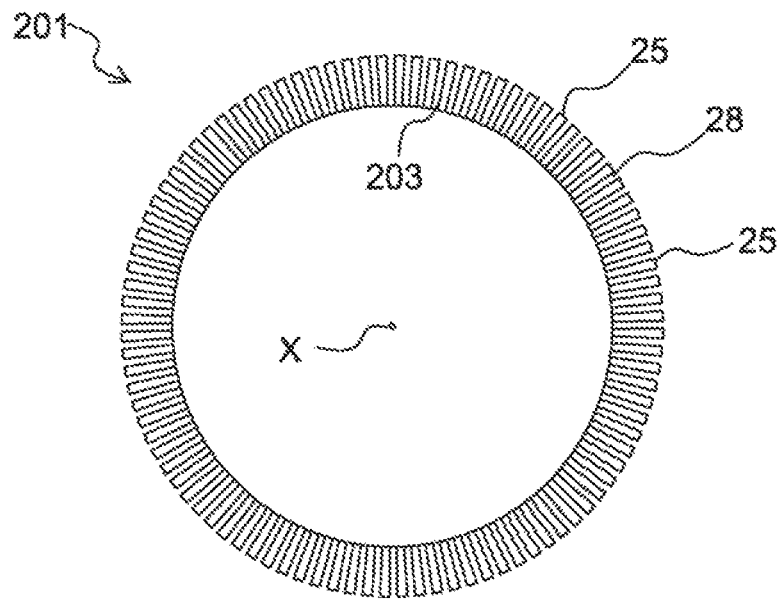
FIGS. 44a and 44b show views from above of a stator produced in two parts comprising a central core (FIG. 44a) and an added-on yoke which is designed to be secured around the central core (FIG. 44b)
Figure 44B:
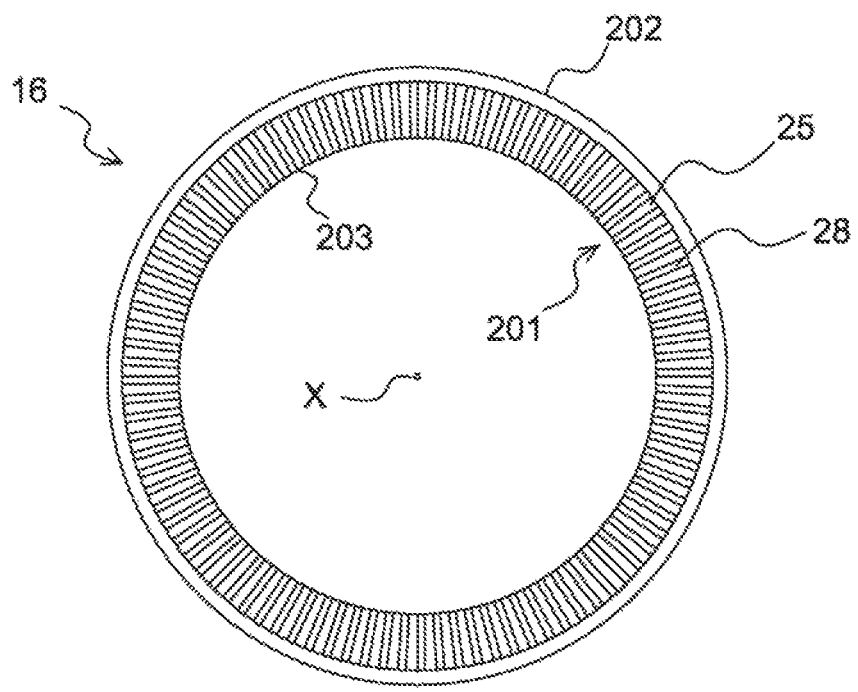
Figure 45A:
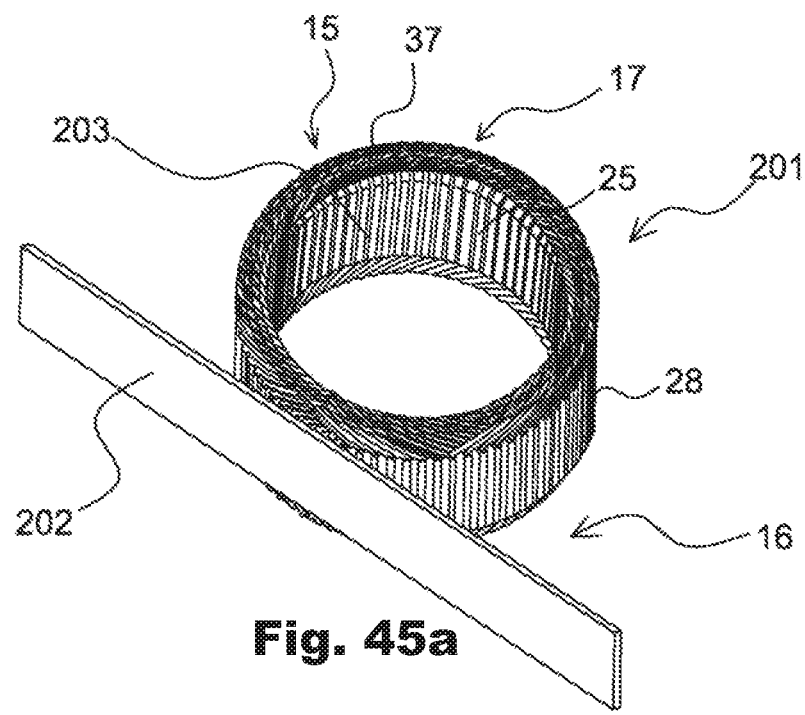
FIGS. 45a and 45b represent the steps of putting a yoke with a flat form into place by bending around the wound central core.
Figure 45B:
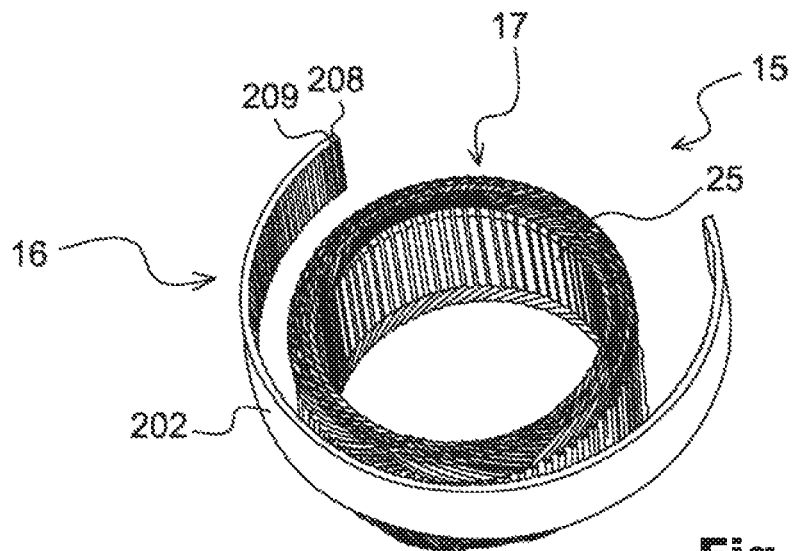

The phase windings E1-E6 define a radial stack of concentric layers C1-C8, as can be seen in FIG. 3, or also in FIG. 41b, 42b or 43b. A so-called "outer" layer is situated on the yoke 26 side, relative to an inner layer, whereas a so-called "inner" layer is situated on the axis X side of the stator 15 relative to the outer layer. In this case, a stator 15 is represented comprising eight concentric layers C1-C8 of conductor 37. However, it is clear that the winding 17 can comprise fewer or more than eight layers of conductors 37, and in particular six or four layers of conductors 37 superimposed radially, as represented in FIG. 5.

More generally, as explained in greater detail hereinafter, the winding 17 is formed from a winding layer 52 of interlaced conductors which is wound on N/2 stator 15 turns, N being the number of layers of conductors 37 required in the wound stator 15, N being equal to two or more. The number N of layers of conductors 37 is preferably equal to four, six or eight.

Figure 5:
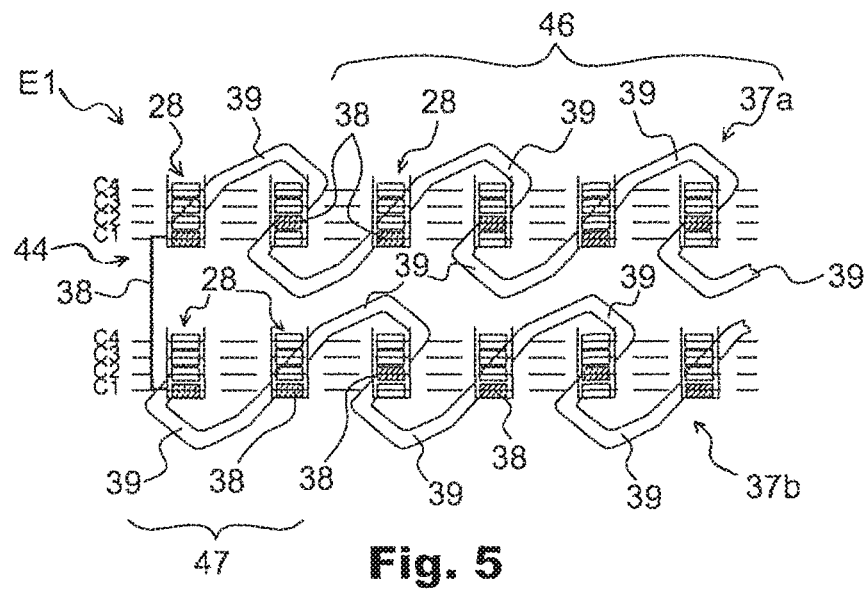
FIG. 5 represents a linear development of two conductive wires forming a phase winding, showing the relative radial position of the two conductors in relation to one another on the circumference of the stator.

As can be seen in FIG. 5, which shows a series of notches 28 associated with a given phase winding, in this case the phase winding E1, the successive segment structures 38 of the single conductor 37 are positioned alternately in an inner layer and an outer layer on most of the circumference of the stator 15.

Thus, for a pair of conductors 37a, 37b obtained from a single folded wire 44, as explained in greater detail hereinafter, and occupying the layers C1 and C2, each conductor 37a, 37b has a globally sinusoidal form, and comprises consecutively:

a lower loop structure 39 which extends below the lower face 22 of the body 16, a segment structure 38 which is received in an associated notch, an upper loop structure 39 which extends above the upper face 23 of the body 16, or an upper loop structure 39 which extends above the upper face 23 of the body 16, a segment structure 38 which is received in an associated notch, and a lower loop structure 39 which extends below the lower face 22 of the body 16.

When, in a notch 28 in the series, the segment structure 38 of the conductor 37a is in the layer C1, the segment structure 38 of the conductor 37b is situated in the layer C2. In addition, when the segment structure 38 of the conductor 37a is in the layer C2 of the successive notch 28 in the series, the segment structure 38 of the conductor 37b is situated in the layer C1. In all cases, the two segment structures 38 are superimposed radially on one another in each notch 28. This alternation in the layers is also found in the layers C3 and C4 of the winding 17. In each notch 28 of the stator 15, there is thus a single column of segment structures 38 stacked radially on one another.

In addition, for two adjacent notches 28 of a series of notches associated with a phase winding E1-E6, the winding 17 has two loop structures 39 situated on both sides of the stator 15 connecting segment structures 38 of one of the notches 28 adjacent to those of the other.

Thus, the loop structure 39 of one of the conductors 37a, which connects the segment structures 38 received in the two aforementioned adjacent notches 28 is arranged axially above the upper face of the body 16, whereas the loop structure 39 of the other conductor 37b which connects the segment structures 38 received in the two aforementioned adjacent notches 28 is arranged axially below the lower face of the body 16.

In addition, for two adjacent notches 28 of a series associated with a given phase winding E1-E6, the loop structure 39 of the conductor 37a connects a segment structure 38 belonging to an inner layer to a segment structure 38 belonging to an outer layer, whereas the loop structure 39 of the other conductor 37b connects a segment structure 38 belonging to an outer layer to a segment structure 38 belonging to an inner layer. The relationship is inverted for the two following adjacent notches 28.

The winding 17 additionally has a discontinuity. In fact, as shown in FIG. 7 and in FIG. 5, the winding 17 comprises a so-called "regular" part 46 in which, for each phase winding E1-E6, segment structures 38 are each connected, via two loop structures 39, to two adjacent segment structures 38 situated in two different notches 28.

Figure 7:
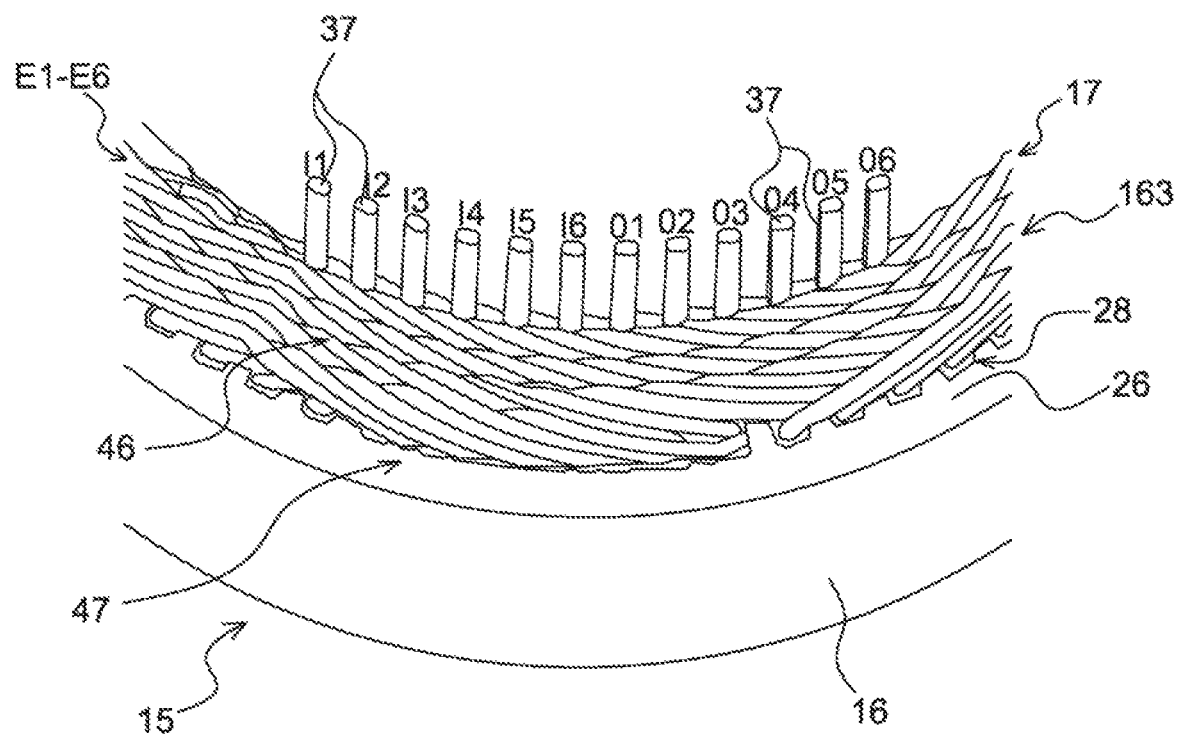
FIG. 7 represents a partial view in perspective of the regular and irregular parts of the stator winding according to the present invention.

The winding 17 also comprises a so-called "irregular" part 47 shown in FIG. 7 on the outer periphery side of the stator 15, wherein, for each phase winding E1-E6, at least one segment structure 38 is connected via two loop structures 39 to two segment structures 38 superimposed radially relative to one another in a single notch 28. As can be seen clearly in FIG. 5, the winding E1 thus has in the notch 28 which is furthest to the left a segment structure 38 connected via two loop structures 39 to two segment structures 38 superimposed radially relative to one another in the adjacent notch 28 on the right. As a variant, the irregular part 47 is situated on the inner periphery side of the stator 15.

Figure 8:
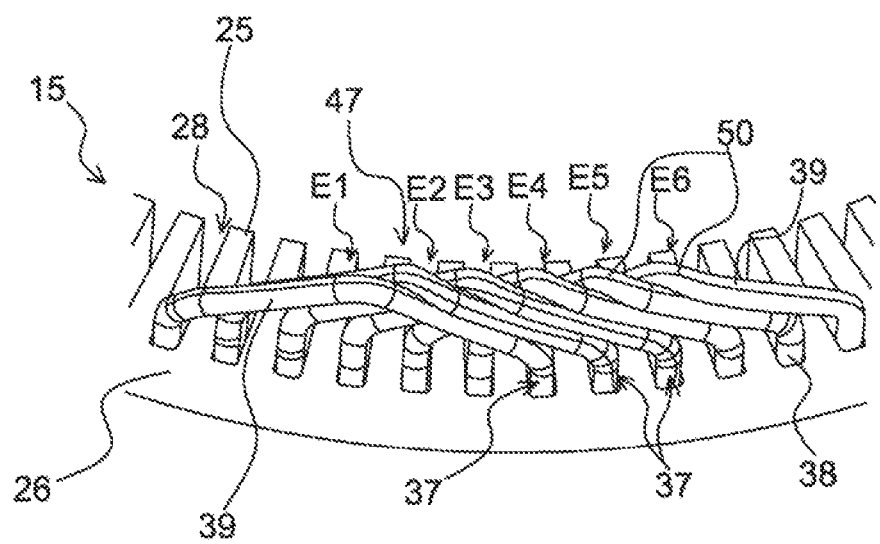
FIG. 8 is a partial view in perspective of the irregular part of the stator winding represented alone.

Preferably, as represented in FIG. 8, in the irregular winding part 47, the phase windings E1-E6 each comprise at least one loop structure 39 with radial adjustments 50, such that these loop structures 39 which connect segment structures 38 situated in identical layers of conductors do not overlap. These radial adjustments 50 are defined by parts of a conductor 37 which extend radially relative to the axis of the stator 15, such as to prevent the loop structures 39 of the other phase windings which connect segment structures 38 from being situated in the same layer.

It should be noted that, for the first phase winding E1 which is situated at an end of the series of notches 28 associated with the different phases, the loop structure 39 which connects two segment structures 38 positioned in the same layer does not need to be configured to avoid the loop structures 39 of the other phase windings. Consequently, this loop structure 39 is without radial adjustment 50.

In addition, if a first type of loop structures 39 is defined ensuring a connection of consecutive segment structures 38 received in the notches 28 situated in a single layer C1-C8 of conductors 37, and a second type of loop structures 39 ensuring a connection of consecutive segment structures 38 received in the notches 28 situated in the layers C1-C8 of different conductors 37, the winding 17 is produced such that less than 10% of all of the loop structures 39 are of the first type of loop structures 39.

By implementing segment structures 38 which change layers to a large extent, there is thus limitation of the stresses on the wires 44 of the winding chignons 163 at the moment of a change of turn of the winding layer 52 around the stator 15, as explained hereinafter.

In addition, thanks to the mainly front-rear alternation of the winding, there is limitation of the number of radial adjustments 50, because of the putting into place in parallel of the successive loop structures 39 associated with the phase windings E1-E6 according to the direction of passage from one layer C1-C8 to another.

As can be seen in FIG. 6, the loop structures 39 form stationary blades which are inclined according to a direction D1 around the axis X of the stator 15, in conformity with a direction of a cooling fluid. Relative to a radial position of the blades, these blades are inclined in a direction corresponding to the direction of rotation of the rotor. This therefore makes it possible to improve the flow of the cooling fluid, in general air, inside the electrical machine, in order to optimise its cooling. The loop structures 39 are inclined such as to be substantially parallel in pairs, for adjacent segment structures 39. Circulation of the cooling fluid is ensured by blades secured to a rotor which are oriented substantially radially relative to the axis of the stator 15.

In addition, a configuration of this type enables each chignon 163 of the winding 17 to have a limited general height. The height of each winding chignon is thus less than 33% of a height of the stator 15 body 16, which makes it possible to save copper in the chignons for the same performance of the machine, since only the copper which is present in the notches makes it possible to generate the current of the electrical machine. The chignons of the winding 17 are preferably positioned exclusively inside an outer periphery of the stator 15, in order to facilitate the integration of the machine in the environment under the bonnet of the vehicle.

Figure 9:
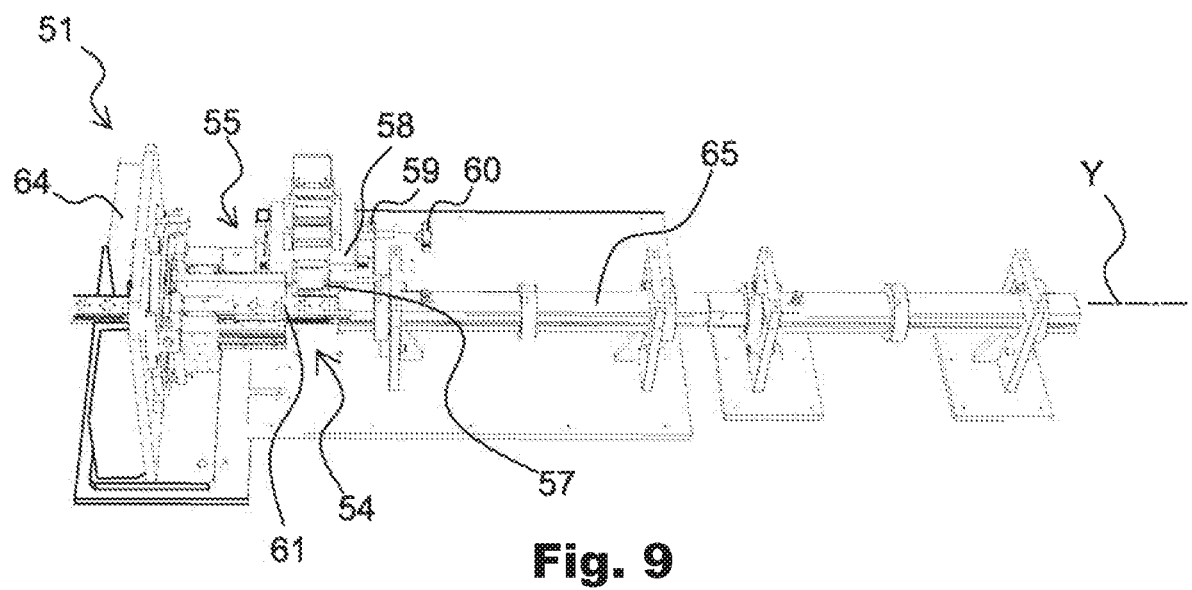
FIG. 9 is a schematic representation in perspective of an installation which permits the production of a winding layer according to the present invention.
Figure 10:
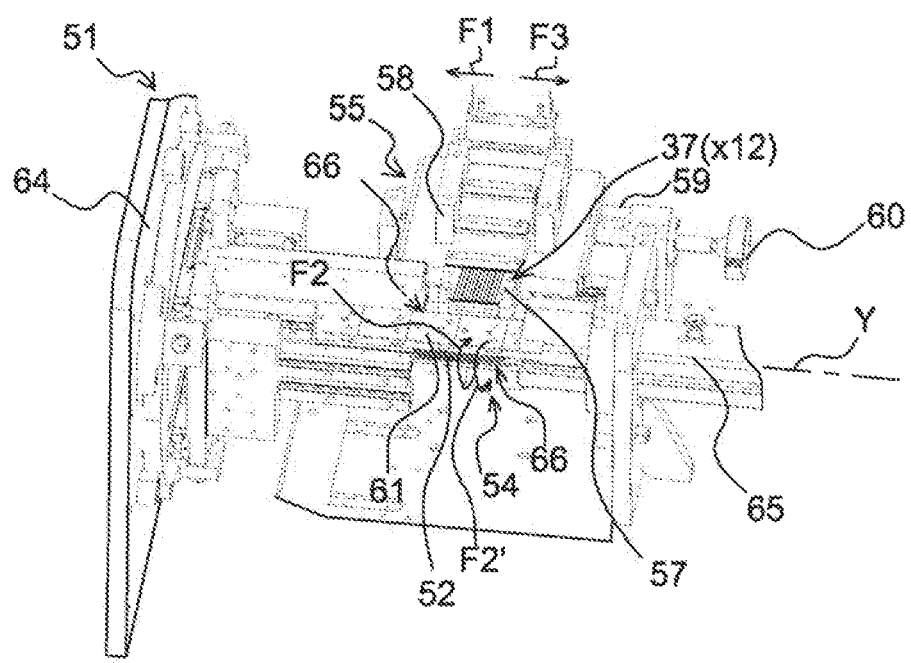
FIG. 10 is a view in perspective on an enlarged scale of the installation represented in FIG. 9.
Figure 14:
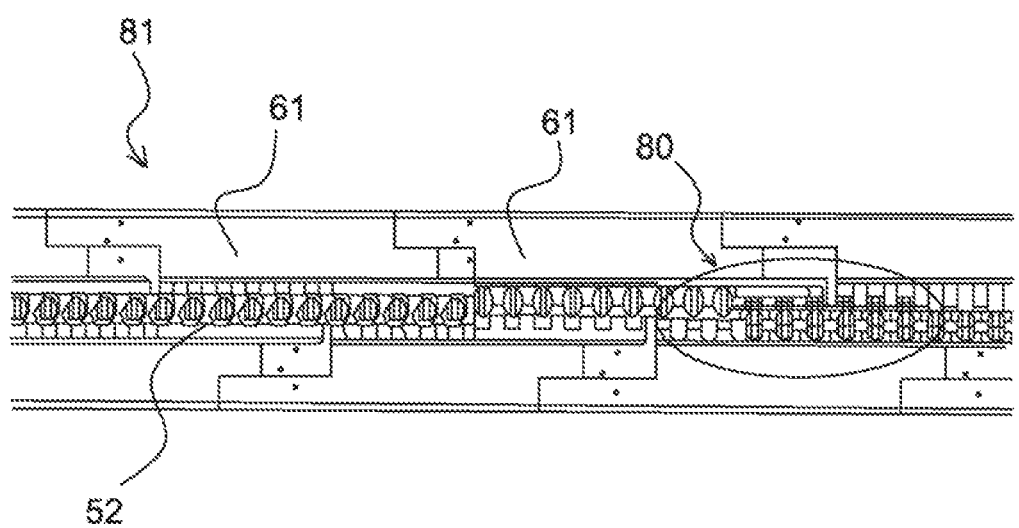
FIG. 14 is a detailed view in longitudinal cross-section of the assembly in FIG. 13, showing part of the winding layer situated between the storage devices.
Figure 15A:
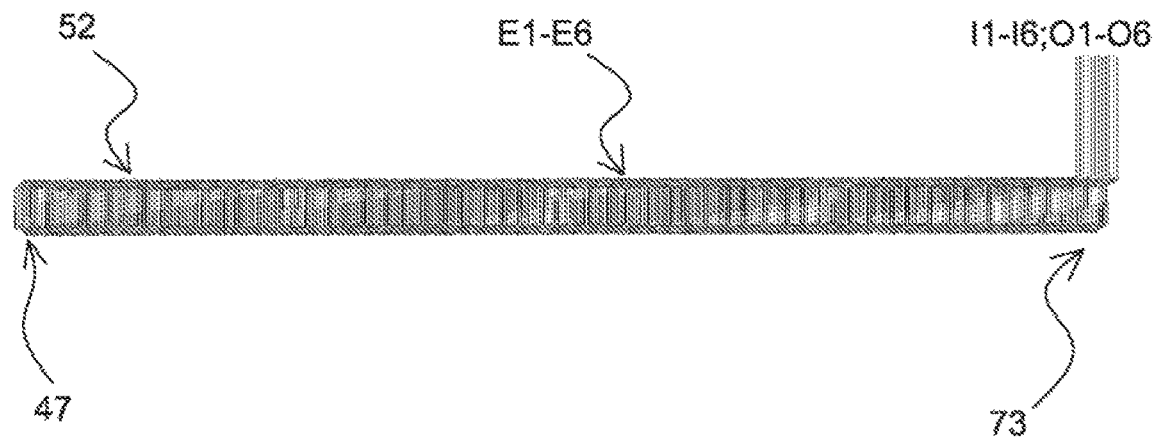
FIGS. 15a and 15b show respectively views from above and from the side of the winding layer obtained by means of the installation in FIGS. 9 and 10.
Figure 15B:
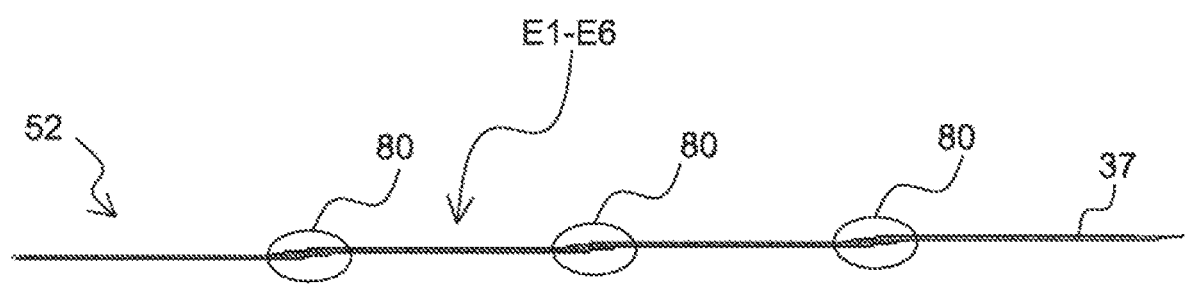

FIGS. 9 and 10 show an installation 51 which makes it possible to form a winding layer 52 which can be seen clearly in FIGS. 14, 15a and 15b, and is used for production of the hexaphase stator 15 according to the invention. This installation 51 comprises a winding unit 54 which extends according to a longitudinal direction Y and a unit 55 for conveying the conductors 37 extending substantially transversely relative to the winding unit 54.

More specifically, the unit 55 for conveying the conductors 37 comprises a conductor 37 guide head 57 integral with a support 58 which is mobile in translation according to the axis Y relative to a fixed frame 59. The displacement of the mobile support 58 and of the guide head 57 is carried out by means of a maneuvering device with the reference 60.

In addition, the winding unit 51 comprises a winding unit 54 which is designed to receive in succession the storage devices 61 described in greater detail hereinafter. The winding unit 54 can turn together with the storage device 61 which it supports, around the axis Y, relative to a fixed frame 64 with an annular form. The winding unit 54 is also configured to displace the storage devices 61 in translation to a storage unit 65.

The winding unit 54 also comprises on its two opposite longitudinal lateral edges keys 66 which are designed to ensure the retention of the conductors 37 during the rotation of the winding unit 54 relative to the unit 55 for conveying of the conductors 37. The keys 66 also have variable spacing in order to be able to vary a height of the layers of conductors during the production of the winding layer.

The winding method is based on the use of the storage devices 61 which are shown in FIG. 11a, 11b, 12a and 12b, and are designed to be put into place in succession on the winding unit 54. Each storage device 61 consists of a globally parallelepiped element with longitudinal orientation.

Each storage device 61 comprises transverse notches 69 arranged in two stages 70, 71, which open transversely into the lateral faces of the storage device 61. These notches 69, which are delimited in pairs by teeth 72, are distributed longitudinally according to a constant pitch along the storage device 61.

Figure 11A:
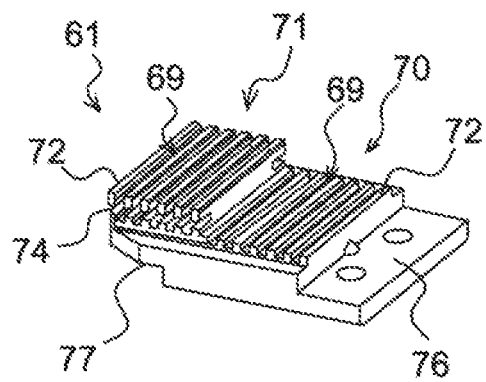
FIGS. 11a and 11b are respectively views in perspective and from the side of a first type of storage device used with the installation in FIGS. 9 and 10.
Figure 11B:
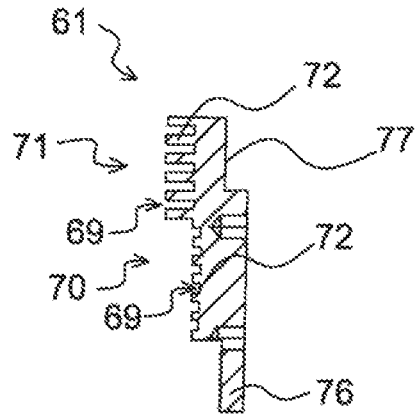

In the embodiment in FIGS. 11a and 11b, each storage device 61 has a low stage 70 provided with small teeth 72, and a high stage 71 provided with large teeth 72, i.e. teeth 72 which are higher than the small teeth 72 of the low stage 70. The large teeth 72 can comprise lateral cut-outs 74 on their longitudinal ends side, in order to permit the passage of the keys 66. These notches 69 are designed to receive the segment structures 38 of the winding layer 52.

The low stage 70 comprises a successive number of notches 69 equal to the number of phases, in this case six notches 69. The high stage 71 comprises a number of notches 69 equal to the number of phases less one, i.e. in this case five notches 69.

These storage devices 61 comprise so-called double fitting forms, in order to carry out fitting in series and in parallel of the storage devices 61 with one another. For this purpose, at one of its longitudinal ends, each storage device 61 comprises a type of tongue 76 which is designed to cooperate with a recess 77 with a complementary form of an adjacent storage device 61 positioned in series.

In addition, because of the stepped configuration of the storage devices 61, two storage devices 61 can cooperate with one another by positioning them opposite one another. The positioning is carried out such that the teeth 72 of the low stage 70 of a first storage device 61 are situated opposite the teeth 72 of the high stage 71 of a second storage device 61, and the teeth 72 of the high stage 71 of the first storage device 61 are situated opposite the teeth 72 of the low stage 70 of the second storage device 61. These storage devices 61, between which the winding layer 52 is positioned, can thus ensure guiding and retention of the conductors of the layer 52.

Figure 12A:
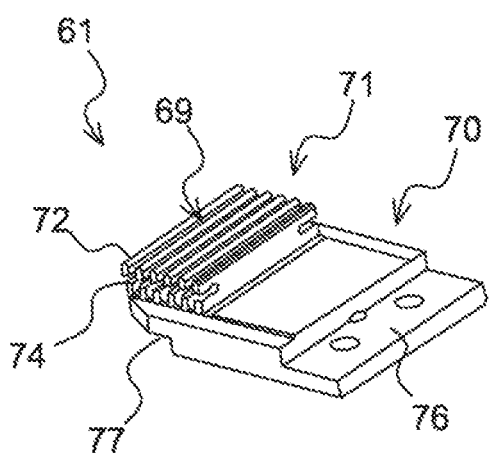
FIGS. 12a and 12b are respectively views in perspective and from the side of a second type of storage device used with the installation in FIGS. 9 and 10.
Figure 12B:
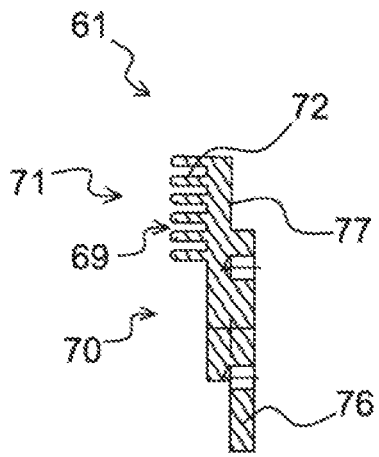

In addition, it is also possible to use another embodiment of the storage devices 61 shown in FIGS. 12a and 12b, with a low stage 70 without a tooth 72. These storage devices 61, which also make it possible to provide double fitting, will be used in an area of level compensation 80 of the winding layer 52, in order to limit the stresses in the conductors of the layer 52 during the winding of the layer 52 around the stator. This is described in greater detail hereinafter.

A description is provided hereinafter of the different steps of the winding method based on the use of a single wire 44 per phase winding E1-E6, i.e. six wires for a hexaphase winding. Persons skilled in the art will be able to adapt the winding to a pentaphase or heptaphase embodiment. The wires 44 can each be obtained from a container, not represented, in which a coil of wire 44 is placed.

More specifically, the method comprises a step of preforming, consisting of displacing the winding unit 54 relative to the bundle of conductors 37, such as to obtain a bundle of conductors 37 which, for each phase winding E1-E6, has at least two loop structures 39 and at least three segment structures 38. Two of the said segment structures 38 are positioned such as to be able to be arranged in the same notch 28 in the stator 15. The two loop structures 39 connect respectively the two segment structures 38 superimposed on the third segment structure 38. The two segment structures 38 are positioned facing one another on both sides of the winding unit 54. This step corresponds to obtaining the irregular part 47 of the winding.

This pre-forming step makes it possible to double the number of conductors 37 relative to the initial number of wires 44, such that the bundle of conductors 37 which supplies the winding unit 54 after this step is equal to 12, as can be seen in FIG. 10.

A formation step is then carried out, consisting of displacing the winding unit 54 relative to the bundle of conductors 37, such as to form on a storage device 61*a* portion of each of the phase windings E1-E6, each comprising two conductors 37 with at least one loop structure 39 and at least two segment structures 38, the said loop structure 39 connecting the two segment structures 38. The step of formation of the phase windings E1-E6 is carried out such that segment structures 38 of two conductors 37 which constitute a single phase winding E1-E6 (i.e. obtained from a single wire 44) are positioned alternately in a lower layer and an upper layer of the winding layer 52. This step corresponds to obtaining the regular winding part 46.

For this purpose, after putting a storage device 61 into place on the winding unit 54 opposite the guide head 57, the maneuvering device 60 is activated, such as to displace in translation the guide head 57 and the associated bundle of conductors 37 relative to the winding unit 54. The bundle of conductors 37 is displaced in the direction opposite the storage unit 65, according to the arrow F1 and according to a step P corresponding to the number of phases, i.e. in this case a step of six notches 69.

A key 66 is put into place on the side opposite the guide head 57, in order to ensure maintenance of the tension of the bundle of conductors 37 during the winding. The winding step is then carried out, consisting of turning the winding unit 54 relative to the bundle of conductors 37 by 180° according to the arrow F2. The bundle of wires 44 is thus unwound, which has the effect of filling the storage device 61.

Then, the unit 55 for conveying conductors 37 and the initial storage device 61 are translated together in the direction of the storage unit of the winding 65 according to the step P corresponding to the number of phases, i.e. in this case a step of six notches. This translation is thus carried out according to the arrow F3.

A new storage device 61 is positioned such that the notches 69 of the high stage 71 of the new storage device 61 are situated opposite the notches 69 of the low stage 70 of the preceding storage device 61, and the notches 69 of the low stage 70 of the new storage device 61 receive the conductors 37 during the next winding.

The preceding steps are repeated until a winding layer 52 is obtained which covers a circumference of the stator 15.

The method additionally comprises a compensation step, consisting of compensating for a change of level of the layer 52 when a winding of the layer 52 covers a circumference of the stator 15. For this purpose, with the formation of the plurality of phase windings E1-E6 being carried out by turning the winding unit 54 in the direction given according to the arrow F2, when the layer 52 has reached a length which is substantially equal to the circumference of the stator 15, the compensation step is carried out, consisting of carrying out a step of formation of the said plurality of phase windings E1-E6 by turning in a direction F2' opposite the said given direction (i.e. a direction of rotation opposite the arrow F2), such as to form at least one loop structure 39 and at least two segment structures 38 for each of the phase windings E1-E6. Once the compensation step has been carried out, the formation of the phase windings E1-E6 is continued around the winding unit 54, by turning in the said given direction according to the arrow F2.

In fact, it is specified that, when the layer 52 is wound around the stator 15, radial offsetting exists at the moment of the change of layer after a circumference of the stator. In fact, the layer 52 must then be superimposed on a layer of the preceding winding.

The compensation step thus makes it possible to produce areas of compensation of level 80 which can be seen in FIGS. 14 and 15*b*, accompanying the radial offsetting of the layer 52 in the location of a change of turn. For this purpose, the areas 80 have a difference of level with a form complementary to the difference of level which exists in the location of a change of turn of the layer around the stator 15. The offsetting of height of the layer of winding 52 corresponds to a height of a layer of conductors 37 of the layer of winding 52. The step of compensation followed by the step of formation thus makes it possible to obtain offsetting of height of two layers of conductors 37.

This therefore minimises the mechanical stresses on the conductors 37 of the layer 52 in the location of a change of layer. Since it is wished to obtain eight layers of conductors 37, and the layer 52 comprises two layers of conductors 37, the layer 52 has a number of areas of compensation 80 equal to the number of layers of conductors C1-C8 required divided by two minus one, i.e. 8/2−1=3.

Figure 13:
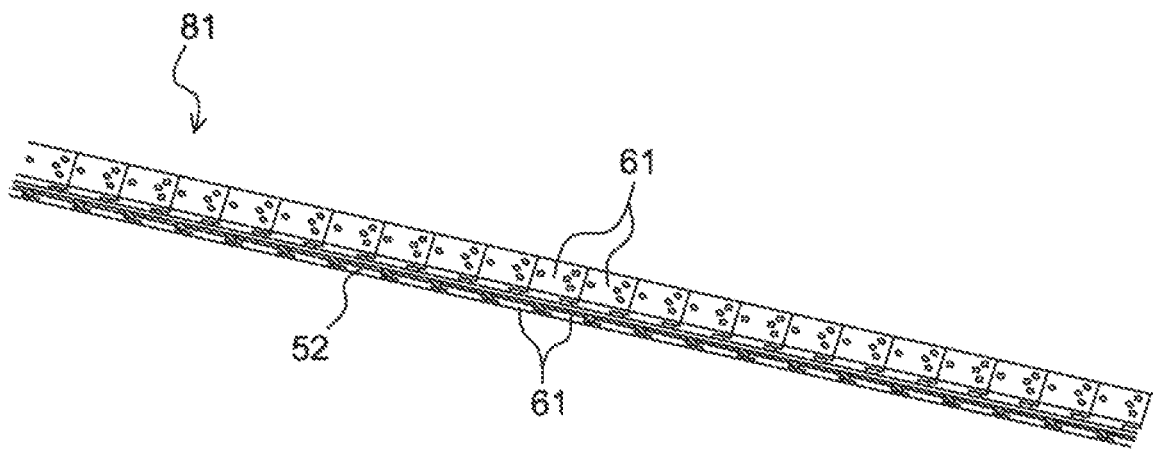
FIG. 13 represents a view in perspective of an assembly of storage devices in FIGS. 11 and 12.

The preceding steps are repeated such as to obtain the layer of winding 52 shown in FIGS. 15*a* and 15*b* positioned in the interior of an assembly 81 of storage devices shown in FIGS. 13 and 14.

It should be noted that there are two ways of producing a layer 52 according to the invention, consisting either of the method previously described, or of a method which requires inversion of the directions of rotation F2 and F2' respectively at the moment of the step of formation and at the moment of the step of compensation.

The layer 52 obtained comprises two layers of conductors, with an irregular part 47 at one of its ends, and at its other end the phase inputs I1-I6 and outputs O1-O6, with the part of the layer which supports these inputs and outputs being known hereinafter in the document as the connections part 73.

Figure 16A:
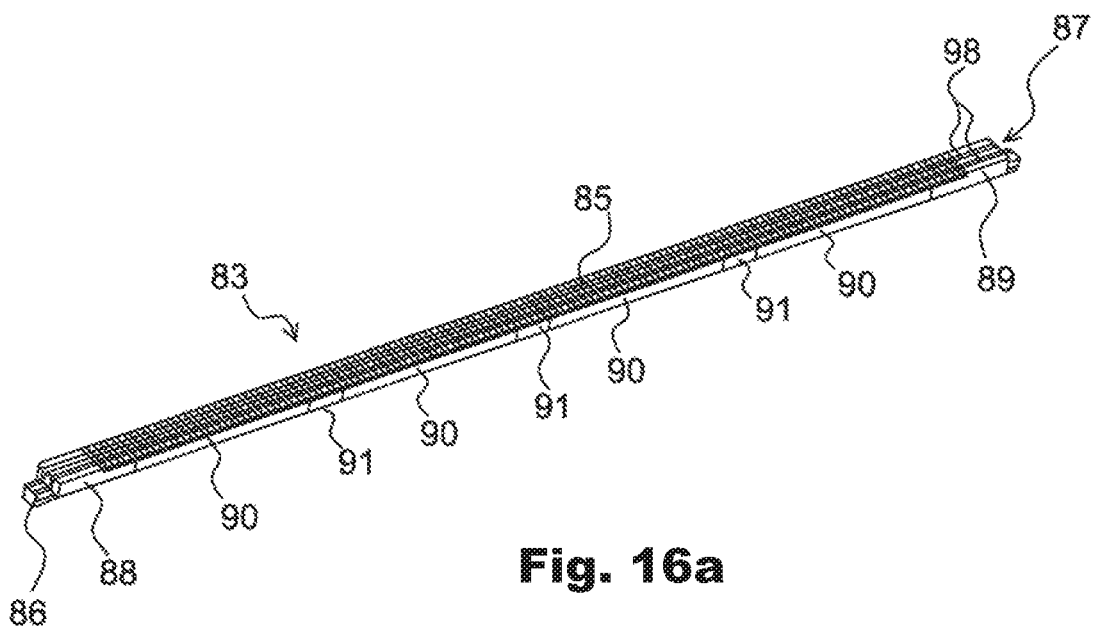
FIGS. 16a and 16b are respectively views in perspective and from the side of a modular comb used to transfer the winding layer to an annular spindle.
Figure 16B:
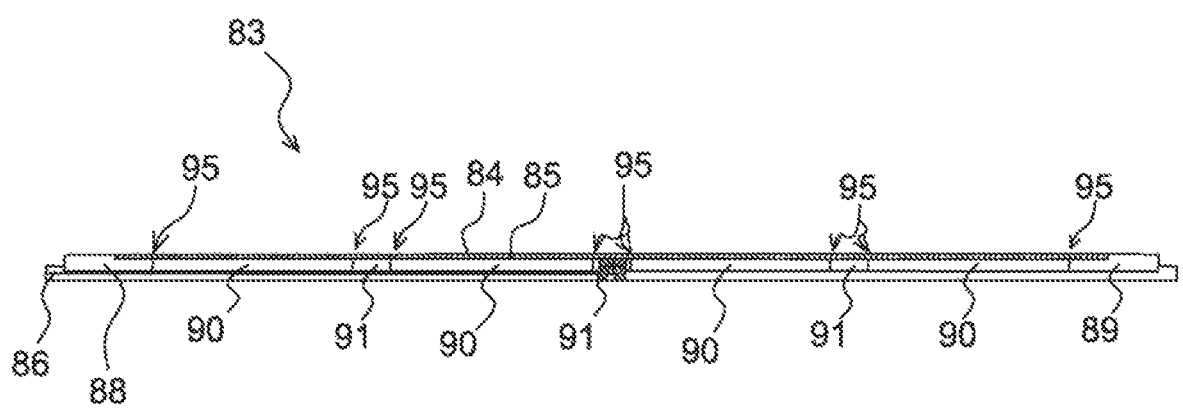

The layer 52 is put into place on a modular transfer comb 83 which can be seen in FIGS. 16*a* and 16*b*, comprising notches 84 which are delimited in pairs by teeth 85. The notches 84 in the comb 83 have dimensions similar to those of the stator 15. The comb 83 is fitted such as to be mobile in translation on a rail 86. For this purpose, the comb 83 comprises in its lower part a cavity 87 which extends longitudinally, and is designed to cooperate with the rail 86.

More specifically, the modular comb 83 consists of two end parts 88 and 89, as well as of a plurality of central 90 and intermediate 91 layer change parts.

Figure 17:
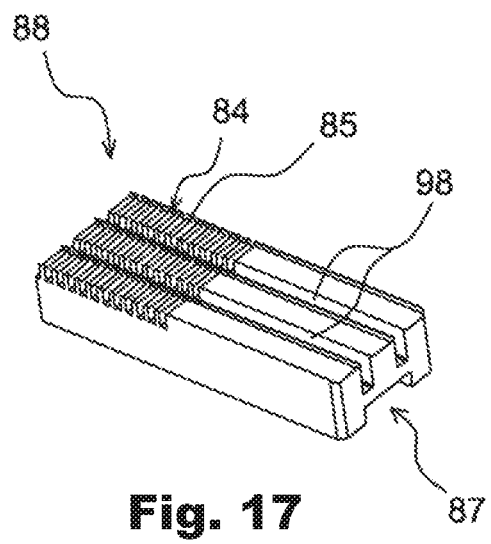
FIGS. 17 to 20 represent views in perspective of the different elements which constitute the modular comb in FIGS. 16a and 16b.
Figure 18:
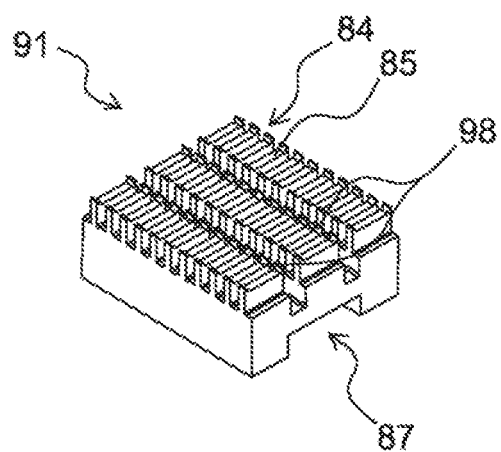
Figure 19:
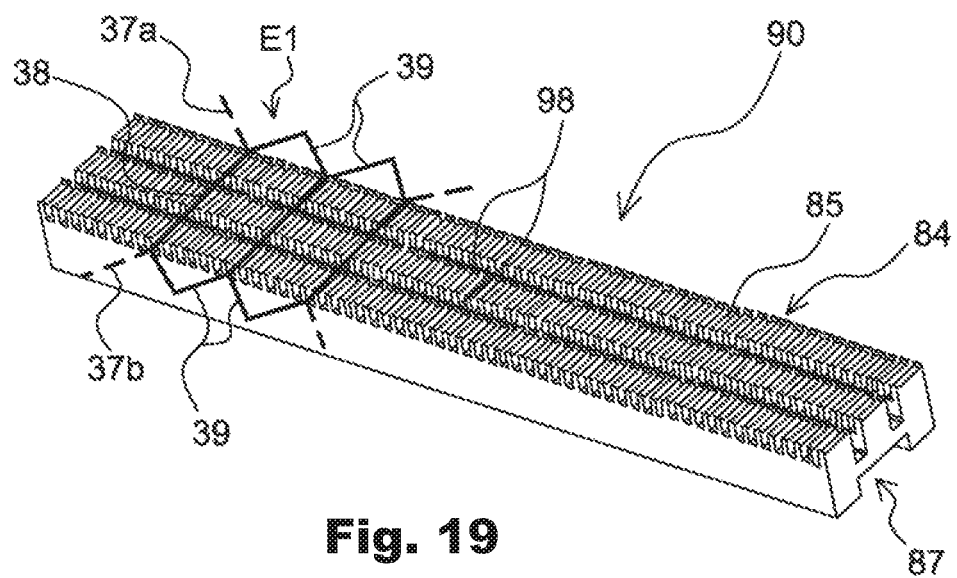
Figure 20:
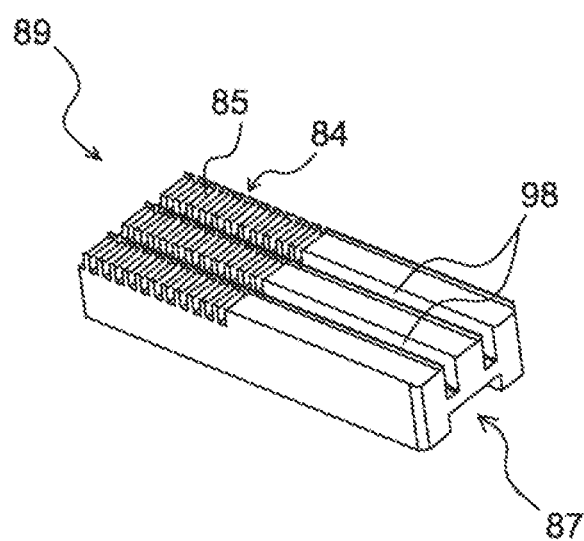

More specifically, the parts 88 and 89, which can be seen respectively in FIGS. 17 and 20, are substantially identical. These parts 88 and 89 are designed to receive respectively the irregular part 47 and the connections part 73. In addition, the central parts 90 are designed to receive the portions of the layer 52 corresponding to a circumference of the stator 15 (cf. FIG. 19), whereas the intermediate parts 91 are designed to receive the areas of compensation 80 (cf. FIG. 18). The central parts 90 and the intermediate layer change parts 91 abut one another alternately.

The modular comb 83 can thus be adapted to the configuration of the winding 17 of the stator 15, in particular to the number of layers C1-C8 and to the circumference of the stator 15, by modifying simply the dimensions and the number of the central parts 90 and the intermediate parts 91. The notches 84 situated at a junction 95 between two parts 88-91 preferably have an opening larger than the other notches 84. In addition, each part 88-91 of the comb 83 preferably comprises longitudinal grooves 98, in this case two of them, in order to permit the passage of guides 107 with an inclined surface, which make possible the transfer of the layer of winding 52 to an annular spindle 105, as described more specifically hereinafter.

The layer of winding 52 comprises two layers of conductors 37 superimposed on one another. A distinction is therefore made between a lower layer of conductors 37 situated on the notch 84 base side of the comb, and an upper layer situated on the notch 84 opening side of the comb.

As can be seen in FIG. 19, each conductor 37 of the layer 52 obtained forms longitudinal undulations comprising in succession a segment structure 38 which is received in an associated notch, a loop structure 39 which extends opposite the lower lateral face of the comb 83, a consecutive segment structure 38 which is received in an associated consecutive notch 84, and a loop structure 39 which extends opposite the upper lateral face of the comb 83.

The loop structures 39 are arranged alternately on both sides of the comb 83, i.e. they are offset longitudinally by a step equivalent to the distance between two consecutive segment structures 38.

In a manner similar to those of the stator 15 body 16, the notches 84 in the comb are associated in series with the conductors 37 of a phase winding E1-E6. Thus, the notches 84 of a series of notches 84 receive the segment structures 38 of the conductors 37 constituting a phase winding E1-E6. Each series of notches 84 is associated with one of the six phase windings E1-E6. Thus, two consecutive notches 84 of a single series of notches 84 are separated by notches, each of which belongs to one of the other series of notches 84. The notches 84 of each set of notches associated with a phase winding E1-E6 are thus distributed on the transfer comb 83 with a constant step which is equal to the number of phases, i.e. in this case with a step of six notches 84. In other words, the segment structures 38 are inserted in the notches 84 in the comb with a polar step which is equal to the polar step of the stator 15.

In a phase winding E1-E6, the successive segment structures 38 of a single conductor 37 are positioned alternately in an inner layer and an outer layer on most of the length of the comb 83. Thus, for a pair of conductors 37a, 37b obtained from a single wire 44 and in a given notch in the series, the segment structure 38 of the conductor 37a is in the layer C1, whereas the segment structure 38 of the conductor 37b is situated in the layer C2. The segment structure 38 of the conductor 37a is in the layer C2 of the successive notch in the series, whereas the segment structure 38 of the conductor 37b is situated in the layer C1. In all cases, the two segment structures 38 are superimposed on one another in each notch 84.

In addition, for two adjacent notches 84 of a series of notches associated with a phase winding E1-E6, the layer of winding 52 has two loop structures 39 situated on both sides of the comb 83 connecting segment structures 38 which are situated in the said adjacent notches 84. Thus, the loop structure 39 of one of the conductors 37a which connects the segment structures 38 received in the two aforementioned adjacent notches 84 is arranged axially above the upper face of the body 16, whereas the loop structure 39 of the other conductor 37b which connects the segment structures 38 received in the two aforementioned adjacent notches 84 is arranged axially below the lower face of the body 16. The relationship is inverted for the two following adjacent notches 84.

In addition, for two adjacent notches 84 in the series associated with a phase winding E1-E6, the loop structure 39 of the conductor 37a connects a segment structure 38 belonging to the lower layer of the layer 52 to a segment structure 38 belonging to an upper layer of the layer 52, whereas the loop structure 39 of the other conductor 37b connects a segment structure 38 belonging to an upper layer of the layer 52 to a segment structure 38 belonging to a lower layer of the layer 52. The relationship is inverted for the two following adjacent notches 84.

The winding layer 52 also has a discontinuity. In fact, the layer 52 comprises a so-called "regular" part in which the segment structures 38 of each phase winding E1-E6 are each connected, via loop structures 39, to two segment structures 38 which are situated in two different notches 84. The layer 52 also comprises a so-called "irregular" part obtained upon completion of the pre-forming step, in which at least one segment structure 38 of each phase winding E1-E6 is connected to two segment structures 38 which are superimposed axially relative to one another in a single notch 84. In addition, the areas of compensation 80 previously described are situated in the intermediate parts 91 of the comb 83.

The number of notches 84 in the comb 83 corresponding to the length of the winding layer 52 is determined according to the number of layers of conductors 37 of each phase winding E1-E6, and according to the number of notches 28 in the body 16, such that the layer 52 makes it possible to form a whole number of layers of conductors. In the case when it is wished to form eight layers of conductors 37 on a body 16 comprising 96 notches, the comb 83 comprises 96×4+5=390 notches. The number 6 corresponds to the six notches of the irregular part 47, in the case of a hexaphase stator. In other words, the length of the winding layer 52 is substantially equal to N/2 times the circumference of the stator 15, N being the number of layers of conductors 37 required in the wound stator 15. N is equal to two or more.

Figure 21:
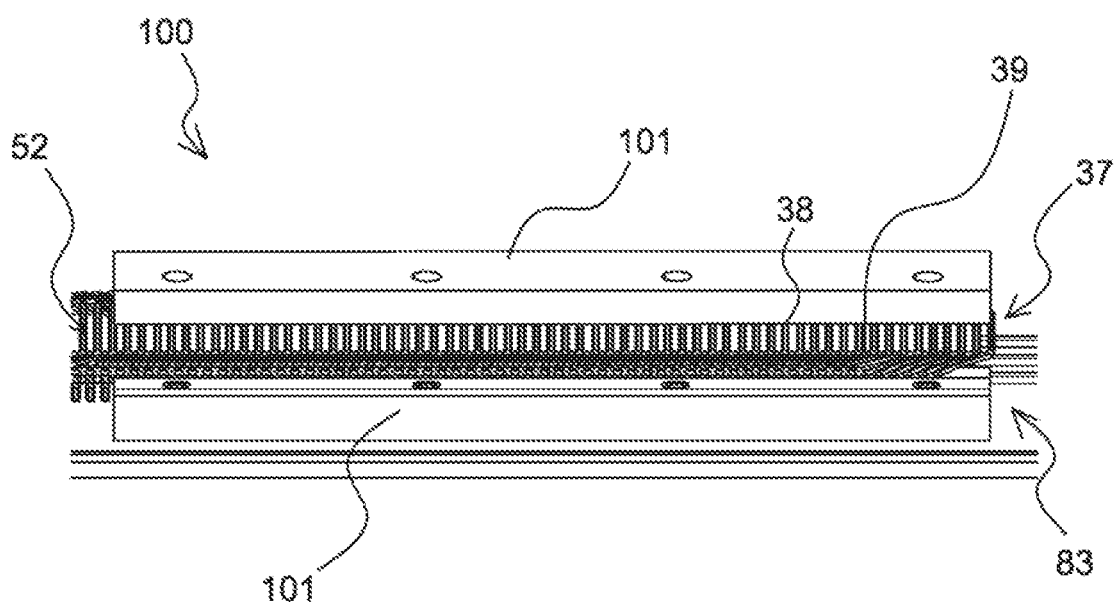
FIG. 21 is a view in perspective of the tool, making it possible to carry out a first step of forming of the chignon of the winding on the transfer comb.

Preferably, a step is also carried out of pressing the chignons of the winding 17 by means of a forming tool 100 shown in FIG. 21. This forming tool 100 comprises for this purpose two clamping plates 101, between which there are positioned the loop structures 39 which extend projecting from a side of the comb 83, before controlled compression of the said loop structures 39 between the two plates 101 according to an axial direction. This therefore reduces the thickness of the layer 52, in order to obtain the required chignon dimension. The modular comb 83 also makes it possible to maintain the spacing of the conductors 37 during the forming of the chignon.

After the winding layer 52 has been put into place on the transfer comb 83, and the step of forming of the chignons, the method for production of the wound stator 15 comprises a step of transfer of the conductors 37 of the layer 52 situated in the notches 84 in the comb 83 to the annular spindle 105. This step consists globally of winding the layer 52 of conductors 37 around the annular spindle 105 in order to form the layers of the phase windings E1-E6. This winding of the layer 52 can be carried out starting with one of the two ends of the layer 52, i.e. the irregular part 47, or the connections part 73.

Figure 22:
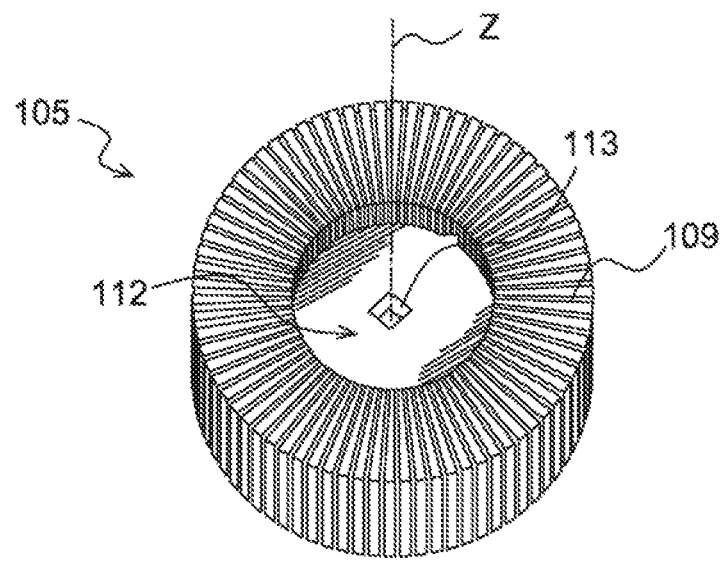
FIG. 22 is a schematic representation of the annular spindle around which the layer of winding is wound before the transfer by expansion to the stator body.
Figure 23:
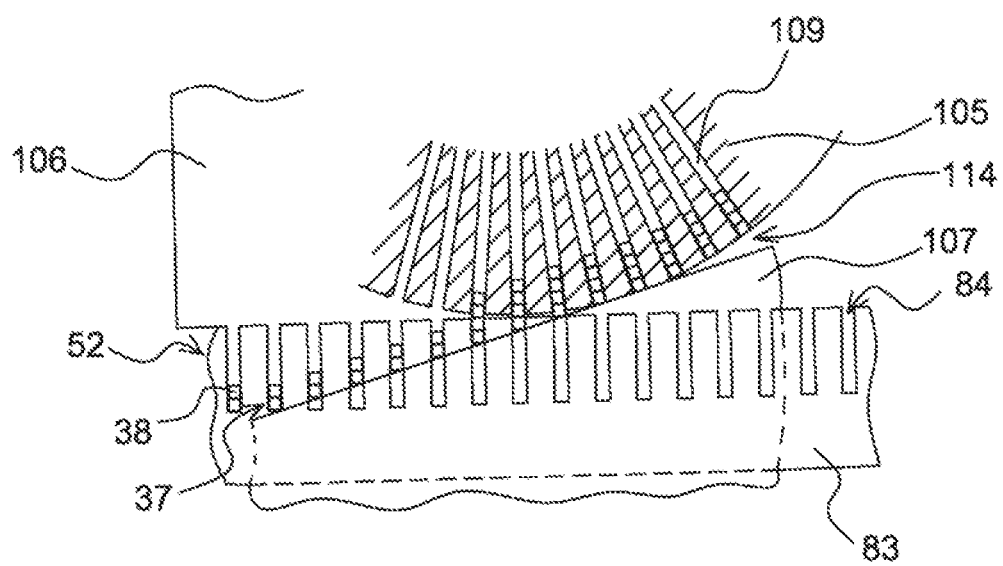
FIG. 23 is a schematic representation of an installation for implementation of the first step of transfer of the conductors from the winding layer to the annular spindle in FIG. 22.

FIGS. 22 and 23 represent the different elements which make it possible to implement this step consisting of an annular spindle 105, a casing 106 for guiding of the annular spindle 105 in displacement relative to the transfer comb 83, and two longitudinal guides 107.

As can be seen in greater detail in FIG. 22, the annular spindle 105 is an element of revolution with a main axis Z which comprises notches 109 provided in the outer cylindrical face of the annular spindle 105, and opening axially into the axial end faces of the annular spindle 105.

The distance between the outer radial ends of two adjacent notches 109 of the annular spindle 105 is equal to the distance between two adjacent notches 84 in the transfer comb 83. The number of notches 109 in the annular spindle 105 is equal to the number of notches 28 in the stator 15 body 16, i.e. in this case the annular spindle 105 comprises 96 notches.

The annular spindle 105 additionally comprises a central hub 112 which is secured on the inner cylindrical face of the annular spindle 105. This hub 112 is provided with a central opening 113 which permits the passage of a shaft (not represented) in order to permit driving in rotation of the annular spindle 105 around its axis Z.

The casing 106 comprises a bore 114 which is coaxial to the annular spindle 105, and in which the annular spindle 105 is received such as to be free to rotate around its axis Z. The bore 114 in the housing 106 opens into the lower face of the housing 106, in order to permit the transfer of the conductors 37 to the annular spindle 105.

The guides 107 are designed to be received in the longitudinal grooves 98 in the transfer comb 83. Thus, the transfer comb 83 is guided longitudinally without play during this step of transfer of the winding layer 52 around the annular spindle 105.

Each guide 107 comprises an upper face in the form of a ramp, the inclination of which is determined such that each upper face can be supported below the segment structures 38 of the conductors 37, such as to drive the conductors 37 progressively upwards, for their transfer to the annular spindle 105.

According to the embodiment represented in FIG. 23, the upper face of each guide 107 is flat, and is inclined relative to a horizontal plane. However, it will be understood that the form of the upper face of each guide 107 can be different, for example the upper face can be convex curved upwards, concave open at the top, or it can form two inclined planes according to different angles.

More specifically, the transfer step consists of rolling the annular spindle 105 on the upper face of the transfer comb 83, such that the notches 109 in the annular spindle 105 come successively opposite the notches 84 in the transfer comb 83, and without sliding of the annular spindle 105 relative to the transfer comb 83. For this purpose, one of the two ends of the layer 52 is positioned in the vicinity of the spindle 105, which receives firstly either the irregular part 47 or the connection part 73.

During the rolling of the annular spindle 105, the comb 83 which is fitted on the rail 86 is displaced relative to the guides 107 in a manner which is synchronised with the rotation of the annular spindle 105. The upper face of each guide 107 is then supported at the top against the segment structures 38 of the conductors 37 which are situated at the lower end of each notch 84 in the transfer comb 83. Thus, the upper faces of the guides 107 make it possible to transfer simultaneously the segment structures 38 and the loop structures 39 of the conductors 37 which form the two layers of the winding layer 52.

As previously stated, the annular spindle 105 comprises a number of notches 109 which is equal to the number of notches 28 in the stator 15 body 16, and the transfer comb 83 comprises a number of notches 84 which is greater than the number of notches 28 in the body 16.

Consequently, the annular spindle 105 carries out a plurality of turns around its axis Z when it is rolled on the upper surface of the transfer comb 83, and the layer 52 with its two layers of conductors 37 is wound around the spindle 105, forming coaxial spirals.

Since the annular spindle 105 carries out a plurality of turns around its axis Z, each of the notches 109 receives in succession the segment structures 38 which were received in a plurality of notches 84 in the transfer comb 83. In this case, the annular spindle 105 carries out four turns at the irregular part 47 around its axis Z, such that each notch 109 in the spindle 105 receives eight segment structures 38 (two per turn). This therefore provides a winding with eight layers of conductors 37.

In addition, the width of each notch 109 in the annular spindle 105 is substantially equal to the width of each of the conductors 37. Consequently, the segment structures 38 of the conductors 37 are superimposed radially in the notches 109 in the annular spindle 105 according to a single column.

Figure 32:
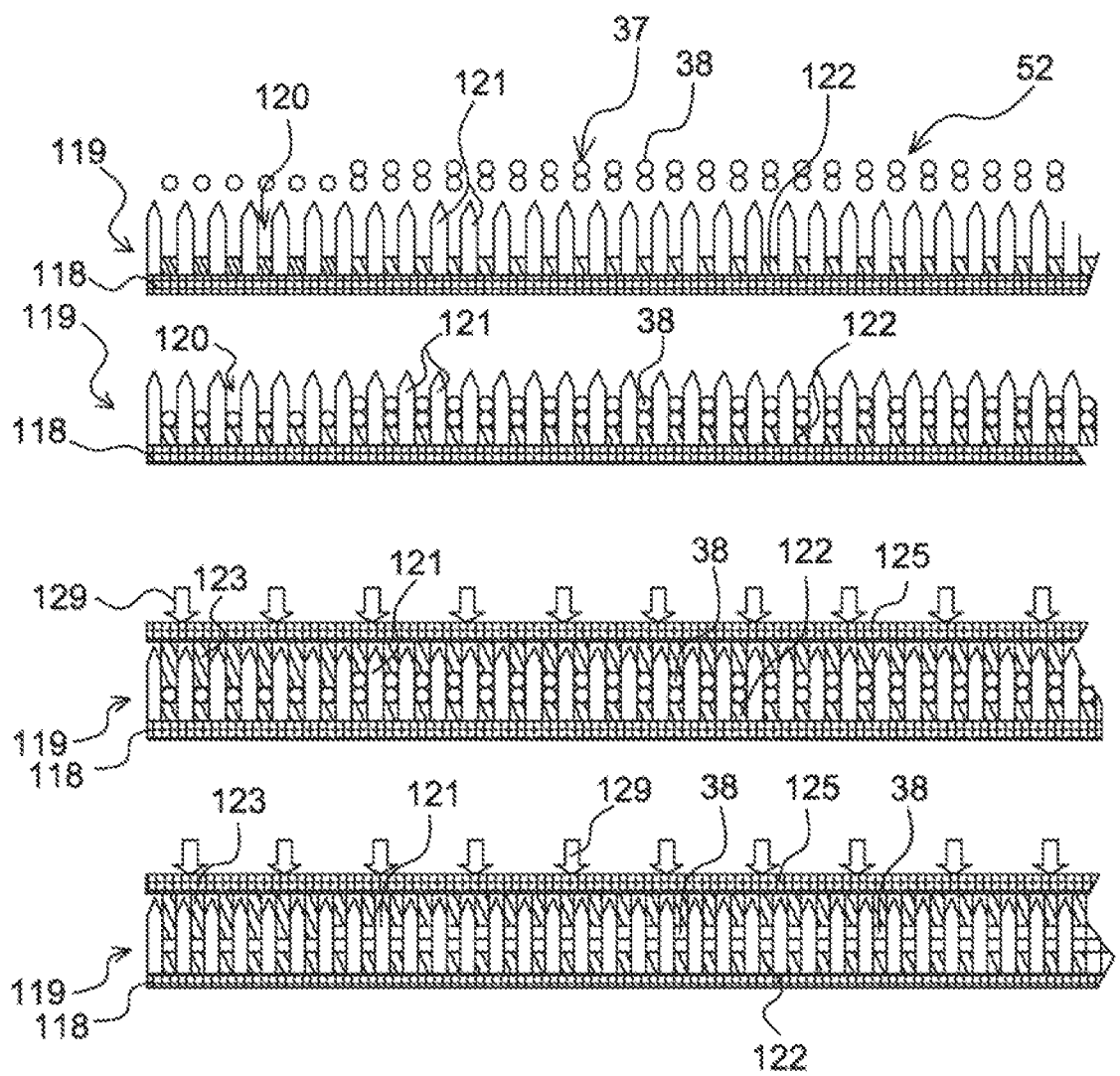
FIG. 32 represents a step of stamping of the segment structures of the conductors of the winding layer.

In the case when the wire 44 used is a wire with a round cross-section, before the transfer of the layer 52 to the spindle 105, a step is carried out of stamping the segment structures 38 shown in FIG. 32. For this purpose, the winding layer 52 is put into place on a stamping comb 119 comprising notches 120 which are delimited in pairs by braces 121 obtained from a magnetic plate 118.

The braces 121 are preferably profiled on their free end side, such that each notch 120 has a widened end in order to facilitate the insertion of the segment structures 38 inside the notches 120 in the comb 119. Added-on lower wedges 122 will previously have been positioned at the base of the notches 120 in the comb, before the insertion of the segment structures 38.

Added-on upper wedges 123 are put into place above the segment structures 38. A width of the lower 122 and upper 123 wedges corresponds to a required width of the conductors 37 after stamping. The upper wedges 123 have a form complementary to the notches 120 in the comb 119.

An upper plate 125 then ensures compression of the segment structures 38 between the lower wedges 122 and the upper wedges 123. For this purpose, clamping means 129 ensure that the plates 118 and 125 are brought towards one another, which has the effect of transforming the initial round cross-section of the segment structures 38 of the layer 52 into a cross-section with a square or rectangular form.

The use of the added-on wedges 122, 123 makes it possible to control the deformation of the segment structures 38, and to facilitate the release of the conductors 37 from the die after the upper plate 123 has been raised.

It will also be noted that a configuration of this type makes it possible to maximise the filling of the notches 28 in the stator 15, whilst facilitating the formation of the winding chignons, in which the round cross-section of the conductors 37 facilitates the folding in order to form the winding 17 wave.

As a variant, only the lower wedges 122 are used, the segment structures 38 then being compressed between the teeth of the upper plate 125 and the lower wedges 122.

As a variant, the stamping step is carried out on a winding layer 52 comprising a single layer of conductors 37, i.e. a single conductor 37 per notch in the comb 119.

Since the winding 17 is produced from copper wires 44, the method comprises a step of heating to at least 150° C., for example 280° C., of the winding 17, before the stamping, in order to limit the macroscopic deformation of the copper. The method can also comprise a step of annealing after the stamping, such that the copper regains its initial macroscopic structure.

As a variant, the winding is produced from aluminium wires. As a variant, the stamping step can also be implemented directly in the transfer comb 83.

Alternatively, the stamping step is carried out before the step of formation of the winding layer 52. The stamping can then be carried out by a set of rotary rollers 135 between which a linear conductor 37 passes. For this purpose, the set of rollers 135 comprises a first pair of vertical rollers 136 with a horizontal axis, and a second pair of horizontal rollers 137 with a vertical axis. The rollers 136, 137 of each pair are positioned opposite one another, whilst being slightly offset from one another in order to permit the rolling of the conductor 37.

The length of the stamped portions and the length of the non-stamped portions depends on the dimensions of the stator 15, in particular on the length of the notches 28 and the distance between two successive notches 28 in a series of notches associated with a phase winding E1-E6.

Figure 33:
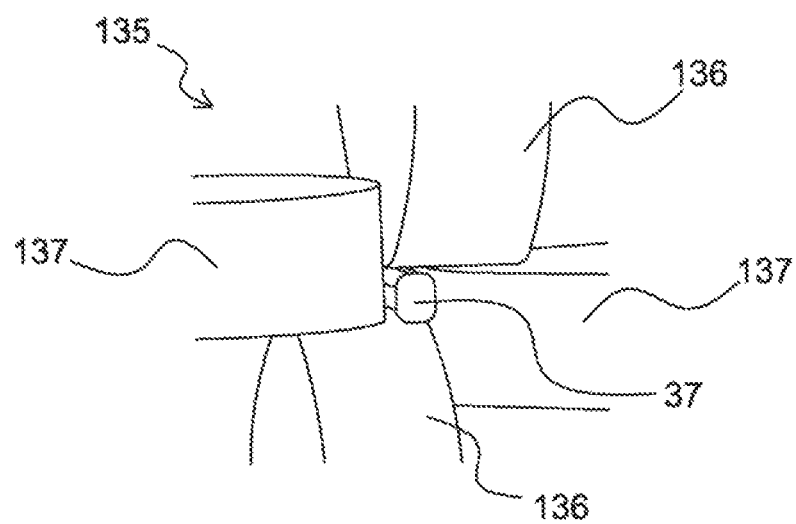
FIGS. 33 and 34 show two variant embodiments of the tooling which makes it possible to carry out stamping of the continuous wire according to the method of the invention.
Figure 35A:
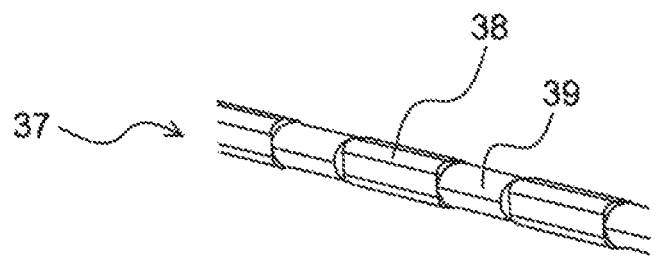
FIG. 35a is a view in perspective of the wire obtained upon completion of the stamping step carried out with one of the tools in FIGS. 33 and 34.
Figure 35B:
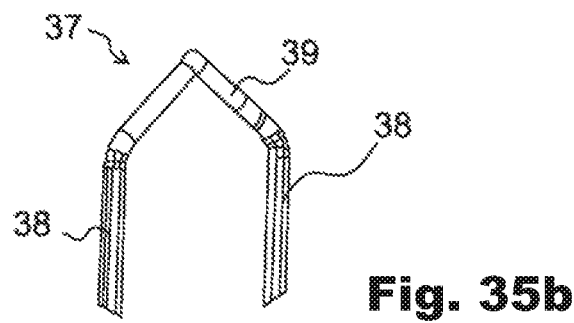
FIG. 35b is a view in perspective of a portion of a stamped phase winding wire provided with two segment structures and a loop structure.

Thus, the rollers 136, 137 will be in the stamping position along the length of the notches 28, as represented in FIG. 33. The rollers 136, 137 will then be spaced from the conductor 37 on the length of the chignons corresponding to the length between two successive notches 28. This therefore provides the conductor 37 shown in FIG. 35*a*, which comprises stamped parts corresponding to the segment structures 38, and non-stamped parts corresponding to the loop structures 39. The conductor 37 can thus be formed in the winding layer 52 according to FIG. 35*b*, with two parallel segment structures 38 connected to one another by a loop structure 39.

Figure 34:
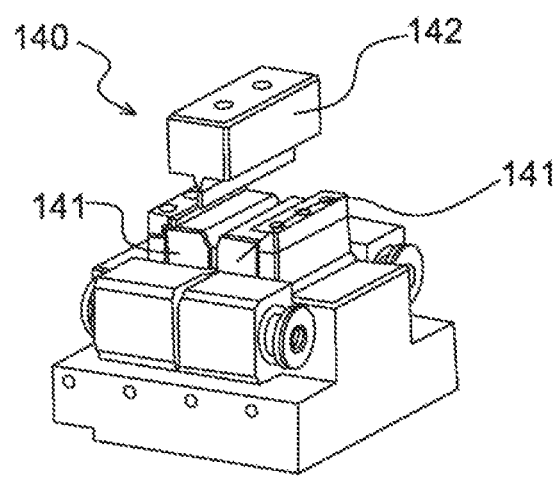

In the embodiment in FIG. 34, the stamping is carried out by pressing by means of a device 141 provided with two symmetrical clamps 141 which are mobile radially, and a compression element 142 which makes it possible to carry out deformations of the conductor 37 on four faces. The two clamps 141 form a slight angle between one another, such as to facilitate exit of the segment structures 38 of the conductor 37 after stamping.

The stamping can also be carried out on a bundle of conductors 37 in parallel by means of the comb 119 as previously described, or by means of a series of sets of rotary rollers 135 or devices 141.

As previously stated, it will be possible to carry out a heating step, and if applicable an annealing step, before and after the step of stamping and/or the step of forming the chignons.

Figure 24A:
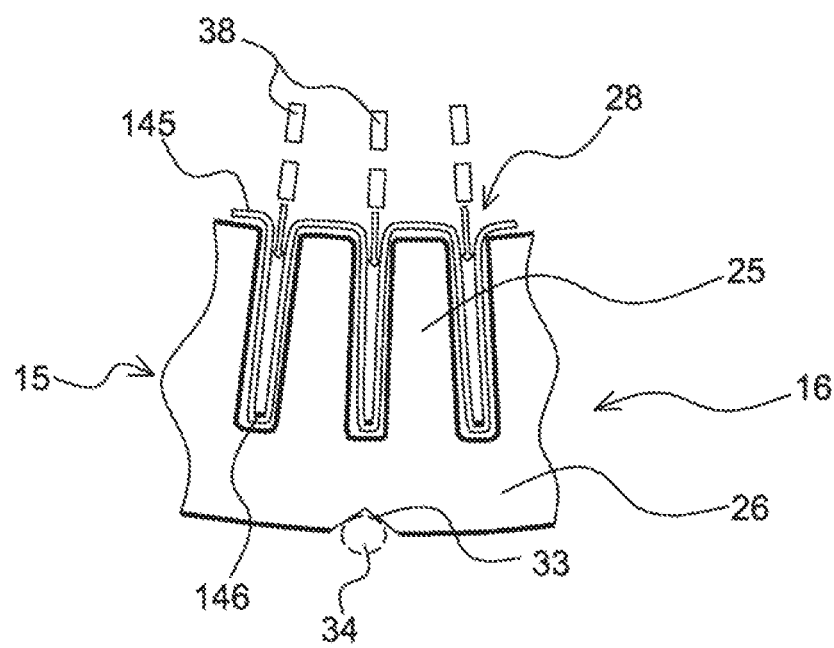
FIG. 24a represents schematically the step of putting a continuous notch insulator into place in the interior of the notches in the stator according to the present invention.

In addition, as can be seen in FIG. 24*a*, the method comprises a step of putting a continuous notch insulator 145 into place inside the notches 28 in the stator 15. For this purpose, gauges 34 cooperate with the recesses 33 in the outer indexing means 32, such as to position a notch 28 in the stator 15 facing the continuous notch insulator 145. A wedge 146 which is displaced radially from the interior to the exterior of the stator 15 then ensures placing of the notch insulator 145 against the inner walls of each notch 28. The notch insulator 145 thus covers the inner faces opposite of the notch 28, as well as the base of the notch 28 corresponding to the part of the inner periphery of the yoke 26 which extends between two consecutive teeth 25. The operation is recommenced by positioning a new notch 28 facing the notch insulator 145, until all the notches 28 are covered by the continuous notch insulator 145.

Figure 26A:
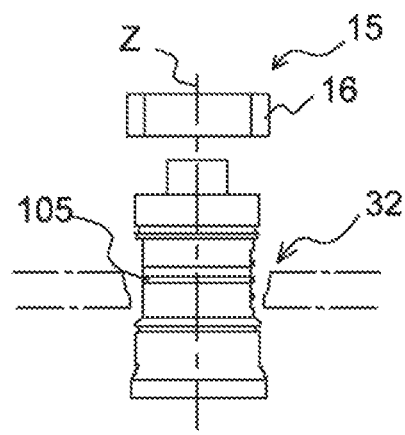
FIGS. 26a and 26b represent the step of putting the stator into place around the annular spindle in order to carry out the transfer of the winding by expansion from the annular spindle to the stator.
Figure 26B:
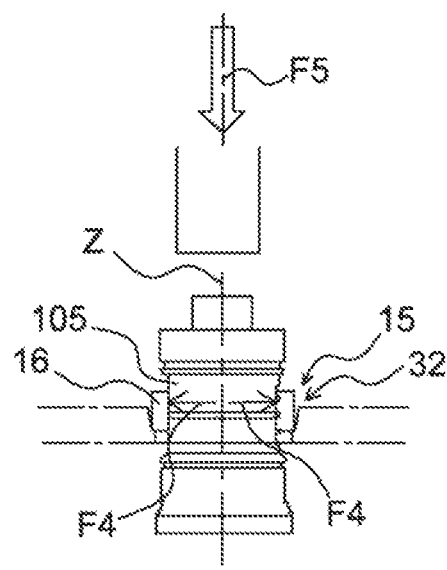

In fact, once the notch insulator 145 has been put into place inside the notches 28, a step is carried out of transfer of the winding 17 from the annular spindle 105 to the stator 15 body 16, as shown in FIGS. 26*a* and 26*b*. The outer indexing means 32 make it possible to ensure accurate positioning of the annular spindle 105 around the stator 15 body 16. The annular spindle 105 is received coaxially on the body 16, in the circular receptacle which is delimited by the inner cylindrical face of the body 16. The diameter of the outer cylindrical face of the annular spindle 105 is globally equal to the diameter of the inner cylindrical face of the body 16.

The means 32 for indexing of the stator 15 also make it possible to position the stator 15 angularly relative to the annular spindle 105 around its axis Z, such that each notch 109 in the annular spindle 105 is opposite a notch 28 in the body 16, as can be seen in FIGS. 26*a* and 26*b*.

Figure 27A:
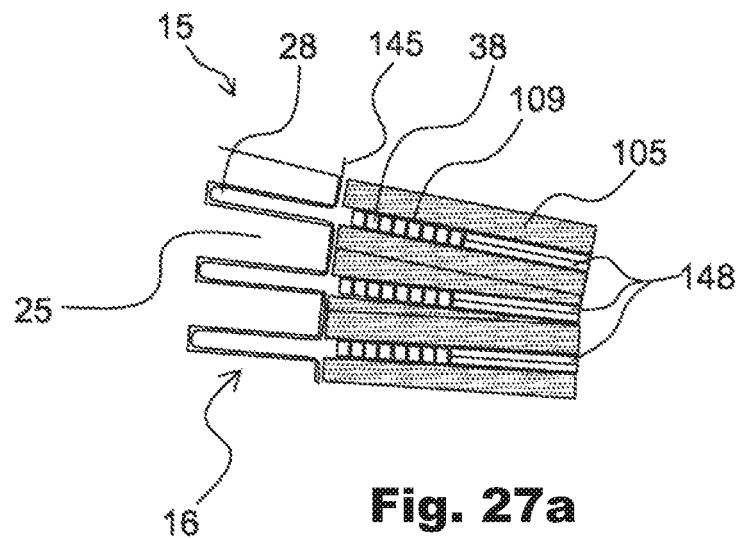
FIGS. 27a and 27b are schematic representations of the extraction blades shown respectively in the initial position and approaching the final position, in which the winding has been transferred onto the stator body.
Figure 27B:
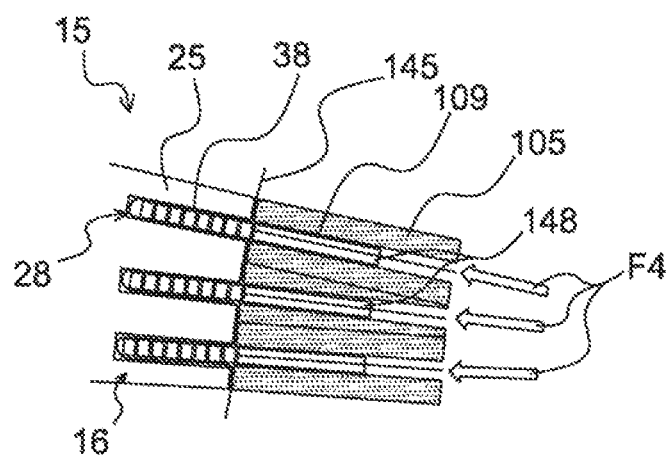

The installation also comprises blades 148 for radial insertion which can be seen in FIGS. 27*a* and 27*b*, each extending on a plane which is radial relative to the axis X, Z of the spindle 105 and of the body 16. An insertion blade 148 is associated with each notch 109 in the annular spindle 105. The plates 148 are identical, and are distributed angularly around the axis Z of the annular spindle 105. In this case, the annular spindle 105 comprises 96 notches, and the installation consequently comprises 96 insertion blades. These blades 148 extend on the median radial plane of the associated notch 109, and the thickness of each blade 148 is slightly smaller than the width of the associated notch 109.

More specifically, as can be seen in FIG. 27*a*, at the start of the transfer step, each blade 148 is situated radially such that the outer radial end edge of each blade is situated at the innermost layer of conductors situated in the spindle 105.

When the transfer step is implemented by expansion of the conductors 37, the insertion blades 148 are displaced radially relative to the axis Z of the annular spindle 105 according to the arrow F4, such that each blade 148 is displaced radially in the associated notch 109 towards the exterior of the annular spindle 105, simultaneously entraining the segment structures 38, such that these segment structures 38 are displaced in the associated notch 28 in the body 16, thus forming the segment structures 38 of the phase windings E1-E6. The displacement of the blades 148 is obtained by applying an axial force according to the arrow F5 (cf. FIG. 26*b*) which is transformed by a mechanical system into a radial force applied to the blades 148 according to the arrow F4.

On completion of the transfer phase, each blade 148 is situated radially relative to the axis Z of the annular spindle 105, such that its outer radial end edge is situated globally at the outer cylindrical face of the annular spindle 105. All the segment structures 38 which had been received in each notch 109 in the annular spindle 105 have migrated into an associated notch 28 in the body 16.

This therefore provides the wound stator 15 previously described. It will be noted that the segment structures 38 of the winding which are situated at the outer periphery of the spindle 105 are located by translation at the outer periphery of the stator 15. Similarly, the segment structures 38 of the winding which are situated at the inner periphery of the spindle 105 are located by translation at the inner periphery of the stator 15.

According to a preferred embodiment, all the insertion blades 148 are entrained simultaneously in radial displacement towards the exterior into the associated notches 109 in the annular spindle 105. Thus, all the segment structures 38 are transferred simultaneously. The width of each notch 28 in the body 16 is substantially equal to the width of each conductor 37, such that the radial stack of the conductors 37 according to a single column is conserved in the notches 28.

It will also be noted that the use of the continuous notch insulator 145 makes it possible to guarantee correct positioning of the notch insulator 145 inside the notches 28 during an insertion of the segment structures 38 of the winding 17, since the ends of the notch insulator 145 which are situated on the radial open side of each notch 28 along the corners of the teeth 31 are connected to one another, and therefore cannot be thrust back towards the base of the notches 28 during the insertion of the segment structures 38.

Figure 24B:
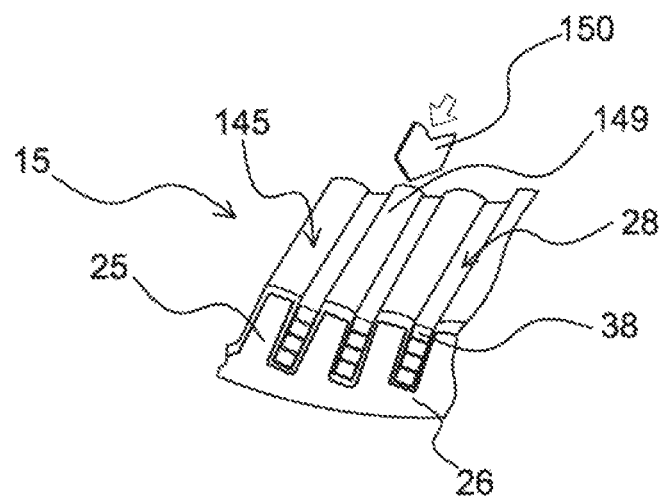
FIG. 24b represents schematically the step of cutting the notch insulator after insertion of the conductors of the winding in the notches in the stator according to the present invention.

Once the step of transfer of the winding 17 has been carried out, a step is carried out of cutting the notch insulator 145 shown in FIG. 24b. The purpose of this step is to remove the parts 149 of the notch insulator 145 which extend between two successive notches 28, i.e. the parts 149 of the notch insulator 145 which extend against the inner face of each tooth 25. The step of cutting the notch insulator 145 is carried out by means of a mechanical tool 150 or by laser. The notch insulators thus individualised, situated inside each notch 28, will thus have cutting tracks along the rounded inner corners of the teeth 25 which are situated on the axis X side of the stator 15.

Figure 25A:
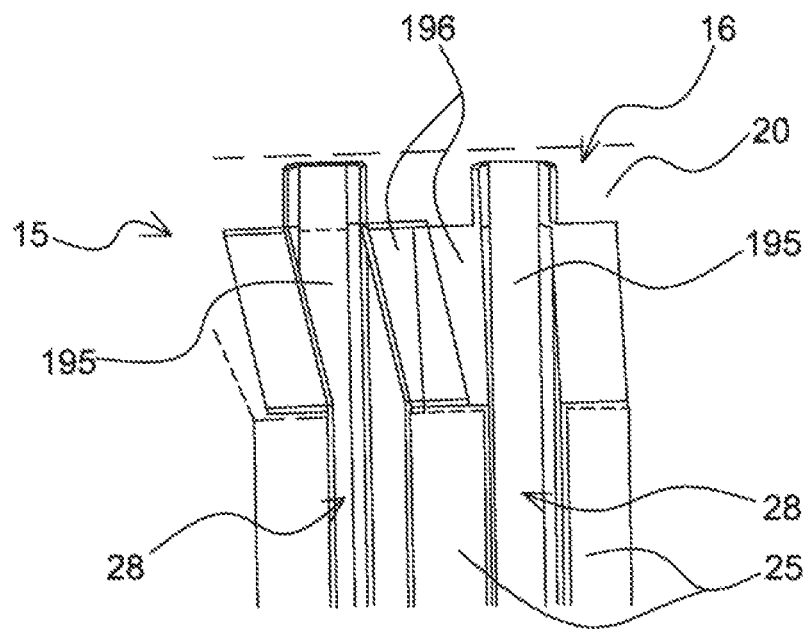
FIGS. 25a and 25b are respectively views in perspective and from above of a stator according to the present invention provided with notch insulators produced according to a second embodiment.
Figure 25B:
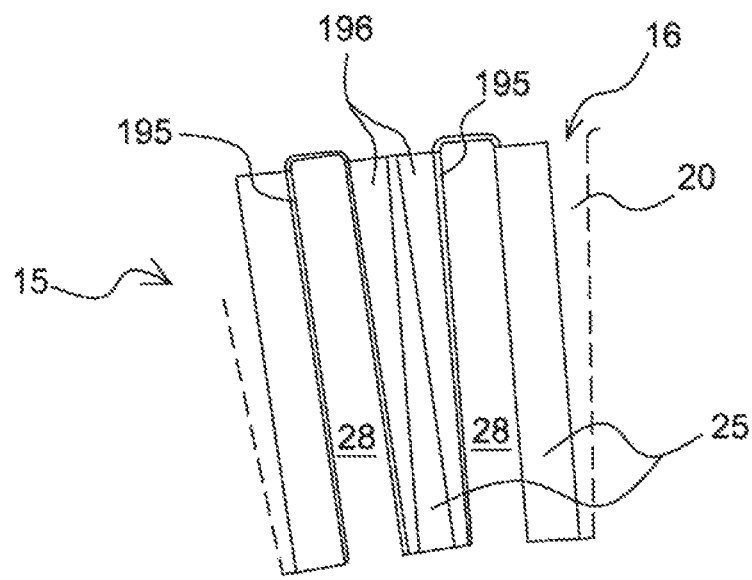

As a variant, in the embodiment shown in FIGS. 25a and 25b, individual notch insulators 195 are inserted in the notches 28 in the stator 15. Two consecutive notch insulators 195 are welded to one another in order to ensure retention of the notch insulators 195 inside the notches 28 during insertion of the conductors 37 of the winding 17.

For this purpose, each notch insulator 195 comprises walls which are designed to cover the inner faces of the notches 28 opposite, as well as the base of the notch 28. In addition, each notch insulator 195 comprises fins 196 obtained from the walls, placed against the inner faces opposite. These fins 196 are folded back and placed against at least one axial end radial face of the stator body 16. The fins 196 of each notch insulator 195 are welded together with the corresponding fins 196 of adjacent notch insulators 195. In other words, two adjacent fins 196 of two adjacent notch insulators 195 are welded to one another.

The notch insulators 195 can be welded to one another on a single side of the stator 15 or on both sides of the stator 15. Preferably, in order to facilitate the welding, the fins 196 are superimposed on one another. As a variant, the welding is carried out edge to edge.

Figure 28:
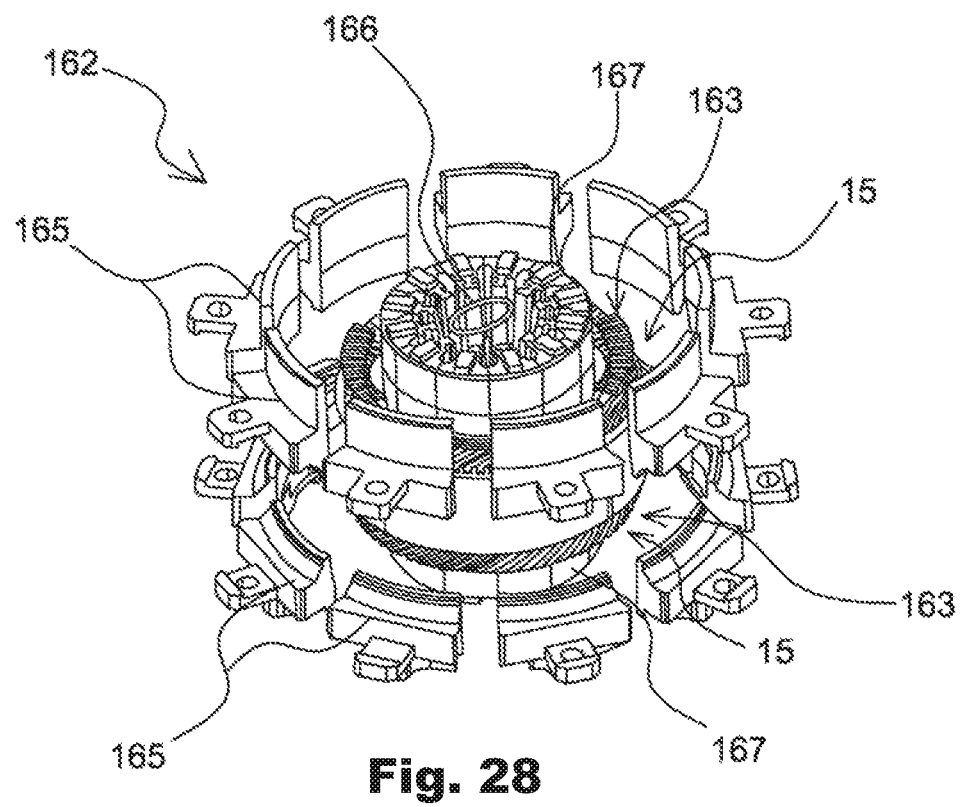
FIG. 28 is a view in perspective of the tooling which makes it possible to carry out the step of forming of the chignons after production of the wound stator.

A step is preferably carried out of pressing the winding chignons 163 formed by the loop structures 39 extending on both sides of the stator 15, by means of a tool 162 shown in FIG. 28.

For this purpose, the tool 162 comprises a plurality of fixed retention elements 165, which are designed to be put into place against an outer periphery of each winding chignon 163. These elements 165 are positioned side-by-side according to an annular form.

A central cam 166 is then turned such as to displace pressing elements 167 radially in succession in the direction of the corresponding retention element 165.

The winding chignons 163 are thus pressed by successive parts, each part being pressed between the retention element 165 and the corresponding pressing element 167 which is then in a so-called "active" position. The pressing elements 167 can comprise return means in order to make them return from their active position to their initial position, once they have been displaced by the cam 166.

In addition, since the teeth 25 of the stator 15 are without tooth roots, in order to facilitate the insertion of the segment structures 38, a step of deformation is preferably carried out, by means of a punch 170, of segment structures 38 situated in the radial layer of conductors 37 closest to an axis of the stator 15. This deformation step illustrated in FIGS. 29a to 29c makes it possible to guarantee the retention of the segment structures 38 inside the notches 28, before carrying out the impregnation step. In fact, the deformation by means of the punch 170 permits creeping of the material towards the inner faces of the notches 28, such that the deformed edges of the segment structures 38 are supported against the inner faces of the notches 28.

Figure 29A:
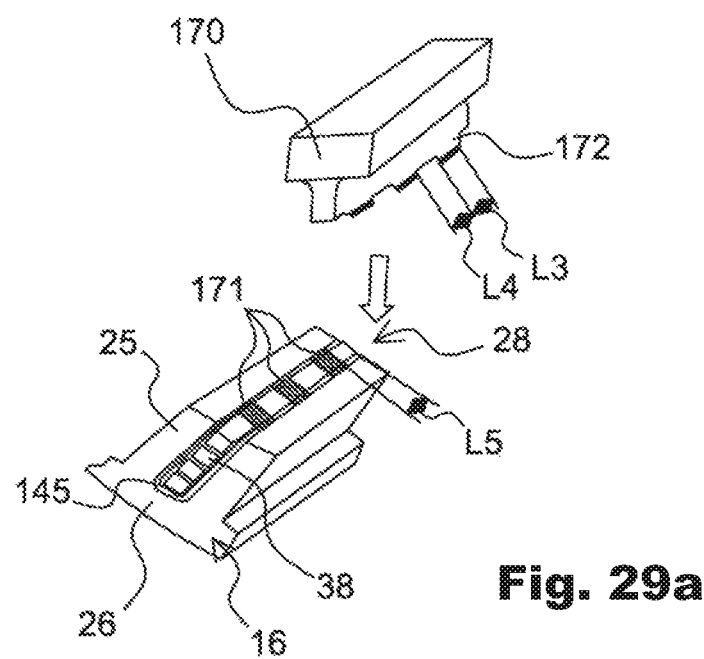
FIGS. 29a to 29c show variant embodiments of a punch which makes it possible to carry out the step of deformation of the inner layer of conductors in order to retain them in the interior of the stator.

According to a first embodiment illustrated in FIG. 29a, three deformations 171 are produced, distributed axially on each of the segment structures 38 situated on the inner periphery of the stator.

The deformations 171 are carried out such that a ratio between a length L3 of a deformation and a distance L4 between two successive deformations 171 is contained between 0.8 and 1.2. The end deformations 171 are spaced from corresponding axial ends of the segment structures 38 by at least 3 mm (cf. length L5). The deformations 171 are provided by protuberances 172 with a corresponding form belonging to the punch.

Figure 29B:
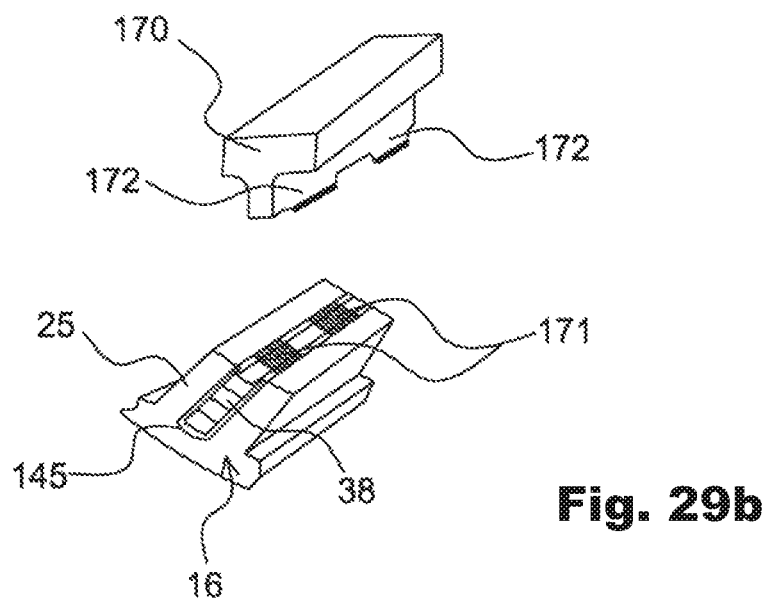

Alternatively, as represented in FIG. 29b, two deformations 171 are produced, distributed axially on each of the segment structures 38 situated on the inner periphery of the stator. Each deformation 171 is spaced from the corresponding axial ends of the segment structure 38 by at least 3 mm. For this purpose, the punch 170 has two protuberances 172 with a corresponding form.

Figure 29C:
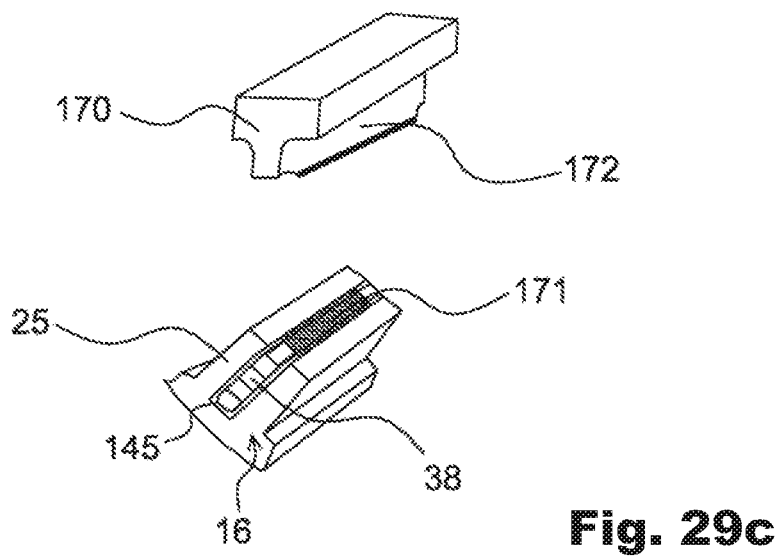

Alternatively, as represented in FIG. 29c, a single axially elongate deformation 171 is produced on each of the segment structures 38 situated on the inner periphery of the stator. The deformation 171 is produced such that the ends of this deformation 171 are spaced from the corresponding axial ends of the segment structures 38 by at least 3 mm. For this purpose, the punch 170 has a protuberance 172 with a corresponding form.

On the final product, the segment structures 38 of the layer closest to the axis of the stator 15, or inner layer, comprise deformation tracks produced by the punch 170.

Once the winding 17 is installed on the stator 15, an impregnation step is carried out, consisting of pouring liquid varnish around the excitation winding 17, and more particularly around the two chignons of the winding 163. The varnish which is heated can be introduced in the liquid state drop by drop into the wires 44 of the winding 17. The varnish then cools and polymerises. The varnish is for example based on epoxy resin.

Figure 30:
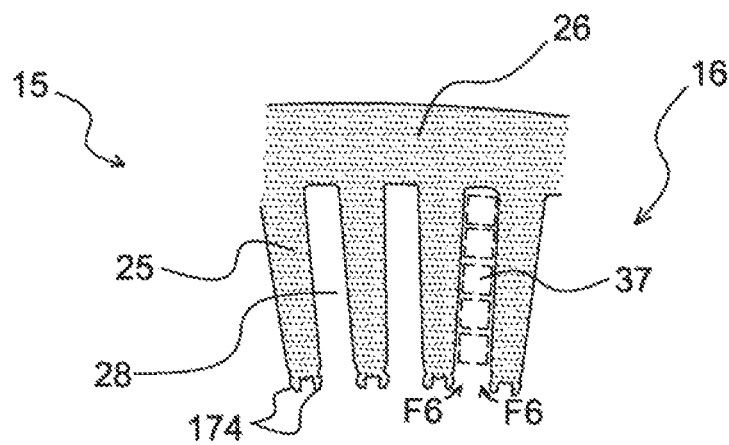
FIG. 30 is a detailed view from above of a stator according to the present invention provided with foldable tooth roots.

In a variant embodiment of the stator 15 shown in FIG. 30, each tooth 25 comprises two foldable tooth roots 174.

Before being folded, the tooth roots 174 are situated along the edges of the notches 28 which extend according to a substantially radial plane, such as to be released from the notches 28.

Figure 31A:
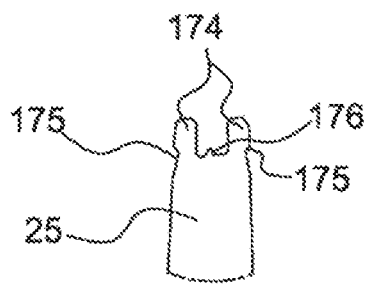
FIGS. 31a and 31b show in a view from above two embodiments of the foldable teeth of the stator according to the present invention.
Figure 31B:
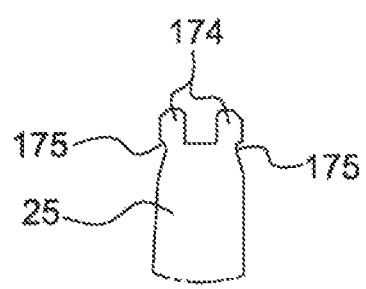

The tooth roots 174 each comprise a reduction of cross-section 175 at their connection with each free end of the teeth 25. The reduction of cross-section 175 is carried out in the face of the tooth root 174 which faces towards the notch. The tooth roots 174 preferably have a rounded end side. In the embodiment in FIG. 31a, the inner face of each tooth 25 which extends between the two tooth roots 174 has a protuberance 176. In the embodiment in FIG. 31b, the inner face of each tooth 25 is without a protuberance 176.

After the step of insertion of the segment structures 83 in the notches 28 by expansion of the blades 148, the tooth roots 174 are folded back towards the interior of each notch 28 according to the arrows F6, such as to close the notches 28 at least partially.

A configuration of this type makes it possible to improve the magnetic performance of the electrical machine, whilst permitting easy insertion of the segment structures 38 inside the notches 28.

Figure 36:
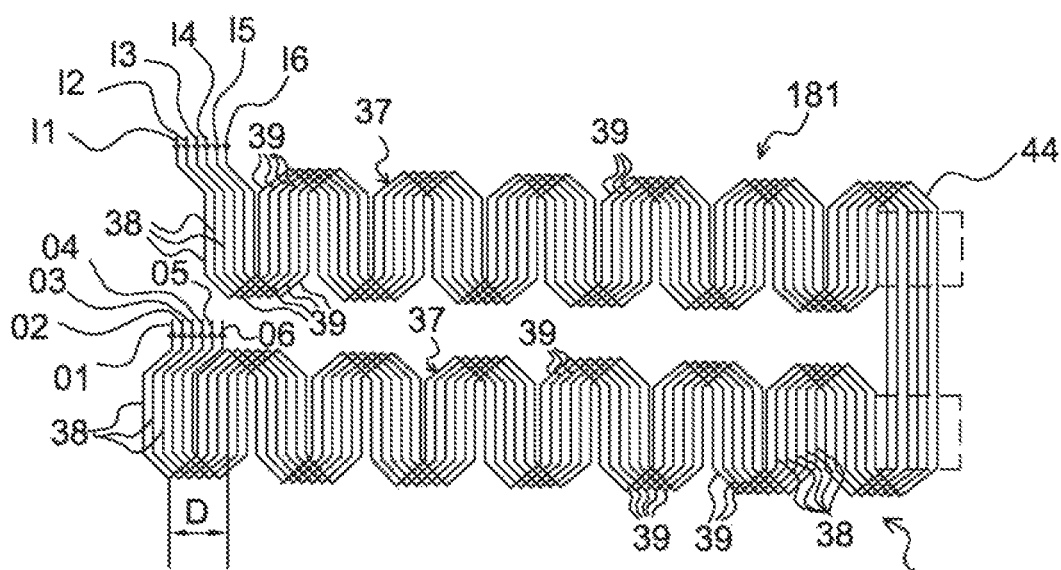
FIG. 36 is a view from above of two under-layers which are designed to be imbricated with one another in order to obtain the winding layer according to the present invention.

In the embodiment in FIG. 36, the winding layer 52 is obtained from imbrication between a first 181 and a second 182 under-layer. The imbrication of the two under-layers is carried out such that firstly the first 181 and the second 182 under-layers have inputs I1-I6 and outputs O1-O6 which are all situated on the same side of the stator 15, and secondly, the second under-layer 182 is offset relative to the first layer by a number of notches in the stator equal to the number of phases, in this case six. This corresponds to the axial offsetting D in the figure. This therefore facilitates the production of the connections, taking into account the advantageous positioning of the inputs I1-I6 and the outputs O1-O6 on the same side of the stator 15. The first 181 and the second 182 under-layers are preferably identical. The two under-layers 181, 182 are preferably produced from the same set of wires 44. Each phase winding E1-E6 is produced from a single wire 44 which connects the input Ii to the output Oi, for i ranging between 1 and 6, in the case of a hexaphase stator.

The under-layers 181, 182 each have a length equal to N/2 times the circumference of the stator 15, N being the number of layers of conductors 37 required in the wound stator 15, N being equal to two or more. The number N of layers of conductors 37 is for example equal to two, four, six or eight. Preferably, the number N of layers of conductors 37 is equal to eight.

The different steps of putting the layer 52 into place, installation of the layer 52 in the spindle 105, and transfer of the spindle winding 105 to the stator 15 are identical to those previously described.

A description is provided hereinafter with reference to FIGS. 37a to 37c and 38a to 38c of the different types of coupling of the phase windings E1-E6 provided by means of a interconnector 185 in the form of a portion of ring. This interconnector 185 is arranged between a chignon 163 of the winding 17 and diodes (not represented) of a voltage rectifier bridge. This interconnector 185 comprises electronic terminals B1-B6 with axial orientation, the number of which is equal to the number of phase windings E1-E6, and in this case is equal to six.

The terminals B1-B6 are distributed on the interconnector 185 according to two groups G1 and G2, each comprising the same number of terminals B1-B3 and B4-B6. This number of electronic terminals corresponds to the number of phases divided by two, i.e. three terminals group G1, G2.

The angular distance K1 between a terminal of one of the groups G1, G2 and the corresponding terminal of the other group G1, G2 is constant. Thus, the end terminal B1 the furthest to the left of one of the groups G1 is separated from the end terminal B4 the furthest to the left of the other group G2 by the angular distance K1. The central terminal B2 of the first group G1 is separated from the central terminal B5 of the group G2 by the angular distance K1. The end terminal B3 furthest to the right of one of the groups G1 is separated from the end terminal B4 furthest to the right of the other group G2 by the angular distance K1. The angular distance K1 is approximately 125°.

Figures 37A, 37B:
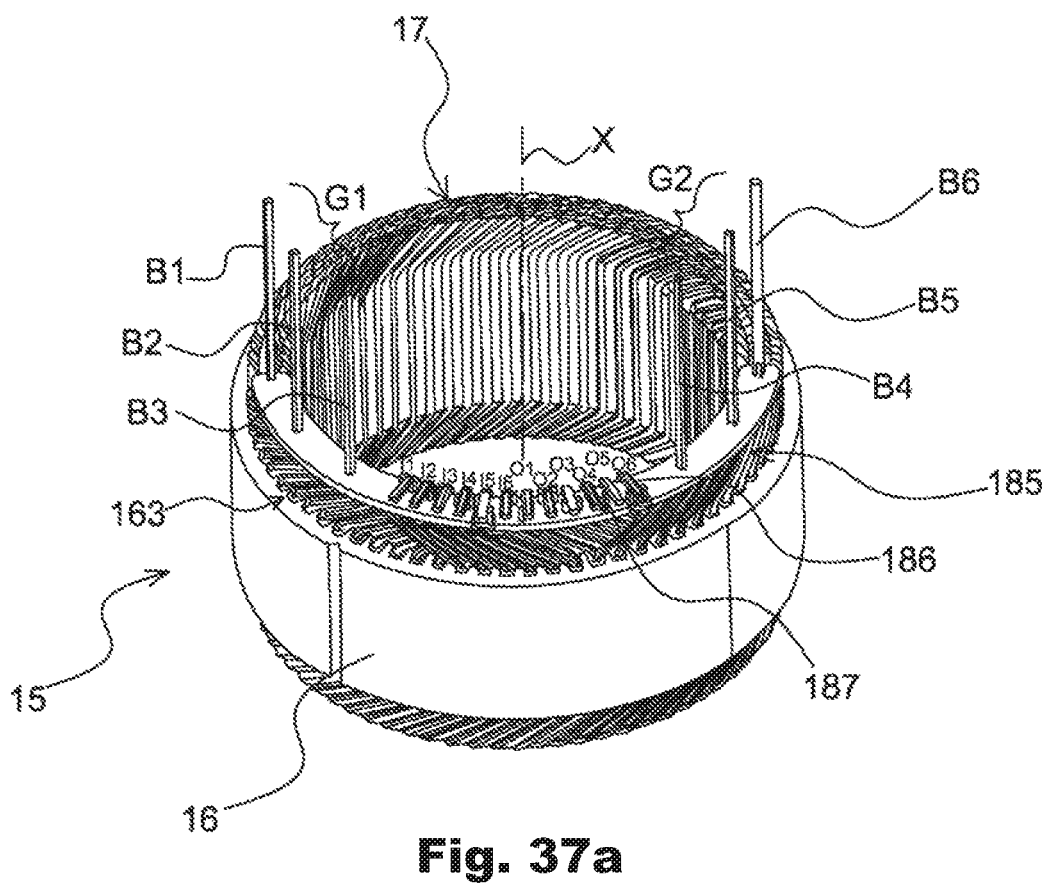
FIG. 37a is a view in perspective of a wound stator provided with an interconnector providing a coupling in the form of a triangle of the phase windings of the electrical machine.
FIGS. 37b and 37c show respectively the diagram of the connections in the interior of the interconnector in FIG. 37a, between the terminals of the interconnector and the inputs and outputs of the phase windings, as well as the corresponding wiring diagram.
Figure 38A:
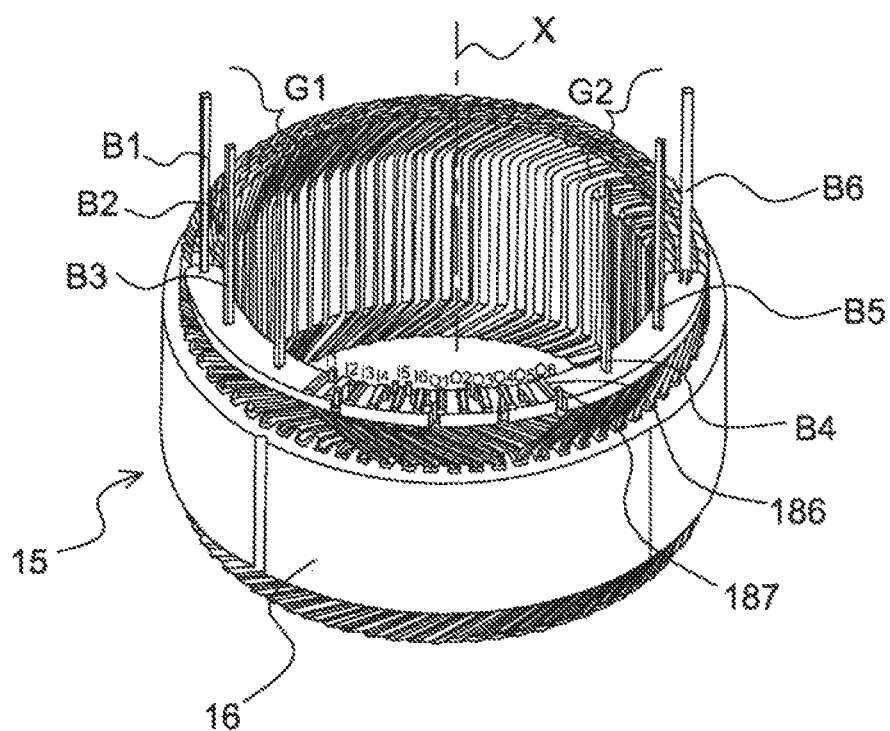
FIG. 38a is a view in perspective of a wound stator provided with an interconnector providing a coupling in the form of a star of the phase windings of the electrical machine.
Figure 39:
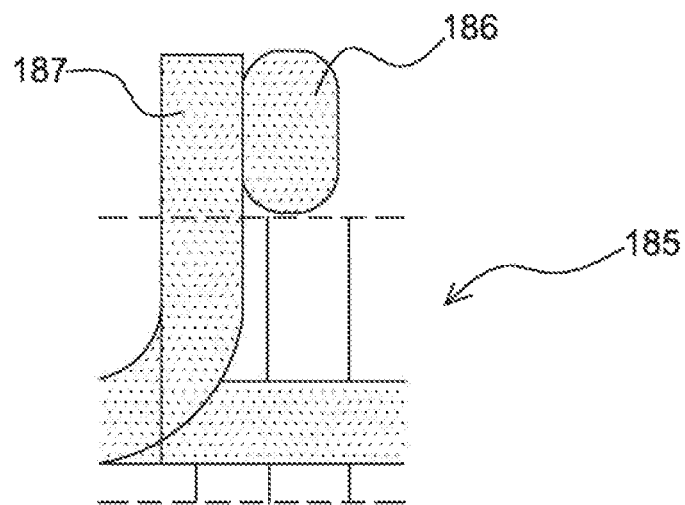
FIG. 39 shows a variant embodiment of the connection between a lug of an interconnector in FIGS. 37a and 38a and an end of a phase winding.
Figure 40:
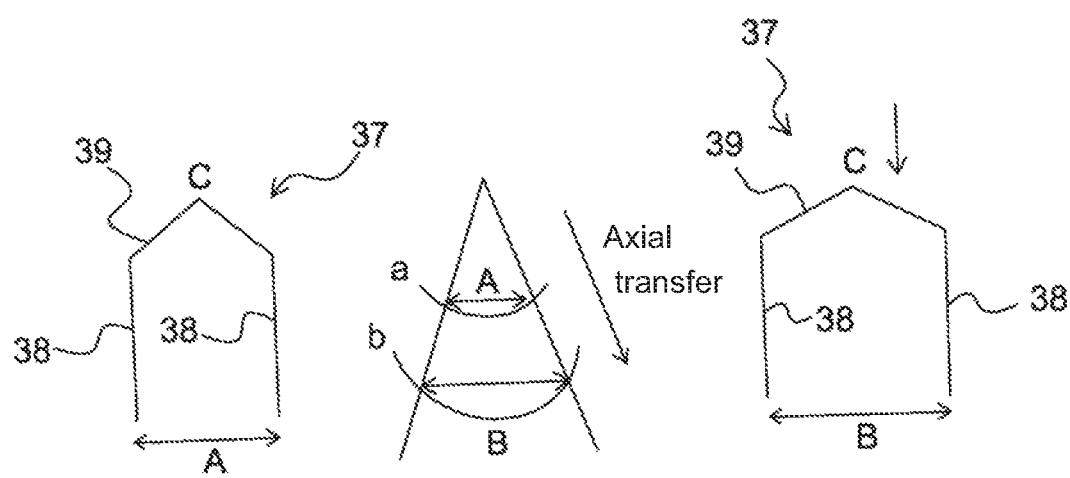
FIG. 40 represents the influence on the height of the loop structures by the phenomenon of transfer of the annular spindle to the stator.

In the embodiments in FIGS. 37a and 38a, the ends 186 of the phase windings E1-E6 corresponding to the inputs and the outputs are folded back such as to be placed against the interconnector 185 according to a radial direction. These ends 186 are then welded on lugs 187 of the interconnector 185 with axial orientation. In the variant represented in FIG. 39, the ends 186 extend axially, and are welded on lugs 187 of the interconnector 185 with radial orientation. In all cases, the interconnector 185 comprises two lugs 187 per phase.

The interconnector 185 comprises tracks 189 which connect the lugs 187 electrically to the electronic terminals B1-B6.

Figure 37C:
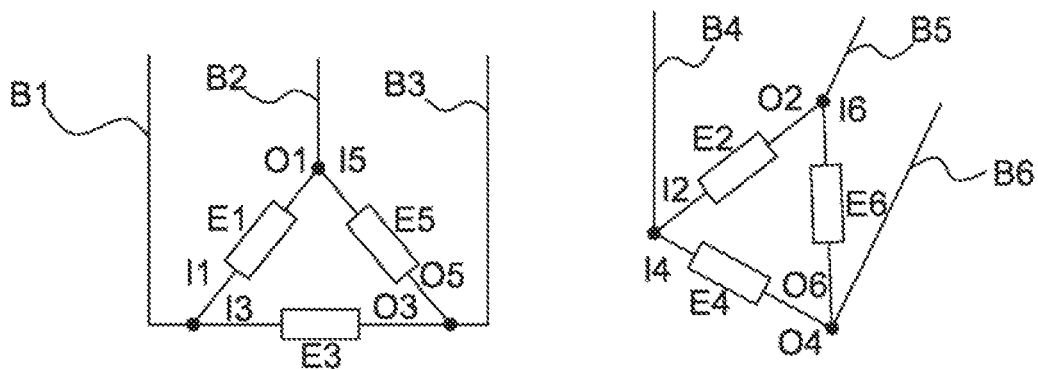

A so-called "double three-phase" triangle coupling can be carried out, illustrated in FIGS. 37b and 37c.

Coupling in the form of a triangle thus takes place of the first E1, the third E3 and the fifth E5 phase windings, and secondly the second E2, the fourth E4 and the sixth E6 phase windings.

More specifically, the tracks 189 of the interconnector 185 thus ensure connection of the inputs I1, I3 of the first and the third phase windings E1 and E3 with the terminal B1. Tracks 189 also ensure connection of an input I5 of the fifth phase winding E5 and an output O1 of the first phase winding E1 with the second terminal B2. Tracks 189 ensure connection of an output O5 of the fifth phase winding E5 and an output O3 of the third phase winding E3 with the third terminal B3.

In addition, the interconnector 185 comprises tracks 189 for providing corresponding connections for the phase windings E2, E4 and E6 according to FIGS. 37b and 37c. Thus, the tracks 189 of the interconnector 185 then ensure a connection of the inputs I2, I4 of the second and fourth phase windings E2 and E4 with the terminal B4. Tracks 189 also ensure a connection of an input I6 of the sixth phase winding E6 and an output O2 of the second phase winding E2 with the terminal B5. Tracks 189 ensure a connection of an output O4 of the fourth phase winding E4 and an output O6 of the sixth phase winding E6 with the terminal B6.

Figure 38B:
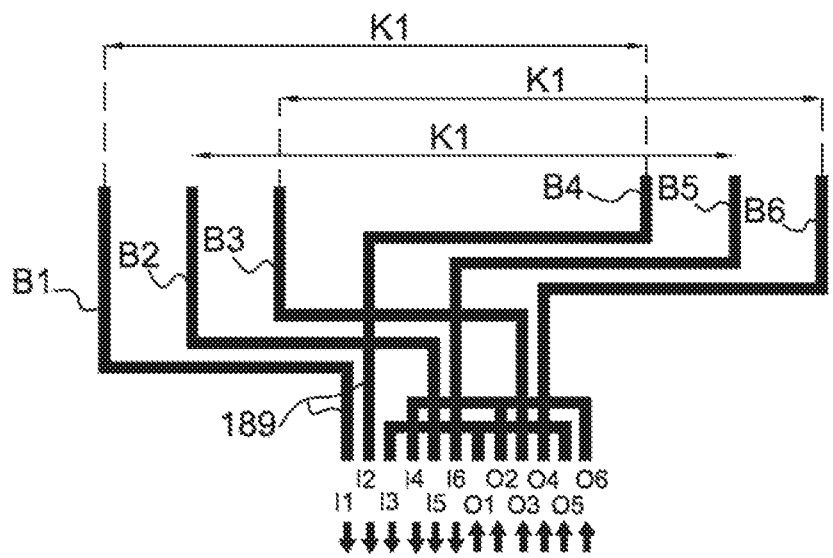
FIGS. 38b and 38c show respectively the diagram of the connections in the interior of the interconnector in FIG. 38a, between the terminals of the interconnector and the inputs and outputs of the phase windings, as well as the corresponding wiring diagram.
Figure 38C:
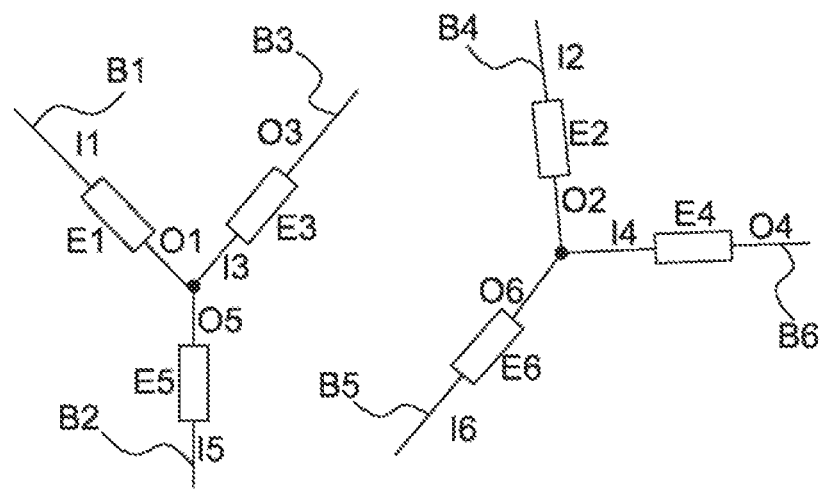

Alternatively, the coupling carried out is a "double three-phase" star coupling illustrated in FIGS. 38b and 38c. There is thus coupling in the form of a star firstly of the first E1, the third E3 and the fifth E5 phase windings, and secondly of the second E2, the fourth E4 and the sixth E6 phase windings.

More specifically, tracks 189 ensure an interconnection at a neutral point situated on the interconnector 185 of the outputs of the first E1 and the fifth E5 phase winding and the input of the third E3 phase winding. A track 189 ensures a connection of the input I1 of the phase winding E1 with the terminal B1. A track 189 ensures a connection of the input I5 of the phase winding E5 with the terminal B2. A track 189 ensures a connection of the output O3 of the phase winding E3 with the terminal B3.

The interconnector 185 comprises tracks 189 for production of the corresponding connections for the phase windings E2, E4 and E6 according to FIGS. 38b and 38c. Thus, tracks 189 ensure interconnection at a neutral point situated on the interconnector 185 of the outputs of the second E2 and sixth E6 phase winding and of the input of the fourth E4 phase winding. A track 189 ensures a connection of the input I2 of the phase winding E2 with the terminal B4. A track 189 ensures a connection of the input I6 of the phase winding E6 with the terminal B5. A track 189 ensures a connection of the output O4 of the phase winding E4 with the terminal B6.

As a variant, it will be possible to produce a hybrid coupling in which there is coupling of the phase windings of one of the groups from out of the group E1-E3-E5 and the group E2-E4-E6 in the form of a star, and the phase windings of the other group in the form of a triangle.

Preferably, in order to ensure that the inputs/outputs O1-O6 I1-I6 are positioned on the outer periphery of the stator, the first winding on the spindle is the irregular part 47. This therefore prevents the input-output wires from interfering with the rotor fan, taking into account the absence of a tooth root, in order to retain these wires in certain embodiments.

A description is provided hereinafter with reference to FIGS. 40 to 43 of different embodiments of the method which make it possible to adapt the form of the winding chignons 163.

It should be noted that, on the transfer comb 83 as well as on the spindle 105, each conductor 37 is separated from the following one by a distance between centres corresponding to the distance between the middle of the notch N input and the middle of the notch N+1 input, this step being invariable.

Contrary to this invariable step for a given stator 15, the height of the layers of conductors 37 is flexible, such that it is possible to vary the height of the chignons 163 on the finished stator 15. In addition, the height of the winding chignons 163 will vary according to the position of the layers on the comb 83.

For a given portion of a conductor 37 of a phase winding constituted by two segment structures 38 connected by a loop structure 39, there is definition of a distance A corresponding to the length of the arc of a circle between the middle of the two notch inputs 109 of the annular spindle 105 which will receive the two conductors 37.

There is also definition of a distance B (greater than A) corresponding to the length of the arc of a circle between the middle of the two notches 28 on the positioning diameter of the conductors 37 after the transfer into the notches 28 in the stator 15 which will receive the two conductors 37.

The height of the point C will decrease going away from the axis and will increase going towards the axis, thus compensating for the variations of distance between the segment structures 38. In other words, the segment structures 38 on a diameter (a) will, whilst being transferred axially towards the notches 28 in a diameter (b), be physically distanced from one another.

Adaptation of the height of the layers of the winding 17 thus configures a chignon height before transfer which, after transfer, will generate a different height (derived from the sum of the heights of layers of conductors derived from the winding 17 and from the height lost after the transfer of the conductors 37).

More specifically, in order to obtain winding chignons 163, the height of which increases when being displaced from the outer periphery of the stator 15 towards the axis X, the layers of conductors 37 which are put into place on the annular spindle 105 have different heights, i.e. the highest layers on the spindle 105 are situated on the inner periphery, and the lowest layers are situated on the outer periphery (the spindle 105 being the image of the notches 28 in the stator 15).

After transfer, each layer loses height proportionally according to its position on the spindle 105 and its final position in the stator 15. More specifically, the further the layer is situated on the outer layer, the more it loses height of the chignon when it is transferred from the spindle to the stator.

Thus, in order to obtain in the stator 15 an outer layer of the chignon which is lower than the others, it is sufficient, in the spindle 105, for the layers all to have the same height. It is also possible, in order to accentuate the difference of height between the inner layer and the outer layer in the chignon, to provide in the spindle 105 an outer layer with a height which is shorter than the inner layer.

In order to obtain an arrangement of this type, the end of the layer 52 which is wound first on the spindle 105 must have a greater height than the remainder of the layer 52.

For this purpose, use is made on the winding unit 51 of the keys 66, the spacing of which varies in order to vary the height of the layer 52.

Thus, in the first case, when the end of the layer 52 which is wound first on the spindle 105 is the irregular part 47, the spacing between the two keys 66 is reduced as the layer is formed.

On the contrary, in the second case, when the end of the layer 52 which is wound first on the spindle 102 is the connection part, the spacing between the two keys 66 is increased as the layer 52 is formed.

In fact, as previously described, the layer 52 is always formed from the irregular part 47.

In the first case, the technical advantage is obtained that the inputs-outputs O1-O6 I1-I6 are positioned on the outer periphery of the stator 15.

On the contrary in the second case, the inputs-outputs O1-O6 I1-I6 are positioned on the inner periphery of the stator 15.

The advantage of a configuration of this type is a form of the chignon 163 which matches the form of the bearing, and makes it possible to optimise the dimensions of the machine, and in particular its length. In addition, this makes possible better exposure to the flow of air generated by the rotor.

In order to obtain flat winding chignons 163, as illustrated in FIGS. 42a and 42b, the heights of the layers of conductors 37 put into place on the spindle 105 are different, in order to compensate only for the loss of height associated with the phenomenon of transfer of the layers of conductors 37 from the diameter (a) to the diameter (b).

In order to obtain an arrangement of this type, the end of the layer 52 which is wound first on the spindle 105 must have a height which is shorter than the remainder of the layer 52.

Thus, in the first case, when the end of the layer which is wound first on the spindle 105 is the irregular part 47, the spacing between the two keys 66 is increased as the layer 52 is formed.

On the contrary, in the second case, when the end of the layer 52 which is wound first on the spindle 105 is the connection part, the spacing between the two keys 66 is decreased as the layer 52 is formed.

In the first case, the technical advantage obtained is that the inputs-outputs O1-O6 I1-I6 are positioned on the outer periphery of the stator.

On the contrary, in the second case, the inputs-outputs O1-O6 I1-I6 are positioned on the inner periphery of the stator.

The result is that a homogenous height of winding chignons 163 is obtained. This makes it possible to optimise the length of the machine, and to obtain better contact between the layers of conductors 37, in order to optimise the transfer of heat from the layer opposite the rotor to the layer opposite the bearing.

In order to obtain winding chignons 163 with a height which decreases when going from the outer periphery of the stator 15 towards the axis X, as illustrated in FIGS. 43a and 43b, the layers of conductors 37 put into place on the annular spindle 105 have different heights, i.e. the layers of conductors 37 which are highest on the spindle 105 are situated on the outer periphery, and the layers of conductors 37 which are lowest are situated on the inner periphery.

In order to obtain an arrangement of this type, the end of the layer 52 which is wound first on the spindle 105 must have a height lower than the remainder of the layer 52.

Thus, in the first case, when the end of the layer which is wound first on the spindle is the irregular part 47, the spacing between the two keys 66 is increased as the layer 52 is formed.

On the contrary, in the second case, when the end of the layer 52 which is wound first on the spindle is the connection part, the spacing between the two keys 66 is decreased as the layer is formed.

In the first case, the technical advantage obtained is that the inputs-outputs O1-O6 I1-I6 are positioned on the outer periphery of the stator.

On the contrary, in the second case, the inputs-outputs O1-O6 I1-I6 are positioned on the inner periphery of the stator.

The advantage of a configuration of this type is the optimisation of the flow of air in the machine, which assists the exchanges between the inner diameter and outer diameter of the machine.

In the embodiment in FIGS. 44a, 44b, 45a, 45b, the stator 15 body 16 is formed by two elements assembled together, i.e. a central core 201 which is designed to receive the conductors 37, as well as an added-on yoke 202 which is designed to be positioned around the central core 201. The central core 201 as well as the yoke 202 are stacks of plates. The central core 201 comprises notches 28 which are open on its outer periphery side, and are connected to one another on the inner periphery side by tooth roots 203 which each extend on both sides of a free end of a tooth 25. These tooth roots 203 thus define areas of connection 204 between the free ends of the teeth 25.

A configuration of this type makes it possible to facilitate the insertion of the winding 17 via the open outer end of the notches 28, whilst being able to benefit from the tooth roots 25, which improve the magnetic performance of the machine.

Figure 48A:
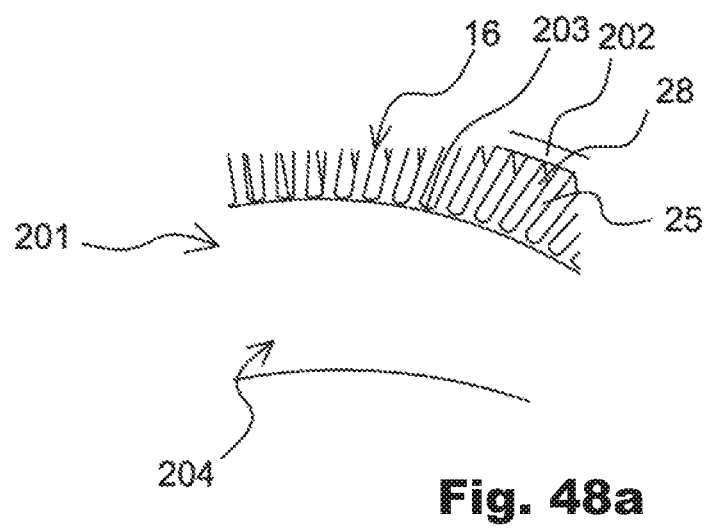
FIGS. 48a and 48b are partial views in perspective showing the possible variant embodiments of the areas of connection between the teeth of the central core.
Figure 48B:
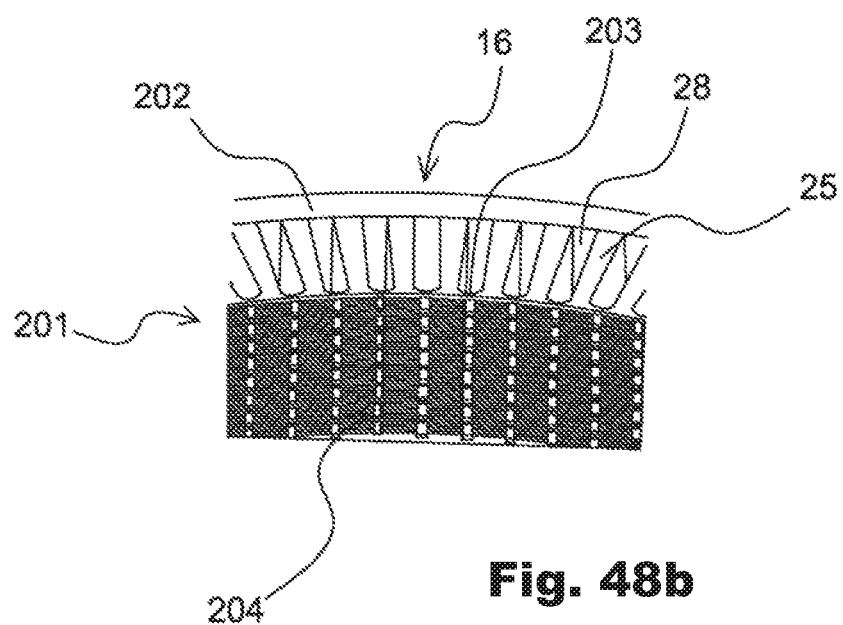

As shown in FIG. 48a, the central core 201 can be solid in the areas of connection 204 between two successive teeth 25. Alternatively, as shown in FIG. 48b, the central core 201 is perforated in the areas of connection 204 between two successive teeth 25.

In addition, the stack of plates of the yoke 202 can extend over the entire height of the central core 201 or over half the height of the central core 201. The stack of plates of the yoke 202 can be flat before its deformation by bending to a cylindrical form in order to put it into place around the central core 201 (cf. FIG. 45a). Alternatively, the yoke 26 can initially have a form of an arc in order to facilitate its positioning around the central core 201 (cf. FIG. 45b).

Figure 46:
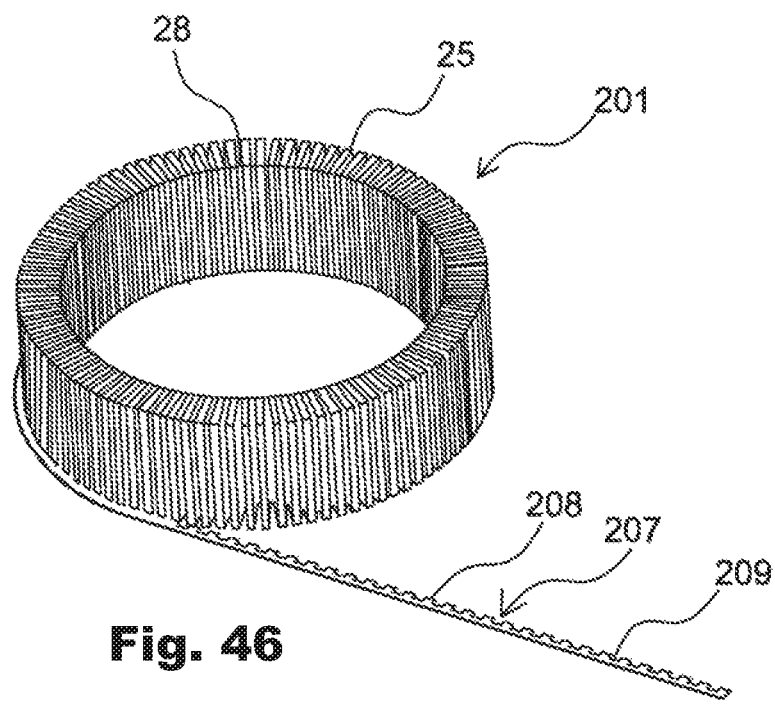
FIG. 46 shows a step of production of the yoke around the central core from a flat plate wound around the central core.

According to another embodiment shown in FIG. 46, a flat plate 207 is used with a height which is lower than that of the central core 201, such as to create a winding of this plate 207 around the central core 201. The operation of winding of the plate 207 is repeated as many times as necessary in order to obtain the height of the central core 201. This operation can be carried out with a plurality of plates 207 stacked axially and wound around a plurality of turns.

Figure 47A:
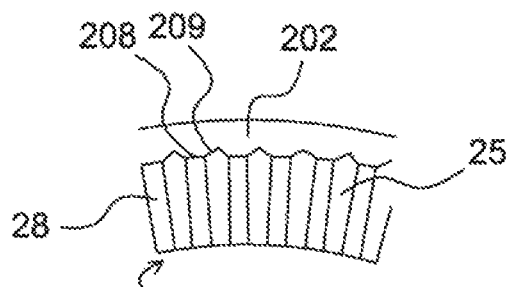
FIGS. 47a to 47d show variant embodiments of the fitting between the outer ends of the teeth of the central core and the inner periphery of the added-on yoke.
Figure 47B:
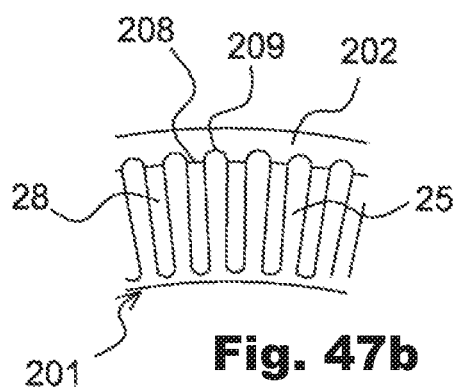
Figure 47C:
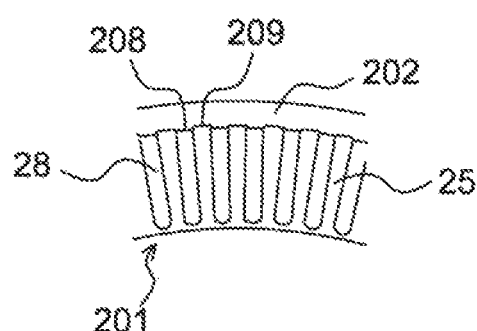
Figure 47D:
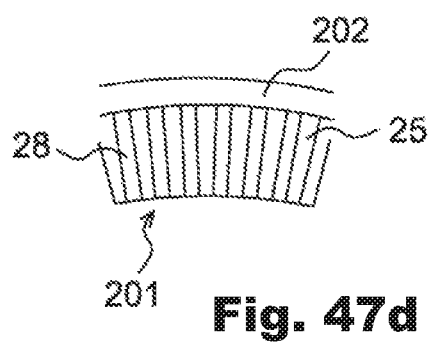

The central core 201 can be secured on the added-on yoke 202 by fitting with a triangular form (cf. FIG. 47a), fitting with a round form (cf. FIG. 47b), or fitting in the form of a rung (cf. FIG. 47c). The yoke 202 or the plate 207 then have a succession of flat areas 208 and hollows 209 with a corresponding form (triangular, round or in the form of a rung), as can be seen in FIGS. 45b, 46, and 47a to 47c. The hollows 209 are designed to cooperate with the outer ends of the teeth 25 with a complementary form. The flat areas 208 are designed to extend between two successive teeth 25, in order to form the base of the notches 28. Alternatively, the yoke 202 is put into place around the central core 201 without fitting, as shown in FIG. 47d.

A configuration of this type of the body 16 makes it possible to avoid having to carry out steps of transfer of the winding 17 from the spindle 105 to the stator 15. In fact, in this case, it is possible to replace the spindle 105 by the central core 201, such as to transfer the segment structures 38 directly from the comb 83 to the notches 28 in the central core 201.

For this purpose, a hub 112 is placed in the central part of the core 201. The hub 112 is secured detachably on the tooth roots 203. Putting the hub 112 into place makes it possible to turn the central core 201 during the insertion of the segment structures 38, from the comb 83 to the notches 28. Once the winding 17 is installed inside the notches 28 in the central core 201, the outer open face of the notches 28 is closed by means of the yoke 26, according to one of the techniques previously described. The hub 112 can then be removed.

Figure 49:
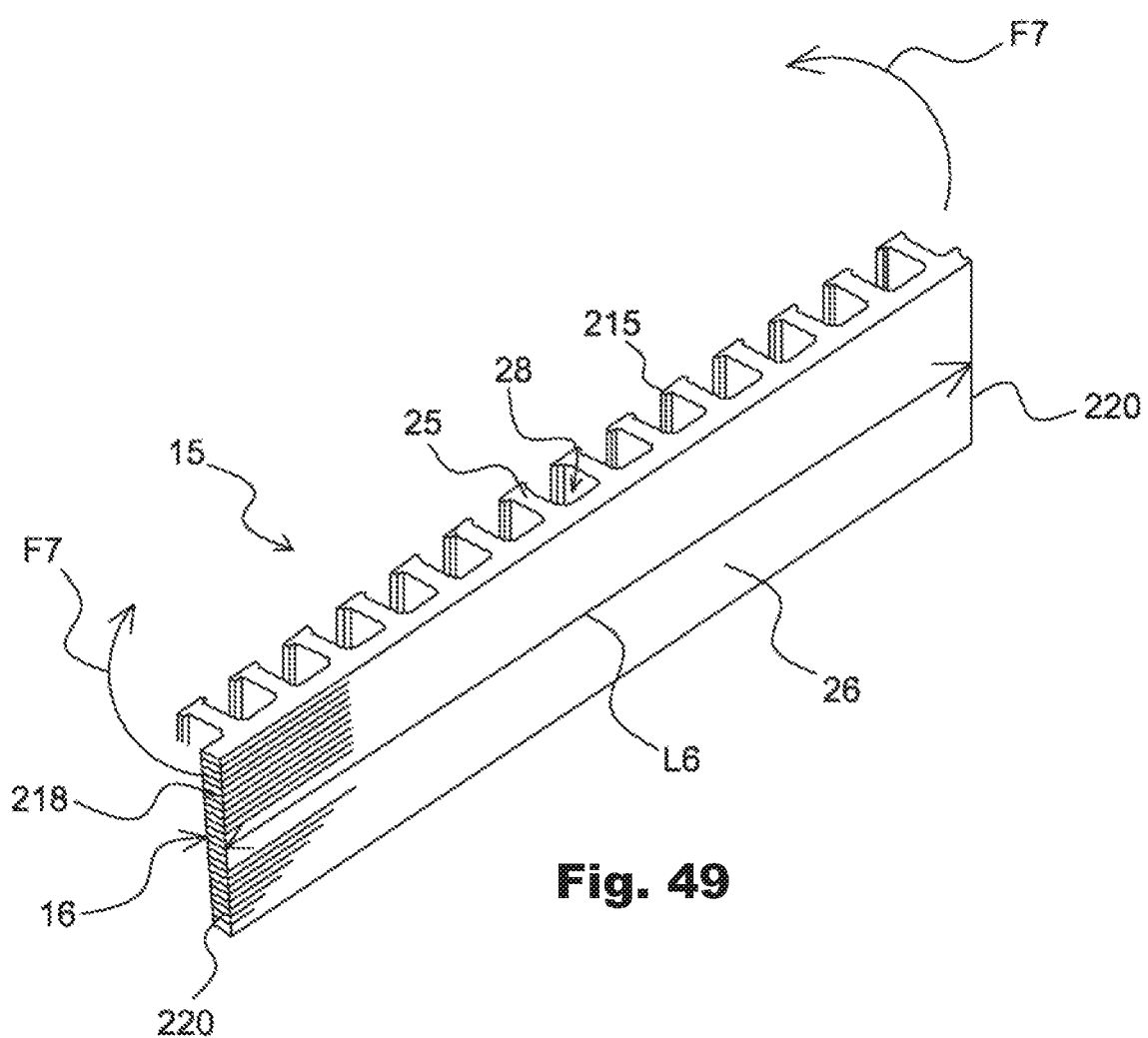
FIG. 49 shows a view in perspective of a flat stator which is designed to be bent after putting into place of the winding layer.

According to an embodiment described in FIG. 49, a flat stator 15 is produced, comprising a flat body 16 formed by a set of sheets of stacked plates. The flat body 16 is provided with a flat yoke 26 which extends substantially on a plane, and teeth 25 which extend substantially perpendicularly to the yoke 26. These teeth 25 delimit in pairs notches 28 which are preferably provided with tooth roots 215. The length L6 of the flat stator 15 corresponds to the circumference of the stator 15, once the step of bending has been carried out according to the arrows F7.

In order to obtain the flat stator 15, a prior step is carried out of thermal bonding the sheets of plates 218 to one another. All the sheets of plates 218 can be thermally bonded to one another. Alternatively one sheet out of N is thermally bonded, N being equal to 2 or more. The sheets 218 which are not thermally bonded together are assembled to one another and to the sheets which are thermally bonded to one another by riveting by means of a rivet (not represented) which passes through the set of plates from one side to the other, or alternatively by welding.

The winding layer 52 previously described can be inserted in the notches 28 in the flat stator 15. Since the winding layer 52 has a length which is equal to a whole number M of times the circumference (to within the irregular part, six notches in the hexaphase case) of the stator 15, the winding layer 52 is put into place according to M times the length of the stator 15, according to an outward and return path along the flat stator.

Figure 50:
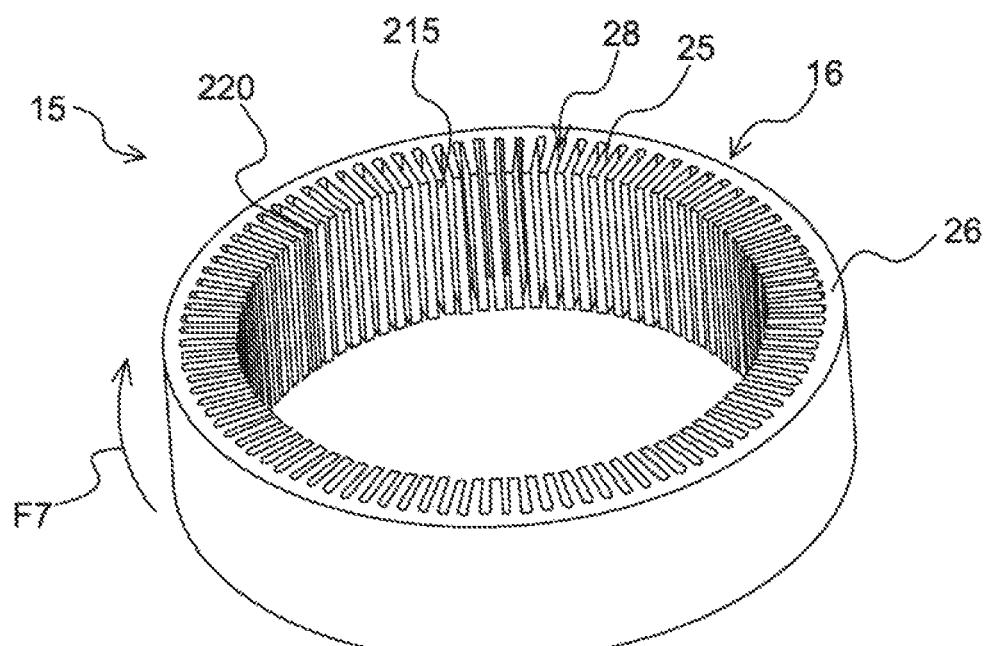
FIG. 50 shows a view in perspective of a bent stator without its winding provided with a set of plates, the sheets of which have been thermally bonded.

Once the winding layer 52 has been put into place, a step of bending the flat stator 15 is carried out, such as to form a wound stator 15 with a globally cylindrical form shown in FIG. 50 without the winding 17, in order to improve the clarity of the figure. The end edges 220 of the bent and wound stator are then welded to one another.

The thermal bonding of the sheets of plates 218 thus makes it possible to limit the deformation of the sheets of plates 218, in particular the widening of the teeth 25 during the step of bending of the stator 15.

Figure 51:
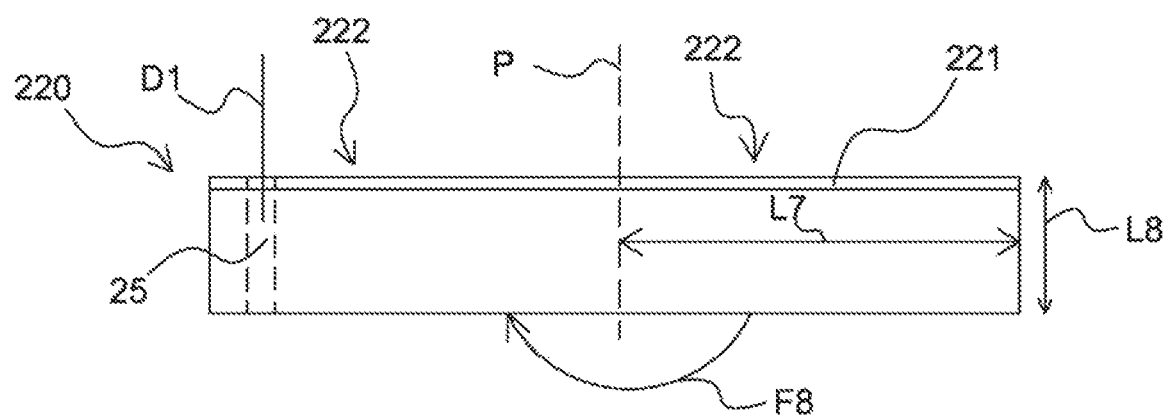
FIG. 51 shows a line of two half-sets of flat plates with an edge strip placed against one of their faces.
Figure 52:
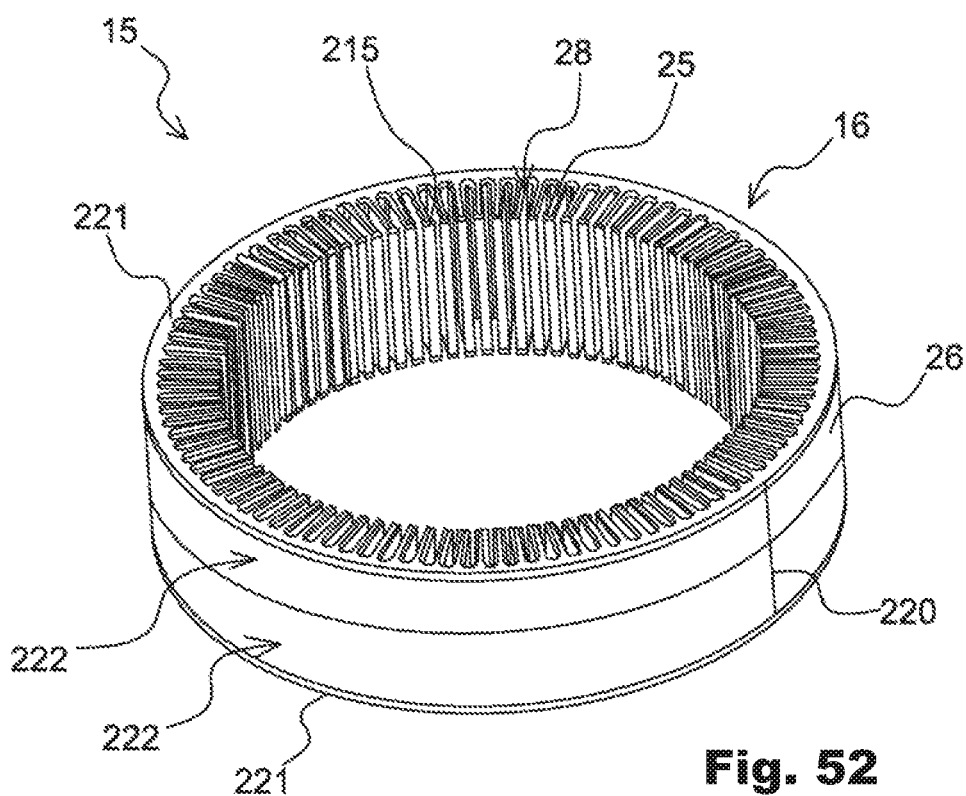
FIG. 52 is a view in perspective of the stator obtained after assembly and bending of the two half-sets in FIG. 51 without the winding.

In the embodiment in FIGS. 51 and 52, an edge plate 221 is placed against an end face of a line 220 of half-sets 222 of sheets of plates. The edge plate 221 is thicker than the sheets 218 of the set of plates. The edge plate 221 has a thickness which is equal to at least a millimetre. The end face against which the edge plate 221 is secured is perpendicular to a direction of longitudinal elongation D2 of the teeth 25 (a single tooth 25 is represented in FIG. 51 in order to facilitate the understanding).

The line 220 of half-sets 222 is then cut, for example by means of a laser, according to the plane P, in order to obtain two separate half-sets 222. Each half-set 222 has a length L7 which is substantially equal to the circumference of the stator 15, and a width L8 which is substantially equal to half the height of the final stator 15. The two half-sets 222 are then assembled together according to the arrow F8, i.e. by turning one of the cut sets 222 back, such as to place against one another the faces of the two half-sets 222 opposite the face which supports the edge plate 221.

This therefore provides a flat stator 15 comprising an edge plate 221 which is placed at each of its ends corresponding to the axial ends of the cylindrical stator. The winding layer 52 is then put into place in the notches 28 in the flat stator 15, as has previously been described.

Figure 53:
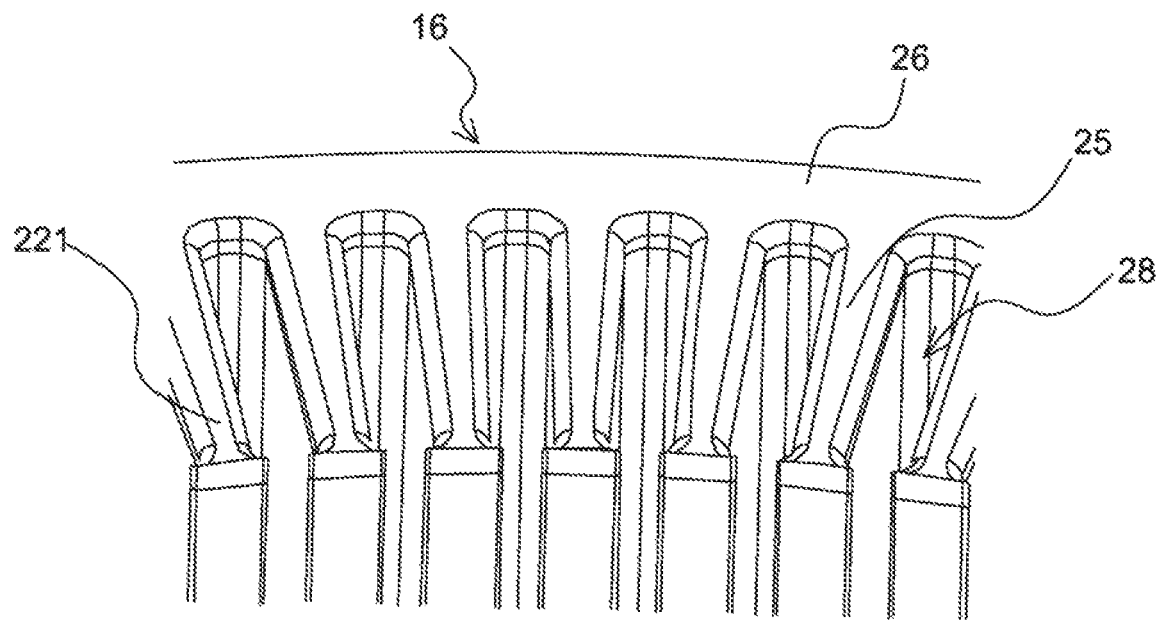
FIG. 53 is a detailed view in perspective of one of the axial ends of the teeth of the stator comprising an edge strip.

The flat stator 15 is then bent in order to obtain a wound stator with a globally cylindrical form represented in FIGS. 52 and 53 without its winding 17. The end edges 220 of the bent stator 15 are then welded to one another.

As a variant, two half-sets 222 are produced, each in the form of half-rings comprising two edge plates 221 placed on both sides on the axial end faces. These half-sets 222 are assembled to one another according to their ends, after having put the winding layer 52 into place inside the notches 28 in the two half-sets 222. As a variant, two edge plates 221 are placed on both sides of the flat stator 15 in FIG. 49 before the bending step.

The half-sets 222 thus constitute sub-sets which are assembled to one another in order to obtain the stator body 15. As a variant, the set of plates of the stator 15 is obtained by assembling more than two sub-sets. In this case, the two end sets each comprise an edge plate 221.

Figure 54:
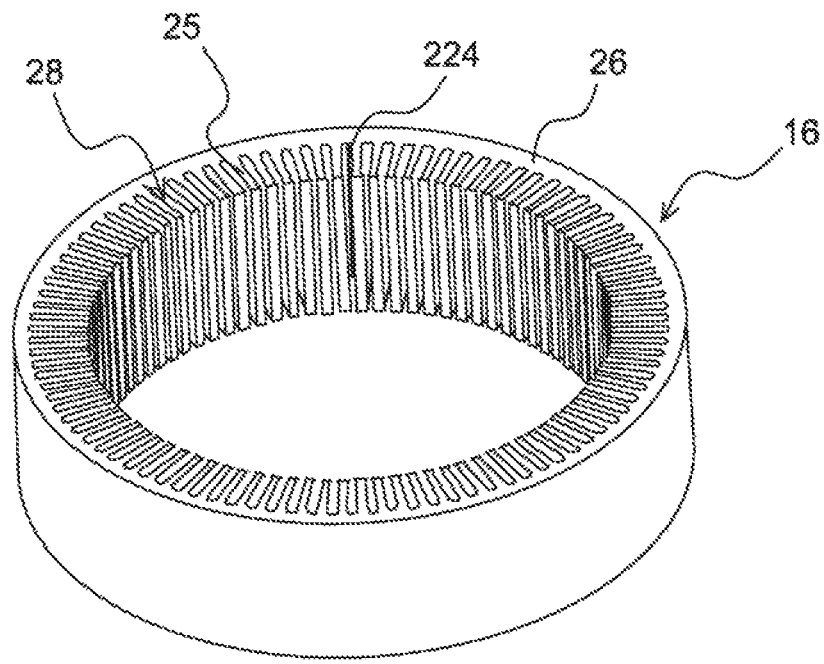
FIG. 54 is a view in perspective of a stator represented without its winding obtained from a flat stator with at least one weld provided in the base of a notch.
Figure 55:
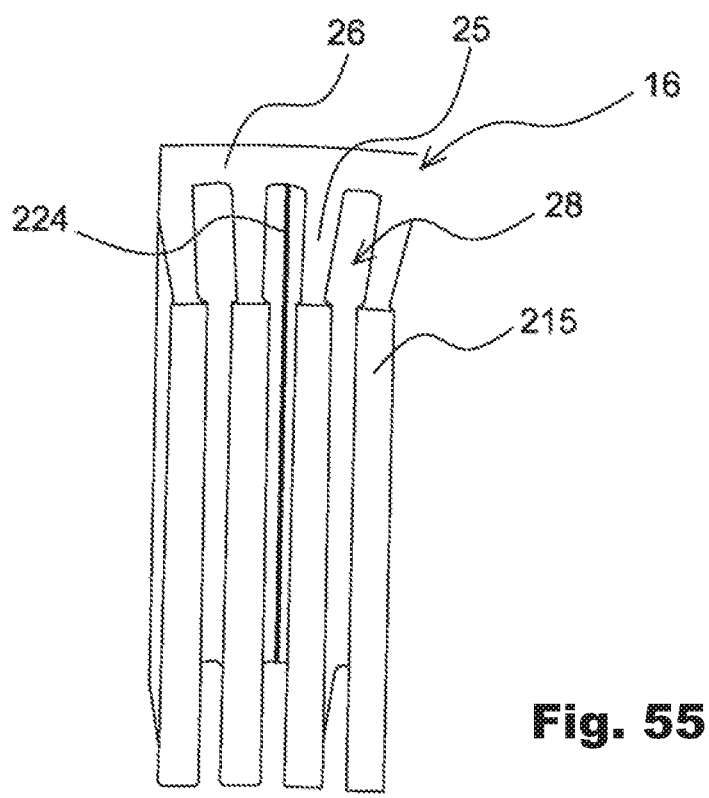
FIG. 55 is a detailed view in perspective of welding carried out in the base of a notch.
Figure 56:
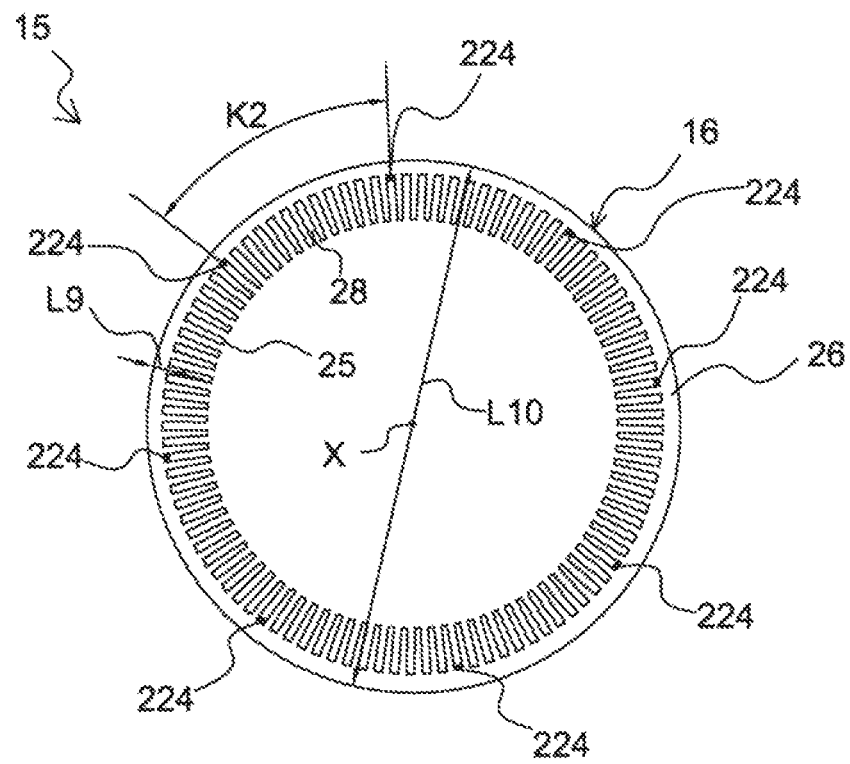
FIG. 56 is a view from above of the stator in FIG. 54 showing the relative angular positioning of the welds.

In addition, in order to improve the mechanical strength of the stator 15 during the operation of bending of the stator 15, the stator 15 comprises at least one weld 224 provided inside at least one notch 28, as represented in FIGS. 54 and 55. "Weld provided inside the notch" means a weld 224 provided on an inner wall of a notch 28, preferably on the base of a notch 28. Welds 224 are provided inside at least a quarter of the notches 28. Two successive welds 224 are spaced from one another by an angle K2 of less than 30°, as represented in FIG. 56. For a stator 15 comprising 96 notches, welds are preferably provided inside one notch out of 12, or one notch out of 6.

Figure 57:
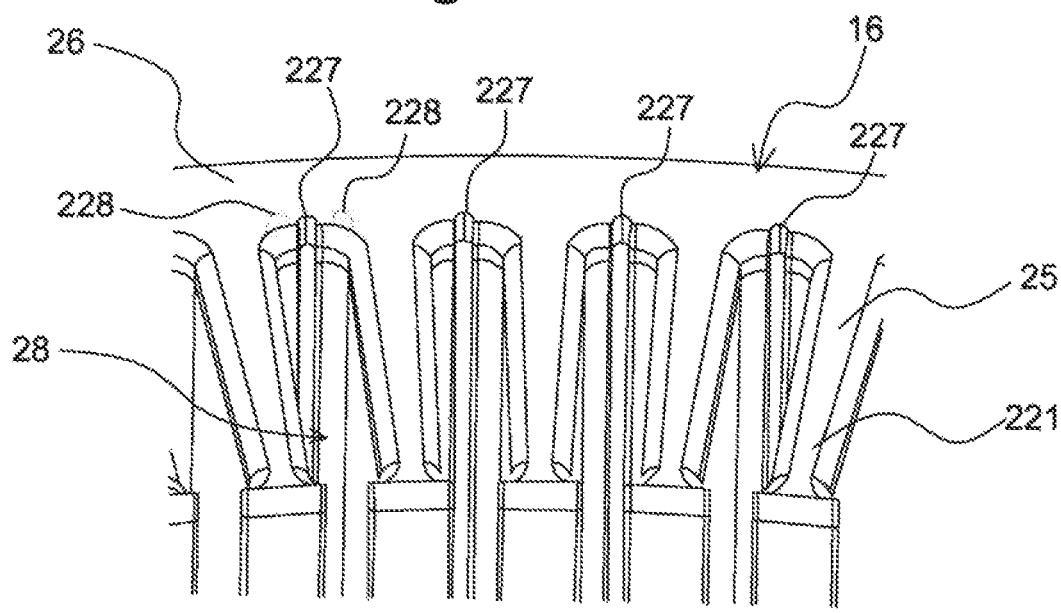
FIG. 57 is a detailed view in perspective of the stator provided with a hollow in each of the notches, in order to facilitate the bending step.

In the embodiment in FIG. 57, a hollow 227 can be provided in a base of each notch 28. The hollow 227 is provided substantially in the middle of the base of the notch 28. A ratio between a depth of the hollow 227 and the thickness of the yoke 26 is less than 25%. As a variant, two hollows 228 represented in broken lines in FIG. 57 are provided in the base of each notch 28 (in the place of a single notch 227). The hollows 228 are substantially symmetrical relative to a radial median plane of each notch 28. These hollows 228 are thus each provided at a base of the teeth 25 which delimit the notch 28.

In addition, a ratio between a thickness L9 of the yoke 26 and an outer diameter L10 of the stator 15 (cf. FIG. 56) is contained between 2.5% and 15%, in order to facilitate the bending of the yoke 26 of the flat stator 15 towards the cylindrical form. It should be noted that the outer diameter L10 of the stator 15 corresponds to the outer diameter of the yoke 26.

The steps of thermal bonding, putting edge plates 221 into place, producing welds 224 or hollows 227, 228 in the base of the notches 28 can be carried out independently or in combination. The same applies to the particular ratios of dimensions of the stator selected. The configuration of the teeth 25 (with rounded edges 31) as well as the dimensions of the notches 28 can be identical to those previously described with the stator 15 of a conventional type to be wound, which initially has a cylindrical form. The continuous notch insulator 145 can also be put into place in the notches in the stator 15 before insertion of the winding.

Figure 58:
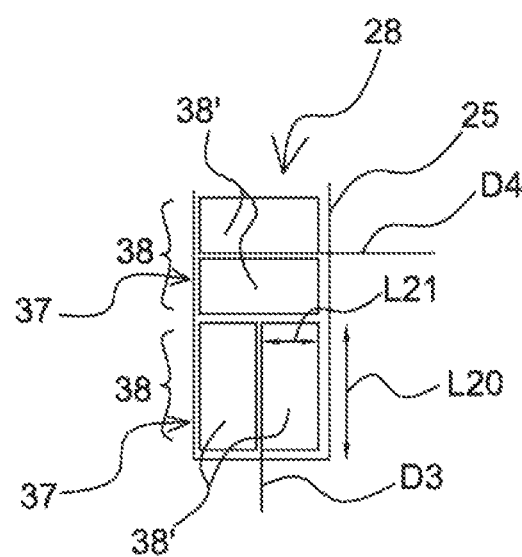
FIG. 58 shows a variant embodiment of the winding, using two wires in use per phase winding.

In the variant embodiment of the winding 17 shown in FIG. 58, the two conductors 37 comprise segment structures 38 which alternate as previously an inner layer and an outer layer when going from a notch 28 to an adjacent notch of the series according to a circumference of the stator. In addition, when it occupies the inner layer, the segment structure 37 has a different orientation D3 from the one D4 when it occupies the outer layer. The two orientations D3, D4 are preferably perpendicular to one another.

In the notches 28, a transverse cross-section of each segment structure 38 consists of two rectangles 38' which are stacked radially when the segment structure 38 occupies one of the layers from amongst an assembly comprising the inner layer and the outer layer. These two rectangles 38' are stacked orthoradially when the segment structure 38 occupies the other layer of the assembly. In this case, the rectangles 38' are stacked radially in an inner layer and stacked orthoradially in an outer layer.

A length L20 of each rectangle 38' is equal to twice a width L21 of each rectangle 38'.

Each phase winding E1-E6 then consists of two wires. In other words, the winding layer 52 is produced by means of two wires in use per phase winding E1-E6 by carrying out a rotation of 90° when going from one notch 28 to the following notch in the series.

Apart from the use of the two wires in use, the winding 17 obtained is identical to that previously described, i.e. in particular it comprises a regular part 46 and an irregular part 47. In addition, the loop structures 39 have the same configuration as that previously described.

In this case the teeth 25 are preferably without tooth roots.

It will be appreciated that the preceding description has been given only by way of example, and does not limit the scope of the invention, wherein replacement of the details of execution by any other equivalents would not constitute a departure from the scope.

The invention claimed is:

1. A wound stator (15), comprising:
   a body (16) provided with notches (28); and
   a winding (17) formed from a layer comprising a plurality of phase windings (E1-E6);
   the winding (17) comprising:
   a regular winding part (46) in which, for each phase winding (E1-E6), segment structures (38) are each connected via two loop structures (39) to two adjacent segment structures (38) situated in two different notches (28), and
   an irregular winding part (47) in which, for each phase winding (E1-E6), one of the segment structures (38) is connected via two loop structures (39) to two superimposed segment structures (38) superimposed radially relative to one another in one of the notches (28) such that, for each phase winding, the direction of running of each of the phase windings in the notches in the stator is inverted at an inversion notch, in which is disposed the segment structure (38) connected via the two loop structures (39) to the two superimposed segment structures (38).

2. The wound stator according to claim 1, wherein, for at least one of the phase windings (E1-E6) of the irregular winding part (47), at least one of the loop structures (39) has radial adjustments (50) such that the at least one of the loop structures of the phase windings (E1-E6) does not overlap.

3. The wound stator according to claim 1, wherein the segment structures (38) of two conductors (37) constituting a single phase winding (E1-E6) are positioned alternately in an inner layer and an outer layer according to a circumference of the stator.

4. The wound stator according to claim 1, wherein each of the phase windings (E1-E6) is constituted by a single wire (44).

5. The wound stator according to claim 1, wherein, for two adjacent notches (28) of a series of notches associated with one of the phase windings (E1-E6), the winding (17) has two loop structures (39) situated on both sides of the stator (15) connecting the segment structures (38) of one of the notches (28) adjacent to those of the other.

6. The wound stator according to claim 5, wherein the two loop structures (39) connect respectively a segment structure (38) belonging to an inner layer to a segment structure (38) belonging to an outer layer, and a segment structure (38) belonging to an outer layer to a segment structure (38) belonging to an inner layer.

7. The wound stator according to claim 1, wherein the segment structures (38) have a square or rectangular cross-section, and the loop structures (39) have a round cross-section.

8. The wound stator according to claim 1, wherein teeth (25) which delimit the notches (28) are without tooth roots.

9. The wound stator according to claim 1, wherein the winding (17) is obtained by winding a winding layer (52) around N/2 stator turns (15), N being the number of layers of conductors (37) required in the wound stator (15), N being equal to two or more.

10. The wound stator according to claim 9, wherein the number N of layers of conductors (37) is equal to four, six, or eight.

11. The wound stator according to claim 10, wherein the number N of layers of conductors (37) is equal to eight.

12. A rotary electrical machine comprising a stator according to claim 1.

13. The wound stator according to claim 2, wherein segment structures (38) of two conductors (37) which constitute a single phase winding (E1-E6) are positioned alternately in an inner layer and an outer layer according to a circumference of the stator.

14. The wound stator according to claim 2, wherein each phase winding (E1-E6) is constituted by a single wire (44).

15. The wound stator according to claim 3, wherein each phase winding (E1-E6) is constituted by a single wire (44).

16. The wound stator according to claim 2, wherein, for two adjacent notches (28) of a series of notches associated with a phase winding (E1-E6), the winding (17) has two loop structures (39) situated on both sides of the stator (15) connecting segment structures (38) of one of the notches (28) adjacent to those of the other.

17. The wound stator according to claim 3, wherein, for two adjacent notches (28) of a series of notches associated with a phase winding (E1-E6), the winding (17) has two loop structures (39) situated on both sides of the stator (15) connecting segment structures (38) of one of the notches (28) adjacent to those of the other.

18. The wound stator according to claim 4, wherein, for two adjacent notches (28) of a series of notches associated with a phase winding (E1-E6), the winding (17) has two loop structures (39) situated on both sides of the stator (15) connecting segment structures (38) of one of the notches (28) adjacent to those of the other.

* * * * *